(12) United States Patent
Raschke et al.

(10) Patent No.: US 8,996,749 B2
(45) Date of Patent: Mar. 31, 2015

(54) ACHIEVING A UNIFORM DEVICE ABSTRACTION LAYER

(75) Inventors: Steve Raschke, Moraga, CA (US); Mike Anderson, Moraga, CA (US)

(73) Assignee: Candi Controls, Inc., Oakland, CA (US)

( * ) Notice: Subject to any disclaimer, the term of this patent is extended or adjusted under 35 U.S.C. 154(b) by 21 days.

(21) Appl. No.: 13/481,661

(22) Filed: May 25, 2012

(65) Prior Publication Data

US 2012/0303837 A1  Nov. 29, 2012

Related U.S. Application Data

(60) Provisional application No. 61/490,275, filed on May 26, 2011, provisional application No. 61/490,286, filed on May 26, 2011, provisional application No. 61/490,294, filed on May 26, 2011, provisional application No. 61/490,302, filed on May 26, 2011, provisional application No. 61/490,313, filed on May 26, 2011, provisional application No. 61/490,317, filed on May 26, 2011.

(51) Int. Cl.
    *G06F 13/38*  (2006.01)
    *H04L 29/08*  (2006.01)
    *H04L 12/28*  (2006.01)
    *G06F 13/00*  (2006.01)

(52) U.S. Cl.
    CPC .......... *H04L 67/025* (2013.01); *H04L 12/2814* (2013.01)
    USPC ............. 710/11; 710/2; 710/5; 710/8; 710/15

(58) Field of Classification Search
    None
    See application file for complete search history.

(56) References Cited

U.S. PATENT DOCUMENTS

| | | | |
|---|---|---|---|
| 5,335,346 | A | 8/1994 | Fabbio |
| 5,491,813 | A | 2/1996 | Bondy et al. |
| 6,243,774 | B1 | 6/2001 | Eide et al. |
| 6,370,539 | B1 | 4/2002 | Ashby et al. |
| 6,389,464 | B1 | 5/2002 | Krishnamurthy et al. |
| 6,769,031 | B1 | 7/2004 | Bero |
| 7,076,536 | B2 | 7/2006 | Chiloyan et al. |
| 7,178,137 | B1 | 2/2007 | Peak et al. |
| 7,194,521 | B1 | 3/2007 | Wang |
| 7,280,529 | B1 | 10/2007 | Black et al. |
| 7,392,237 | B2 | 6/2008 | Pratt |
| 7,844,742 | B2 | 11/2010 | Pope et al. |
| 7,945,585 | B1 | 5/2011 | Sorkin et al. |

(Continued)

OTHER PUBLICATIONS

"International Searching Authority", International Search Report and Written Opinion, PCT/US2012/039764, 8 pages, Oct. 30, 2012.

(Continued)

*Primary Examiner* — Scott Sun

(57) ABSTRACT

A system for achieving a uniform device abstraction layer is described. The system includes a device class determiner coupled with a local server, the device class determiner configured for establishing a device class for at least one device residing in a domain at a premises, wherein the domain is coupled with a remote server, and a device of the at least one device includes a communication port that supports a first protocol corresponding to a second protocol, wherein the second protocol is supported by a device driver coupled with the domain, wherein based on the establishing the device class, an action is enabled to be mapped to the device, thereby enabling an application to run on and utilize a capability of the device.

37 Claims, 31 Drawing Sheets

(56) References Cited

U.S. PATENT DOCUMENTS

| | | | |
|---|---|---|---|
| 8,005,013 | B2 | 8/2011 | Teisberg et al. |
| 8,131,883 | B1 | 3/2012 | Reisman |
| 8,135,796 | B1 | 3/2012 | Slaughter et al. |
| 8,193,930 | B2 | 6/2012 | Petite et al. |
| 8,320,346 | B2 | 11/2012 | Natan et al. |
| 8,326,873 | B2 | 12/2012 | Ellis et al. |
| 8,370,407 | B1 | 2/2013 | Devarajan et al. |
| 8,413,256 | B2 | 4/2013 | Gonzalez et al. |
| 8,424,026 | B1 | 4/2013 | Cottrell |
| 8,554,933 | B2 | 10/2013 | Delos Reyes et al. |
| 8,676,992 | B2 | 3/2014 | Bonalle et al. |
| 8,805,418 | B2 | 8/2014 | Nichols |
| 8,832,688 | B2 | 9/2014 | Tang et al. |
| 2002/0161749 | A1 | 10/2002 | Pratt |
| 2003/0037171 | A1 | 2/2003 | Madineni et al. |
| 2003/0054810 | A1 | 3/2003 | Chen et al. |
| 2003/0167307 | A1 | 9/2003 | Filepp et al. |
| 2003/0208472 | A1 | 11/2003 | Pham |
| 2004/0054789 | A1 | 3/2004 | Breh et al. |
| 2004/0073640 | A1 | 4/2004 | Martin et al. |
| 2004/0133689 | A1 | 7/2004 | Vasisht |
| 2005/0044363 | A1 | 2/2005 | Zimmer et al. |
| 2005/0149948 | A1 | 7/2005 | Gupta et al. |
| 2005/0193118 | A1 | 9/2005 | Le et al. |
| 2005/0220139 | A1 | 10/2005 | Aholainen |
| 2005/0240669 | A1 | 10/2005 | Khanna et al. |
| 2005/0246522 | A1 | 11/2005 | Samuelsson et al. |
| 2008/0098321 | A1 | 4/2008 | Krithivas |
| 2008/0310421 | A1 | 12/2008 | Teisberg et al. |
| 2009/0063357 | A1 | 3/2009 | Munger et al. |
| 2010/0058485 | A1 | 3/2010 | Gonzalez |
| 2010/0071053 | A1 | 3/2010 | Ansari et al. |
| 2010/0105454 | A1 | 4/2010 | Weber et al. |
| 2010/0115438 | A1 | 5/2010 | Chu |
| 2010/0305722 | A1 | 12/2010 | Jin et al. |
| 2011/0054878 | A1 | 3/2011 | Zhang et al. |
| 2011/0185428 | A1 | 7/2011 | Sallam |
| 2011/0296411 | A1 | 12/2011 | Tang et al. |
| 2011/0320050 | A1 | 12/2011 | Petite et al. |
| 2012/0041752 | A1 | 2/2012 | Wang et al. |
| 2012/0084449 | A1 | 4/2012 | Delos Reyes et al. |
| 2012/0166960 | A1 | 6/2012 | Salles |
| 2012/0240183 | A1 | 9/2012 | Sinha |
| 2012/0290694 | A9 * | 11/2012 | Marl et al. ............ 709/223 |
| 2012/0303832 | A1 * | 11/2012 | Raschke et al. ......... 709/230 |
| 2012/0323954 | A1 | 12/2012 | Bonalle et al. |
| 2013/0086594 | A1 | 4/2013 | Cottrell |
| 2013/0104114 | A1 | 4/2013 | Reiss et al. |
| 2014/0123184 | A1 | 5/2014 | REISMAN |

OTHER PUBLICATIONS

Fielding, et al., "Hypertext Transfer Protocol — Http/1.1," RFC 2068, 1997, 152 pgs.

Guttman, et al., "Service Location Protocol, Version 2," RFC 2608, 1999, 51 pgs.

Guttman, et al., "Service Templates and Service: Schemes," RFC 2609, 1999, 33 pgs.

Guttman, Erik, Service Location Protocol: Automatic Discovery of IP Network Services, 199, 10 pgs.

Srisuresh, et al., "Traditional IP Network Address Translator (Traditional NAT)," RFC 3022, 2001, 17 pgs.

Veizades, et al., "Service Location Protocol," RFC 2165, 1997, 72 pgs.

* cited by examiner

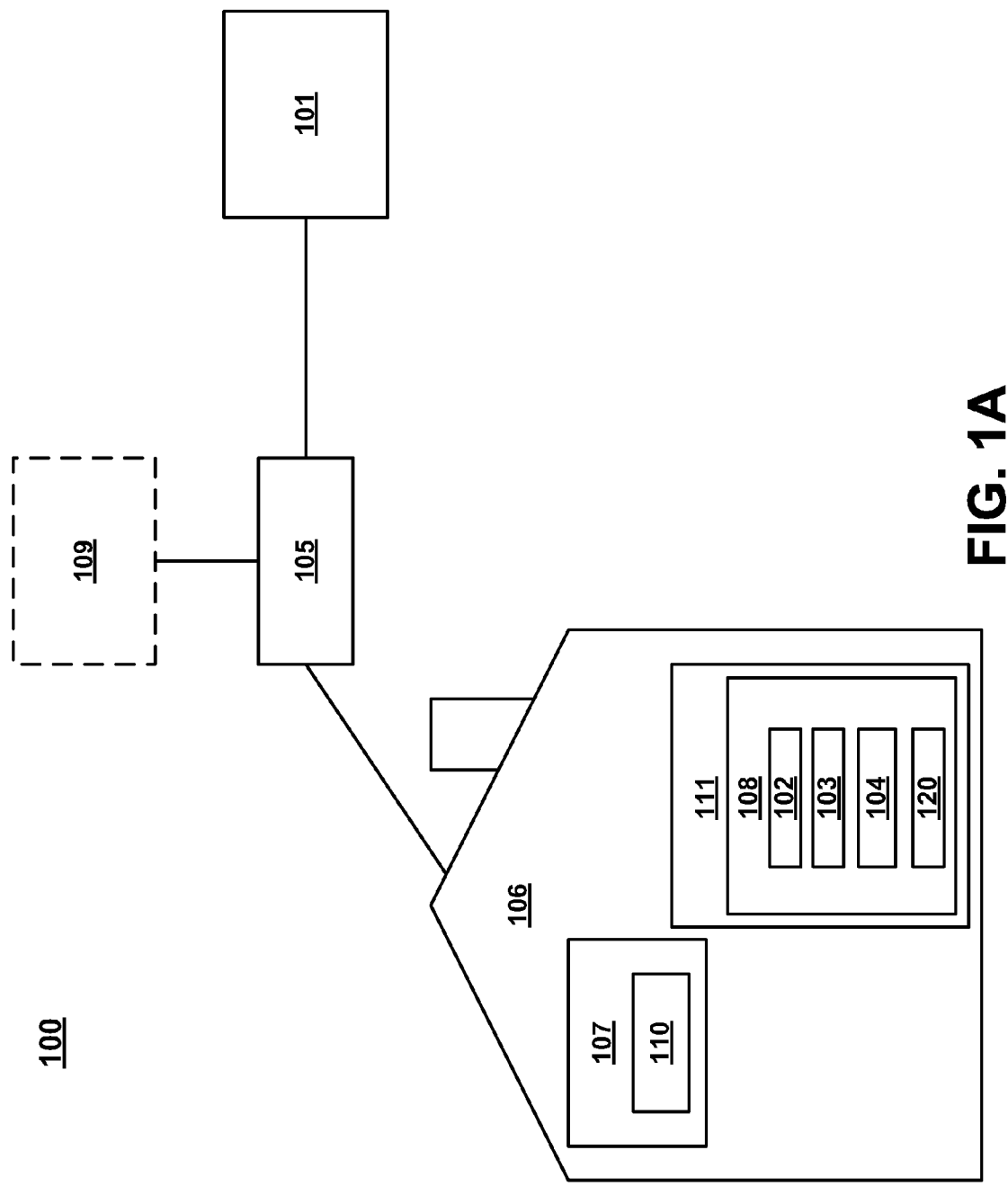

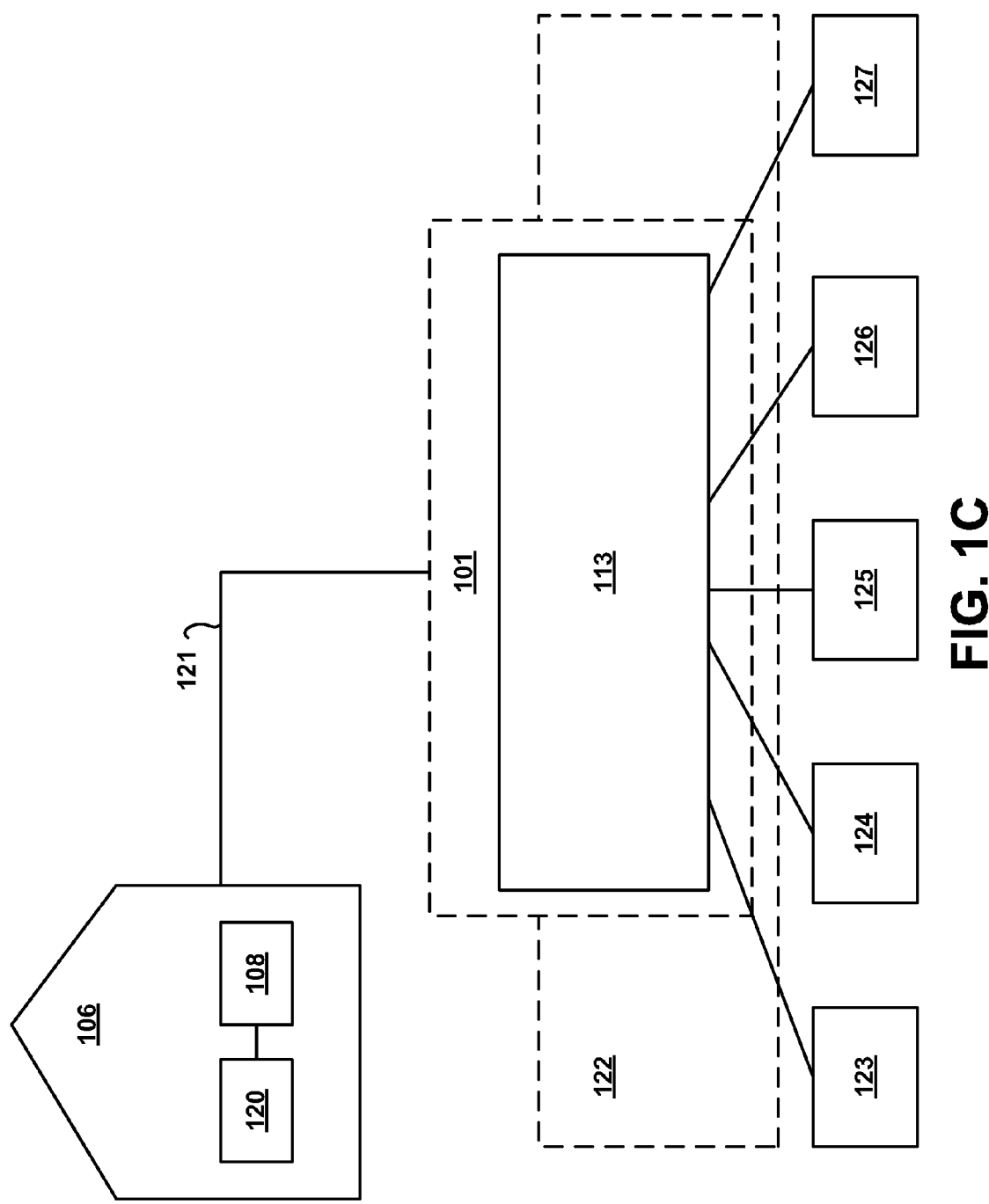

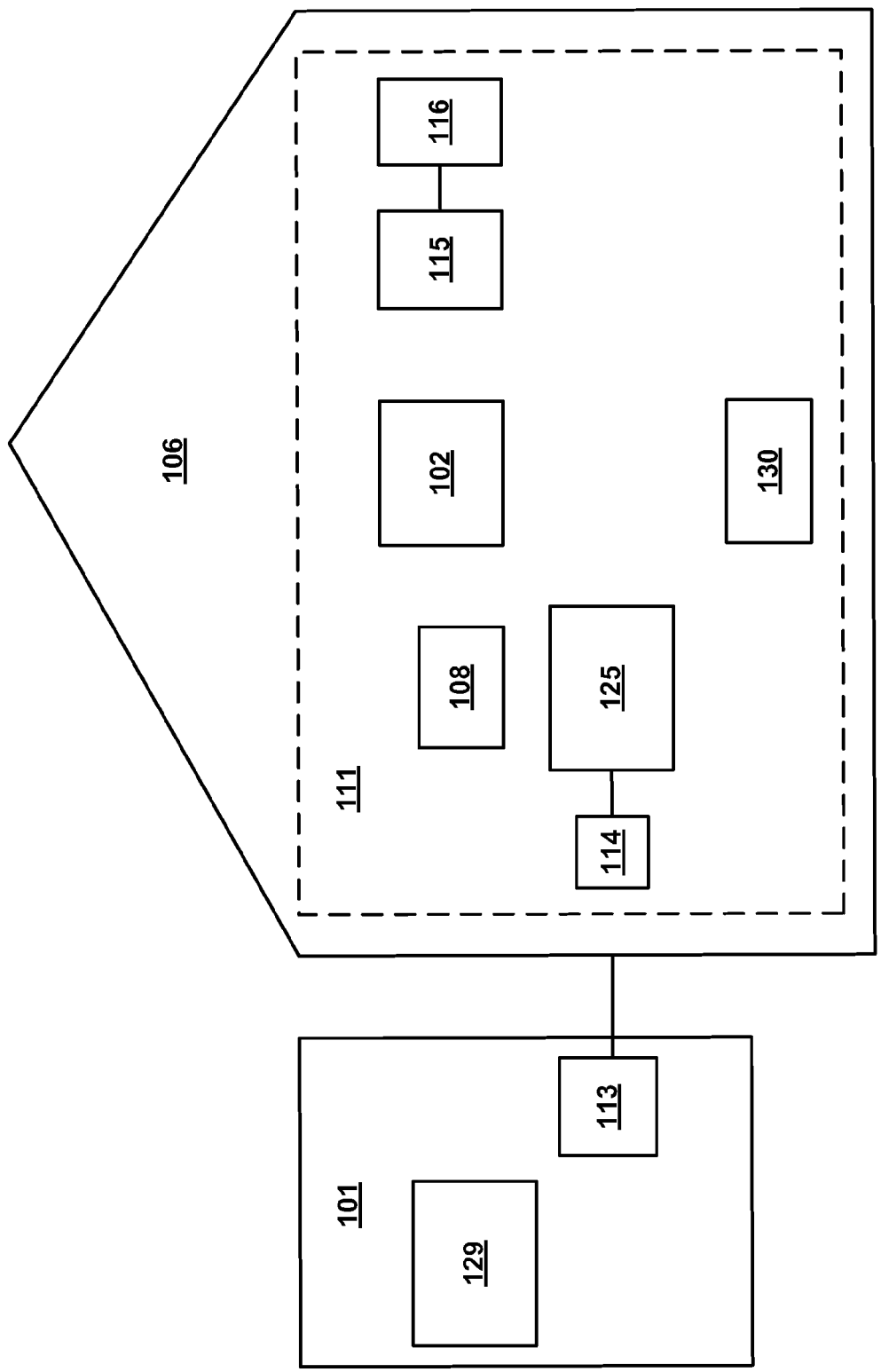

350

```
┌─────────────────────────────────────────────────────────────────────────────┐
│ RECEIVE A SET OF INSTRUCTIONS AT A LOCAL SERVER, WHEREIN SAID SET OF        │
│ INSTRUCTIONS REQUESTS THAT A CHANGE OCCUR IN SAID DOMAIN, WHEREIN SAID      │
│ DOMAIN COMPRISES AT LEAST ONE DEVICE, SAID AT LEAST ONE DEVICE COMPRISING   │
│ A COMMUNICATION PORT THAT SUPPORTS A FIRST PROTOCOL CORRESPONDING TO A      │
│ SECOND PROTOCOL, WHEREIN SAID SECOND PROTOCOL IS SUPPORTED BY A DEVICE      │
│ DRIVER THAT IS COUPLED WITH SAID DOMAIN                                     │
│ 351                                                                         │
└─────────────────────────────────────────────────────────────────────────────┘
                                        ↓
┌─────────────────────────────────────────────────────────────────────────────┐
│ ESTABLISH A SECURE CONNECTION BETWEEN SAID LOCAL SERVER AND SAID REMOTE     │
│ SERVER                                                                      │
│ 352                                                                         │
└─────────────────────────────────────────────────────────────────────────────┘
                                        ↓
┌─────────────────────────────────────────────────────────────────────────────┐
│ COMMUNICATE SAID REQUEST FOR SAID CHANGE BETWEEN THE LOCAL SERVER AND THE   │
│ REMOTE SERVER                                                               │
│ 353                                                                         │
└─────────────────────────────────────────────────────────────────────────────┘
                                        ↓
┌─────────────────────────────────────────────────────────────────────────────┐
│ EXCHANGE CONFIGURATION INFORMATION BETWEEN SAID LOCAL SERVER AND SAID       │
│ REMOTE SERVER                                                               │
│ 354                                                                         │
└─────────────────────────────────────────────────────────────────────────────┘
                                        ↓
┌─────────────────────────────────────────────────────────────────────────────┐
│ BASED ON SAID REQUEST AND SAID EXCHANGING, UPDATING AN APPLICATION          │
│ RESIDING ON AT LEAST ONE OF THE REMOTE SERVER AND A COMPUTING DEVICE THAT   │
│ IS SEPARATE FROM THE REMOTE SERVER AND UPDATING DEVICE CONFIGURATION        │
│ INFORMATION STORED ON A FIRST DATABASE COUPLED WITH SAID REMOTE SERVER      │
│ 355                                                                         │
└─────────────────────────────────────────────────────────────────────────────┘
                                        ↓
┌─────────────────────────────────────────────────────────────────────────────┐
│ UPDATE A SECOND DATABASE COUPLED WITH THE LOCAL SERVER                      │
│ 356                                                                         │
└─────────────────────────────────────────────────────────────────────────────┘
                                        ↓
┌─────────────────────────────────────────────────────────────────────────────┐
│ CREATE PRELOAD FILES FOR THE APPLICATION                                    │
│ 357                                                                         │
└─────────────────────────────────────────────────────────────────────────────┘
                                        ↓
┌─────────────────────────────────────────────────────────────────────────────┐
│ MANAGE A DEVICE DRIVER ON THE PREMISES TO ACCOMMODATE A CHANGE MADE TO THE  │
│ DOMAIN                                                                      │
│ 358                                                                         │
└─────────────────────────────────────────────────────────────────────────────┘
                                        ↓
                        ┌──────────────────────────────┐
                        │   CONTINUED ON FIG. 3D       │
                        └──────────────────────────────┘
```

```
┌─────────────────────────────┐
│  CONTINUED FROM FIG. 3C     │
└─────────────────────────────┘
              │
              ▼
┌─────────────────────────────────────────────────────┐
│ INDICATE A SUCCESSFUL UPDATE TO SAID AT LEAST ONE DEVICE │
│                        359                          │
└─────────────────────────────────────────────────────┘
              │
              ▼
┌─────────────────────────────────────────────────────────────┐
│ PROVIDE A MIRROR IMAGE OF AN APPLICATION MANAGED AT THE     │
│ REMOTE SERVER, WHEREIN SAID APPLICATION IS ACCESSIBLE TO A  │
│ SUBSCRIBER OVER A WIDE AREA NETWORK VIA THE MIRROR IMAGE    │
│                            360                              │
└─────────────────────────────────────────────────────────────┘
              │
              ▼
┌─────────────────────────────────────────────────────────────┐
│ RECEIVE BY SAID LOCAL SERVER FROM SAID REMOTE SERVER A      │
│ LOCAL IP ADDRESS OF SAID DOMAIN                             │
│                        361                                  │
└─────────────────────────────────────────────────────────────┘
              │
              ▼
┌─────────────────────────────────────────────────────────────┐
│ FACILITATE SAID CHANGE IN SAID DOMAIN BY CHANGING A STATUS OF│
│ SAID AT LEAST ONE DEVICE                                    │
│                       362                                   │
└─────────────────────────────────────────────────────────────┘
```

```
AUTOMATICALLY ESTABLISH A DEVICE CLASS FOR AT LEAST ONE DEVICE RESIDING IN A DOMAIN
OF A PREMISES, WHEREIN SAID DOMAIN IS COUPLED WITH A REMOTE SERVER, AND A DEVICE OF
THE AT LEAST ONE DEVICE COMPRISES A COMMUNICATION PORT THAT SUPPORTS A FIRST
PROTOCOL CORRESPONDING TO A SECOND PROTOCOL, WHEREIN SAID SECOND PROTOCOL IS
SUPPORTED BY A DEVICE DRIVER COUPLED WITH SAID DOMAIN
451
```

```
BASED ON SAID ESTABLISHING OF THE DEVICE CLASS, ENABLE A MAPPING OF AT LEAST ONE
ACTION TO SAID DEVICE, THEREBY ENABLING AN APPLICATION TO RUN ON AND UTILIZE A
CAPABILITY OF THE DEVICE
452
```

```
BASED ON SAID ESTABLISHING OF THE DEVICE CLASS, ENABLE MULTIPLE APPLICATIONS TO BE
BUILT UNIFORMLY, USING THE MAPPING OF THE AT LEAST ONE ACTION
453
```

```
BASED ON PERFORMED DATA ANALYSIS, NOTIFY AN ENTITY, WHEN A
THRESHOLD IS ACHIEVED
454
```

```
RECEIVE DATA FROM AN EXTERNAL SOURCE
455
```

```
STORE SAID DATA IN A LOCAL DATABASE COUPLED WITH SAID LOCAL SERVER
456
```

```
COMPARE RECEIVED DATA WITH SAID LOCAL DATABASE; AND
BASED ON SAID COMPARING, DETERMINE A SET OF DATA THAT MEETS A PREDETERMINED
CRITERIA
457
```

```
REPORT A HISTORY OF RECEIVED DATA
458
```

```
BASED ON RECEIVED DATA, PROJECT A FUTURE TREND
459
```

Continued from FIG. 4C

↓

Based on data stored in a local database coupled with said local server, generate a recommendation for a subscriber
460

Analyze said data stored in said local database
461

↓

Initiate an action to achieve a predetermined condition
462

↓

Receive data associated with different subscribers' actions; and based on received data, compare said different subscribers' actions with each other
463

↓

Receive data associated with different subscribers' actions; and based on received data, group subscribers
464

↓

Access a web service requiring a permission; compare a subscriber's information with information associated with at least one third party.
465

↓

RECEIVE DATA ASSOCIATED WITH AT LEAST ONE SUBSCRIBER, AND Manage THE AT LEAST ONE SUBSCRIBER
466

RECEIVE A SET OF INSTRUCTIONS RESIDING ON AT LEAST ONE THIRD PARTY APPLICATION, WHEREIN SAID SET OF INSTRUCTIONS COMPRISES A REQUEST FOR AN ACTION TO BE PERFORMED AT SAID LEAST ONE DEVICE WITHIN A DOMAIN COUPLED WITH A PREMISES
551

TRANSLATE SAID SET OF INSTRUCTIONS INTO AN ACTION REQUEST AND A PROTOCOL THAT SAID AT LEAST ONE DEVICE UNDERSTANDS, SUCH THAT SAID AT LEAST ONE THIRD PARTY APPLICATION CAN COMMUNICATE WITH A DEVICE DRIVER AT SAID PREMISES WITHOUT HAVING KNOWLEDGE OF A PROTOCOL THEREON AND WITHOUT HAVING KNOWLEDGE OF SAID AT LEAST ONE DEVICE, WHEREIN A DEVICE OF SAID AT LEAST ONE DEVICE IS COUPLED WITH SAID SERVER AND COMPRISES A COMMUNICATION PORT THAT SUPPORTS A FIRST PROTOCOL CORRESPONDING TO A SECOND PROTOCOL, WHEREIN SAID SECOND PROTOCOL IS SUPPORTED BY A DEVICE DRIVER THAT IS COUPLED WITH SAID DOMAIN
552

OPERATE AT SAID AT LEAST ONE DEVICE, VIA SAID SET OF API, SAID AT LEAST ONE THIRD PARTY APPLICATION, INCLUDING SAID ACTION REQUEST, HAVING SAID SET OF INSTRUCTIONS THEREON
553

PROVIDE AN INDICATION OF WHEN SAID ACTION REQUEST HAS BEEN PERFORMED
554

MANAGE SENDING AND RECEIVING OF SAID ACTION REQUEST VIA A LIBRARY
555

FIG. 5C

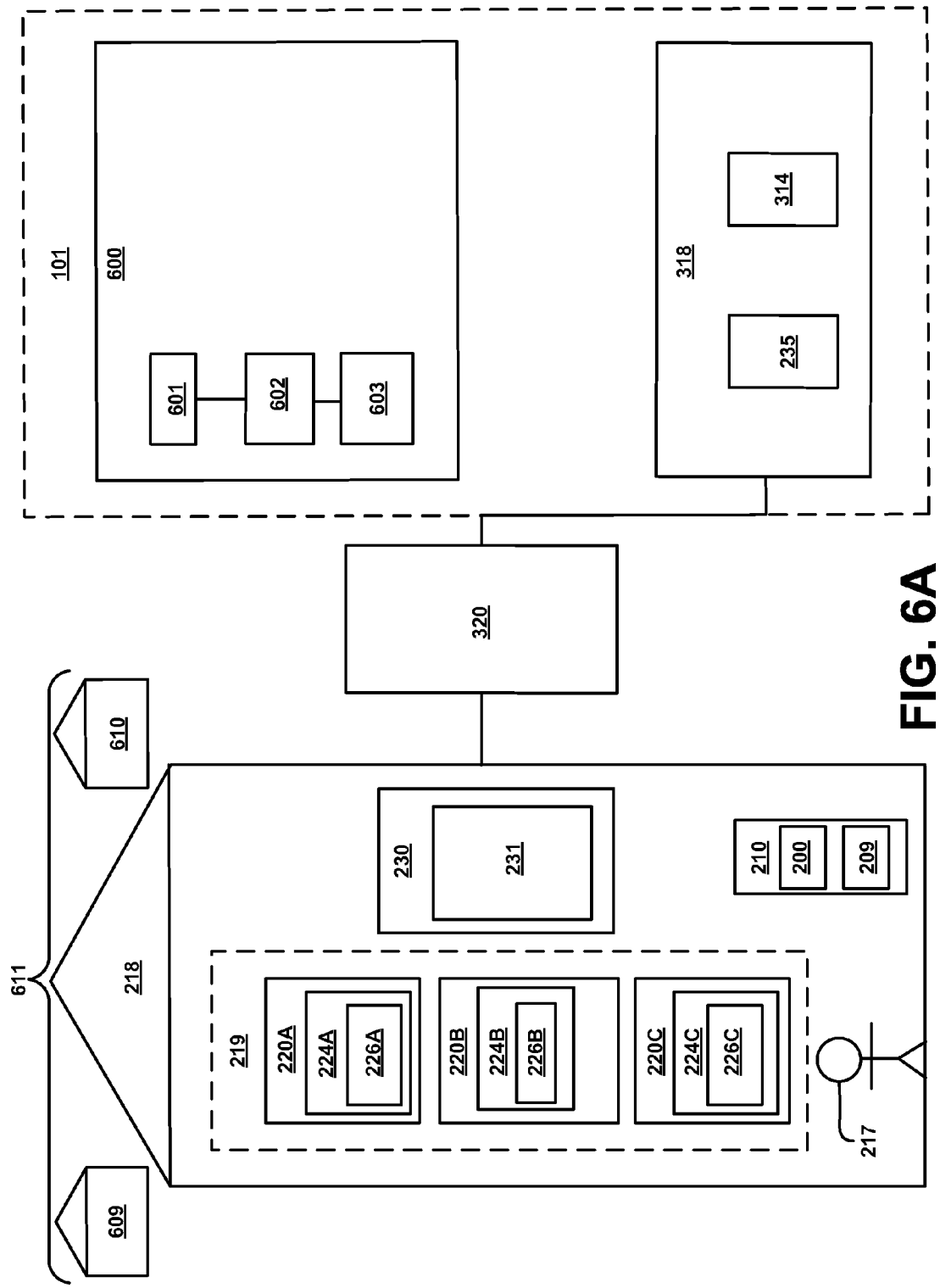

850

> ESTABLISH, AT A LOCAL SERVER, A DEVICE CLASS FOR AT LEAST ONE DEVICE RESIDING IN A DOMAIN OF A PREMISES, WHEREIN SAID DOMAIN IS COUPLED WITH A REMOTE SERVER AND SAID AT LEAST ONE DEVICE COMPRISES A COMMUNICATION PORT THAT SUPPORTS A FIRST PROTOCOL
> 851

> IDENTIFY AN ACTION TO BE MAPPED TO SAID DEVICE
> 852

> DETERMINE A DEVICE DRIVER THAT SUPPORTS A SECOND PROTOCOL, SAID DEVICE DRIVER BEING COUPLED WITH SAID DOMAIN, SAID SECOND PROTOCOL SUPPORTING SAID ACTION
> 853

> COMPARE SAID SECOND PROTOCOL WITH A DOMAIN CONFIGURATION STORE COMPRISING DEVICE CONFIGURATION INFORMATION FOR SAID AT LEAST ONE DEVICE, WHEREIN SAID DOMAIN CONFIGURATION STORE IS COUPLED WITH A FIRST DATABASE, SAID FIRST DATABASE BEING COUPLED WITH SAID REMOTE SERVER
> 854

> BASED ON SAID COMPARING, IMPLEMENT SAID DEVICE DRIVER WHEN SAID FIRST PROTOCOL CORRESPONDS TO SAID SECOND PROTOCOL SUCH THAT SAID ACTION IS ENABLED FOR PERFORMANCE
> 855

> AUTOMATICALLY ESTABLISH A DEVICE CLASS FOR THE AT LEAST ONE DEVICE
> 856

> BASED ON THE ESTABLISHING OF THE DEVICE CLASS, ENABLE A MAPPING OF AT LEAST ONE ACTION TO THE DEVICE, THEREBY ENABLE AN APPLICATION TO RUN ON AND UTILIZE A CAPABILITY OF THE DEVICE.
> 857

> RECEIVE A SET OF INSTRUCTIONS AT THE LOCAL SERVER, WHEREIN THE SET OF INSTRUCTIONS REQUESTS THAT A CHANGE OCCUR IN THE DOMAIN; ESTABLISH A SECURE CONNECTION BETWEEN THE LOCAL SERVER AND THE REMOTE SERVER; COMMUNICATE THE REQUEST FOR THE CHANGE BETWEEN THE LOCAL SERVER AND THE REMOTE SERVER; EXCHANGE DEVICE CONFIGURATION INFORMATION BETWEEN THE LOCAL SERVER AND THE REMOTE SERVER; BASED ON THE REQUEST AND THE EXCHANGING, UPDATE AN APPLICATION RESIDING ON AT LEAST ONE OF THE REMOTE SERVER AND A COMPUTING DEVICE THAT IS SEPARATE FROM THE REMOTE SERVER AND UPDATE DEVICE CONFIGURATION INFORMATION STORED ON A FIRST DATABASE COUPLED WITH THE REMOTE SERVER
> 858

ACHIEVING A UNIFORM DEVICE ABSTRACTION LAYER

CROSS REFERENCE TO RELATED APPLICATIONS

This application claims priority to and benefit of U.S. provisional patent application Ser. No. 61/490,275, entitled "Domain Management," by Steve Raschke et al., filed May 26, 2011, which is herein incorporated by reference in its entirety; claims priority to and benefit of U.S. provisional patent application Ser. No. 61/490,286, entitled "Domain Communications," by Mike Anderson et al., filed May 26, 2011, which is herein incorporated by reference in its entirety; claims priority to and benefit of U.S. provisional patent application Ser. No. 61/490,294, entitled "Network Operations Center," by Steve Raschke et al., filed May 26, 2011, which is herein incorporated by reference in its entirety; claims priority to and benefit of U.S. provisional patent application Ser. No. 61/490,302, entitled "Building Customized Applications," by Mike Anderson et al., filed May 26, 2011, which is herein incorporated by reference in its entirety; claims priority to and benefit of U.S. provisional patent application Ser. No. 61/490,313, entitled "Partnership Services," by Steve Raschke et al., filed May 26, 2011, which is herein incorporated by reference in its entirety; and claims priority to and benefit of U.S. provisional patent application Ser. No. 61/490,317, entitled "Managing Device Information," by Mike Anderson et al., filed May 26, 2011, which are incorporated herein, in their entirety, by reference.

This Application is related to U.S. patent application Ser. No. 13/481,639 entitled MANAGING A DOMAIN, by Steve Raschke et al., assigned to the assignee of the present invention, filed May 25, 2012.

This Application is related to U.S. patent application Ser. No. 13/481,647 entitled MAINTAINING A DOMAIN, by Mike Anderson et al., assigned to the assignee of the present invention, filed May 25, 2012.

This Application is related to U.S. patent application Ser. No. 13/481,675 entitled ENABLING CUSTOMIZED FUNCTIONS TO BE IMPLEMENTED AT A DOMAIN, by Mike Anderson et al., assigned to the assignee of the present invention, filed May 25, 2012.

This Application is related to U.S. patent application Ser. No. 13/481,687 entitled TARGETING DELIVERY DATA, by Steve Raschke et al., assigned to the assignee of the present invention, filed May 25, 2012.

This Application is related to U.S. patent application Ser. No. 13/481,701 entitled CLOUD-ASSISTED NETWORK DEVICE INTEGRATION, by Mike Anderson et al., assigned to the assignee of the present invention, filed May 25, 2012.

DESCRIPTION OF THE DRAWINGS

FIG. 1A is a block diagram of the Cloud-Assisted Network Device Integration system 100, in accordance with an embodiment.

FIG. 1C is a block diagram showing a server 113 located in a web environment communicating with a server 108 on a premises 106, in accordance with an embodiment.

FIG. 1D is a block diagram showing a server 113 communicating with a server 108 on a premises 106, in accordance with an embodiment.

FIGS. 3C and 3D are flow diagrams of a method 350 for maintaining a domain in a premises, in accordance with an embodiment.

FIGS. 4C and 4D are flow diagrams of a method 450 for achieving a uniform device abstraction layer, in accordance with an embodiment.

FIG. 5C is a flow diagram of a method 550 for enabling a building of a customized function for at least one device 220 in a domain 219, in accordance with an embodiment.

FIG. 6A is a block diagram of a system 600 for targeting delivery data, in accordance with an embodiment.

FIGS. 8B-8D are flow diagrams of the method for integrating networked devices, in accordance with an embodiment.

Figure 1B:
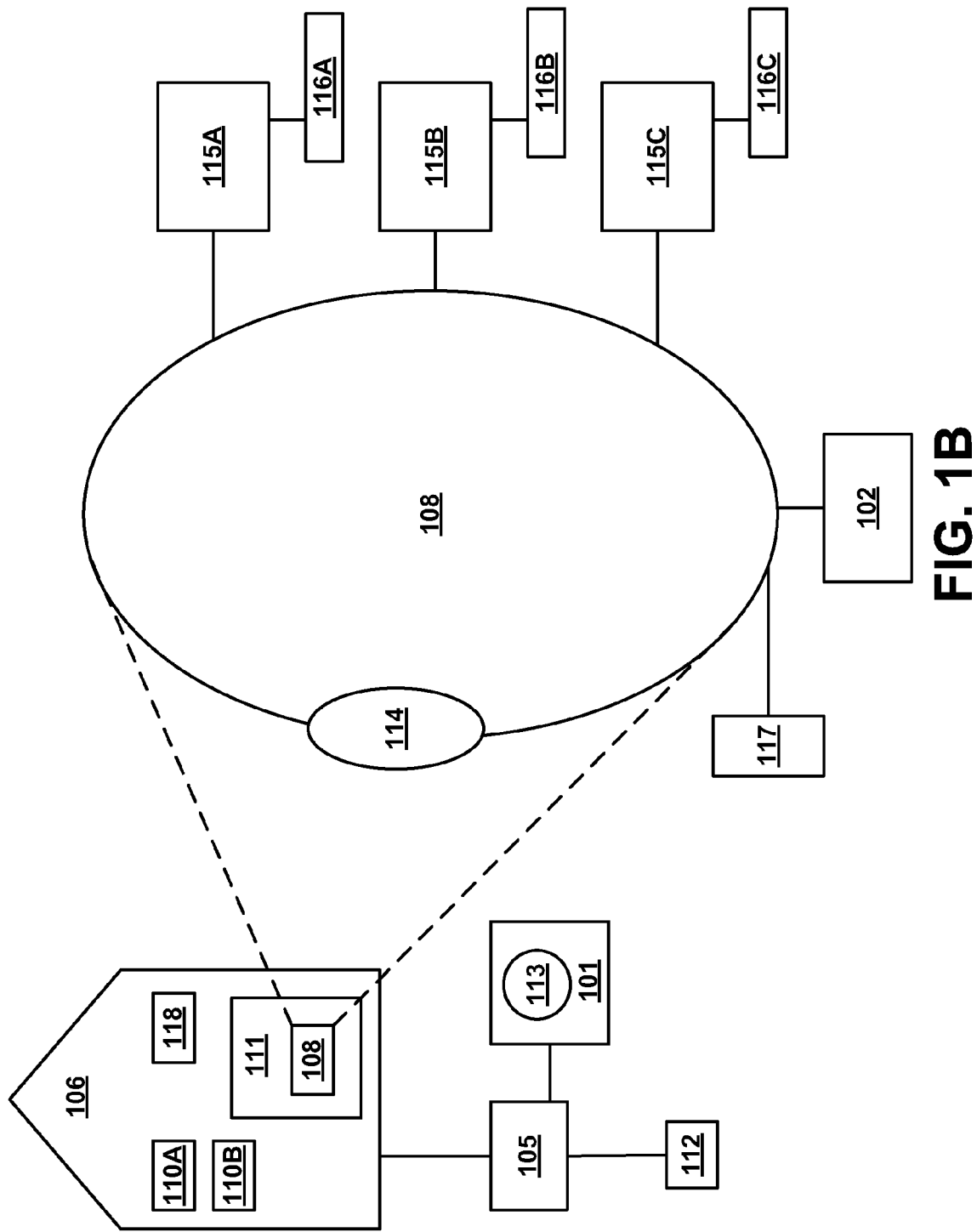
FIG. 1B a block diagram showing a server 108 located at a premises 106, in accordance with an embodiment.

The drawings referred to in this description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Overview of Discussion

Herein, various embodiments of a system and method for integrating a networked device within a premises are described. The description begins with a partial glossary of defined terms associated with various embodiments. Following this glossary is a brief general discussion of various embodiments associated with the cloud-assisted network device integration (CANDI) system and the benefits thereof to consumers and service providers. This general discussion provides a framework of understanding for more particularized descriptions of features and concepts of operation associated with one or more embodiments of the described CANDI system that follows.

GLOSSARY OF TERMS

The following is a list of definitions for terminology used herein.

A "subscriber" is an end user of the web services of the cloud-assisted network device integration (CANDI) system. The subscriber usually wants to control and monitor devices in a home or commercial building.

A "domain" is the integrated sum of devices and software applications that interoperate to provide control, feedback and monitoring within a home or commercial building under a single subscriber login.

A "premises" is a location at which a domain (defined above) resides.

A "product" is an off-the-shelf component as delivered to the market by its manufacturer. The product is not necessarily capable of interfacing within the CANDI system.

A "device" is a product that the CANDI system is able to monitor and control through being characterized (defined below) and implemented within a domain of the CANDI system.

"Characterized" refers to a product being defined to be within a specific device class able to perform specific actions. Products are classified by type or types (e.g. "TV", "Light Dimmer"). The CANDI system addressable products are further uniquely identified by their particular make (manufacturer) and model number. Additionally, every CANDI system addressable product is identified by having one or more "communication port" (defined below).

A "communication port" refers to the following: 1) a physical communication method (e.g. infrared, Z-Wave, ZigBee, serial, IP, X-10, INSTEON, RF); and 2) a protocol running over that port. Depending on the physical communication method, a port may also have field-determined information (e.g. address, login information) used for operation.

An "action" refers to at least one of the following: a service; a network; and a default attribute of a set of attributes, wherein the set of attributes includes but is not limited to codes and parameters. An action may be static.

A "device driver" is located at the premises and associates the following three product characteristics of a device: 1) one or more protocols for that device; 2) an implementer that implements an action; and 3) a specific list of actions possible to be implemented through the device, using the protocol(s). A protocol may handle more actions (e.g. commands) than are actually supported by the implementer. Thus, the device driver supports actions specific to the implementer. Over time and with new versions of implementers, more actions may become available to be implemented. Actions are assigned and configured for a particular device driver.

Cloud-Assisted Network Device Integration (CANDI) System

Presently, networked products of the same product type (e.g. light switches) but of different brands may not be controlled by a consumer and/or a third party using the exact same commands and methodology. For example, not every product supports the same number of actions as every other product of the same product type. Nor do similar products support the same command in the same way.

Embodiments enable various and otherwise incompatible networked products in businesses and homes to be controlled over a network using the same commands and methods. For example, within a device type, the CANDI system standardizes actions so that subscribers and/or developers can achieve expected results from a particular action regardless of the vendor or protocol associated with the device within the device type. More particularly, an interface of the CANDI system may be used to control a device type, such as a set of light switches of different product brands or protocols, using the same command despite these products having been manufactured by different companies.

Further, embodiments provide developers with the ability to build applications that take advantage of device capabilities, without having to understand the complexities or protocols associated with a particular device or the differences across multiple devices. Thus, developers do not have to account for fundamental differences in device and protocol characteristics. For example, when a new "Light Dimmer" product is added to the CANDI system database, the new product is characterized such that it may be uniformly treated in the same way as existing devices in the CANDI system database.

Referring now to FIG. 1, a block diagram of the CANDI system 100 is shown, in accordance with an embodiment. The CANDI system 100 includes a network operations center (NOC) 101 and a system 111, including the server 108 coupled with one or more databases 102. In some embodiments, the server 108 includes an application server 103 and a server 104 dedicated to information relating to the system 111 operations. The NOC 101 and the system 111 are connected over a network (e.g. Internet 105). The system 111 manages device(s) 110 within a domain 107 of the premises 106.

The NOC 101 functions to manage, as will be described herein, at least but not limited to, any of the following: application libraries; device driver libraries; product administration; third party application development tools and quality control; system and account administration; premises communications; premises system creation and editing; managed services; and hosted services.

The NOC 101 also manages Web sites, such as, but not limited to, any of the following: a marketing site; an eCommerce site; a forum; and a support site. Further, corporate functionalities may also occur at the NOC 101, such as, but not limited to, any of the following: development and quality control; CRM; office functionalities; collaboration; accounting and human resources; and IT management.

The server 108 hosts local applications, and via application services provides data to and receives commands from remote applications, such as would be installed on a mobile phone. The local applications and remote applications are represented by the box "application 120" in FIG. 1. The server 108 and components thereon are programmed by the NOC 101 based on the configuration(s) of a device(s) 110. The NOC 101 accesses (either from a third party or the server 108) a list of the devices on the premises 106. The NOC 101 then uses its power, intelligence and library to compile the device drivers and the applications or application services necessary to be accessible by the server 108 in order to manage the devices. The NOC 101 then downloads these necessary components to the system 111 (including the server 108). Once this compilation and download have occurred, the NOC 101 is no longer needed to facilitate actions to be accomplished in the domain 107.

The NOC 101 and the server 108 also exchange historic and real-time information regarding diagnostics, operations and support tools associated with the devices 110, premises 106 and external information known to the NOC 101.

As part of the system 111, coupled with the premises 106 and in association with the functioning of the CANDI system 100, are at least the following: the server 108; one or more database 102; a control engine, transport links; and an embedded platform.

Also shown in FIG. 1 is a set of devices (one or more devices [having one or more computers thereon] such as a mobile phone, personal computer, etc.) 109 that are capable of communicating with the NOC 101 and/or the server 108 remotely. This set of devices 109 may include, but is not limited to the following: a desktop computer; a laptop computer; a personal digital assistant; a tablet; a networked television; and a mobile phone. A subscriber may send instructions to the NOC 101 and/or the server 108 via the set of devices 109.

With regard to how a customer initially integrates a product within the CANDI system 100, the following may occur. The customer buys the server 108 and a CANDI-compatible product at a store. Of note, to be CANDI-compatible, a product's inherent attributes have already been characterized by the NOC 101 (thereby becoming a "device" 110), such that it may be integrated within the CANDI system 100 once installed and information about the device 110 is downloaded onto the server 108 at the premises 106.

The customer then installs this device 110 on the premises 106. Next, the customer goes on-line and downloads information (which may include a device driver, which is a CANDI characterization of the device 110) to the server 108. Once the information is downloaded, a representation of the device 110 may be displayed such that the customer can identify its accessible location and attributes on the server 108.

Additionally, once the information is downloaded, the device 110 may be controlled by the server 108, by a remote device of the set of devices 109, and/or indirectly remotely controlled by a third party or the NOC 101. For example, third parties may access the server 108 over the network 105, and update and/or change an application 120 of a device 110 via the server 108. Developers may easily perform these modifications because the device 110 is already CANDI-compatible and the developers do not have to know anything about the protocols associated with the device 110.

In another instance, an electrical utility company may write its own software application, such as an application for a mobile phone. This software application is configured for talking to the server 108. The server 108, in turn, interprets the software application's instructions and converts these instructions to represent the correct actions and the correct protocols needed to communicate with products, such as the device 110. Thus, a person may click on a mobile phone energy conservation icon (an application that a third party [e.g. utility company] wrote), which then sends a command to the server 108. The command is intended to instruct all devices within the premises 106 to conserve energy. The server 108 translates this command for the various device types, instructing lights to dim and the thermostat to lower itself by a measurable number of degrees.

Thus, embodiments provide a method and system enabling standards-based communication and control of otherwise incompatible networked devices in businesses and homes. Further, the CANDI system 100's unifying framework and open application APIs allow major manufacturers and service providers to quickly and easily extend their consumer services to offer the industry's most complete, personalized integration of energy management, entertainment, security, health monitoring and networked appliances.

The CANDI system 100 also reduces the cost of on-premises product installation by shifting labor-intensive device configuration and personalization to a web process. Highly-trained system integrators and programmers are no longer required to deploy smart appliances, which reduces the time and cost of deploying premises control by 50% or more.

The CANDI system 100 is globally deployable because it is product-agnostic and platform-agnostic. Product libraries, application suites, user accounts, domain setup and product selection may all be administered on the WEB. Secure control applications are also remotely accessible by a subscriber. Additionally, a small-footprint gateway stack, residing on-premises in a partner's local router, cable box or other CE product, is configured automatically by the NOC 101 for each unique domain 107.

Therefore, through its open application interfaces and device-agnostic integration and control capabilities via standard Web services, the CANDI system 100 decreases the installation costs of devices and increases a customer's choice of products, brands and user interfaces.

The following discussion includes the following six sections: (1) Managing a Domain; (2) Achieving a Uniform Device Abstraction Layer; (3) Maintaining a Domain; (4) Targeting Delivery Data; (5) Enabling Customized Functions to be Implemented at a Domain; and (6) CANDI system 100. Further, Section One begins with a broad description, via FIGS. 1B-1J, of various component operations of the CANDI system 100.

Section One: Managing a Domain

As described briefly above, the CANDI system 100 includes a system 111 (for managing devices within a domain 107) and a NOC 101, wherein the system 111 and the NOC 101 are connected over and communicate via the network 105. The following discussion, referencing FIGS. 1A-1J, provide an introduction to further functioning aspects of the CANDI system 100, while assisting the reader to understanding the management of the domain 107 within the larger framework of the CANDI system 100.

FIG. 1B shows the server 108 located at the premises 106, in accordance with an embodiment. With reference now to FIGS. 1A and 1B, the premises 106 includes a domain of devices, such as devices 110A and 110B (hereinafter, "device 110", unless otherwise noted), a personal computer 118 (optional), as well as the system 111 which includes the server 108. An exploded view of the server 108 shows the server 108 coupled with the following: a web service interface 114 that is itself coupled with a server 113; one or more databases 102; and (one or more protocols-specific) device drivers 115A, 115B and 115C (hereinafter with regard to FIGS. 1A-1I, "device driver 115" unless noted otherwise) coupled with (one or more protocols-specific) hardware 116A, 116B and 116C, respectively (hereinafter, with regard to FIGS. 1A-1I, "hardware 116" unless noted otherwise).

Significantly, the personal computer 118 is not required for interactions with the device 110. For example, a user can connect via any mobile or stationary computing device application to the server 113 in order to access the system 111 at the premises 106. In this manner, the user may configure the system 111, add equipment, and manage schedules and macros. Further, the personal computer 118 is also accessible using the server coupled with the local area network (LAN) of the NOC 101.

The premises 106 is coupled with, via the Internet 105, the NOC 101. The NOC 101 includes all protocol, device and security integration knowledge. The NOC 101 enables the user to configure devices, create macros and schedules, authorize user access and get support. Additionally, once configurations are complete with code, data, schedules, protocol interactions, etc., a customized download (e.g. application) may be downloaded from the NOC 101 to the system 111.

The server 108 connects on occasion to the NOC 101 to determine if the NOC 101 has tasks for the server 108 to download and process, for example third party system alerts, managing NOC 101 configuration, getting the latest control scripts, streaming (e.g. video, audio, photos), and remote access. The server 108 handles security interactions between protocols and has locked and unlocked modes for security. The server 108 also handles device initiated events which can trigger configured actions (e.g. macros, device actions) and the execution of macros and scheduled events. The server 108 may be resident on various forms of hardware (e.g. standalone box, router, cable set-top box). The server's 108 connection to the NOC 101 is established through an outbound HTTP-based polling process, so that no domain router/firewall changes are required on the premises 106 for the system to operate.

The web service interface 114 is an interface that is used by all applications (CANDI configured) to communicate with the device(s) 110. The device driver 115 is a protocol specific device driver that understands how to talk to the hardware 116 (the protocols-specific hardware). The device driver 115 is downloaded to the system 111 via the NOC 101, when needed.

The hardware 116 may be built into the server 108 or may be a pluggable or a network-addressed attachment (e.g. USB, RS-232, Ethernet).

The one or more databases 102 provide file storage on the server 108 for such items as server files (e.g. control scripts, macros, schedules, device data repository [e.g. camera, snap shots]), web pages for home management, pages created by the homeowner, and CANDI system 100 configured applications.

FIG. 1C shows the server(s) 113 located in a web environment (e.g. MySQL(s) 122) communicating with the server 108 on the premises 106, in accordance with embodiments. Other web environments may include, but are not limited to being the following: Linux; Apache; PHP; open-source tools.

With reference now to FIGS. 1A-1C, coupled with the server 113 are, but not limited to, the following entities and/or services: factory 123; partner services 124; public WEB 125; operations 126; and data services 127.

Services associated with the factory 123 include at least any of the following: ability to configure device information (e.g. name, location, ID); ability to configure application information (e.g. images, device locations); and creating and managing scenes and macros.

Services associated with the partner services 124 include at least any of the following: event (e.g. demand, message) management; export reports such as usage data; alarms about usage and other events; NOC 101 administrative and operational services; creation of groups of domains; and device unavailability alarms.

Services associated with the operations 126 include at least any of the following: drop-ship pre-configured devices to domains; and automatically discovering of device configuration information.

Services associated with the data services 127 include at least any of the following: demand response events and tracking; weather by domain location; resource usage rates; real-time events setup and triggering; real-time messages creation and queuing; and message transmittal (e.g. to email; SMS; twitter; applications).

Coupled with the server 108 is the application(s) 120. The application(s) 120 can either be hosted locally on the server 108 or natively on a computer 118 such as a mobile device or laptop. In regard to the application 120, HTTP or HTTPS is used to transmit communications between the application 120 and the server 108. A login is optionally required for such communication. In one embodiment, there is a REST/JSON interface for all requests, through which commands and data retrieval requests to/from devices 110 are "normalized" for ease of use by the application 120 (e.g. all device type "Lights" regardless of make, model or protocol are addressed by the application 120 through an identical POWER_ON, POWER_OFF command presented by the REST/JSON interface).

With regard to the relationship between the server 108 and application 120, the server 108 has "sync" capabilities over HTTPS and is enabled to be coupled with various hardware 116. The server 108 can perform device action management and subscription management (the application 120 gets notified when the action changes on the device 110) via the device driver 115 and associated hardware 116. Metered data from actions and reports from the device 110, and usage of the application 120, is archived.

The syncing 121 capabilities occur via Ethernet-based packets including HTTP, HTTPS, and UDP. They include, but are not limited to, the following: device configuration changes (e.g. names, scenes, ids); adding and removing devices; on-demand events and messages; updating the system 111 with new versions of software; archiving local data to the NOC 101; archiving polling device data to the NOC 101; server address information (including local and WAN IP, and host hardware MAC ID); downloading new local application 120 code and supporting files; creating a local configuration file which contains all current device and domain information for local use by applications; and data services deliveries.

FIG. 1D shows the server(s) 113 communicating with the server 108 on the premises 106, in accordance with embodiments. FIG. 1D enables the discussion of the method of operation of the CANDI system 100, in accordance with embodiments.

With reference now to FIGS. 1A-1D, first, the configuration applications run on the server 113, using a database 129

(that is already CANDI system 100 configured). Once all the configuration applications have been run on the server 113, then the server 113 talks to the system 111 and downloads all appropriate information/drivers for the system 111 to coordinate with the application 120 for the purposes of controlling and monitoring the domain 107 and its associated devices 110. The application 120 that was configured by the server 113 makes a request of a control operation to be performed. If/when the web service interface 114 accepts this request, the request is written to the one or more databases 102. A device driver 115 polls the database 102 frequently for new requests and acts on these requests as appropriate. In one embodiment, the device driver 115 may be a "Z-Wave" device driver, and the hardware 116 coupled therewith may be a Z-Wave radio transceiver. In one embodiment, a device driver 115 detects a monitored event from a device 110 via the hardware 116, and writes the event to the one or more databases 102. A scheduler 130 is always monitoring the one or more databases 102 for scheduled timed events, and the occurrence of real-time events. The scheduler 130, in one embodiment, runs strings of predetermined requests ("macros") as appropriate (e.g. from events, schedules, or users).

Figure 1E:
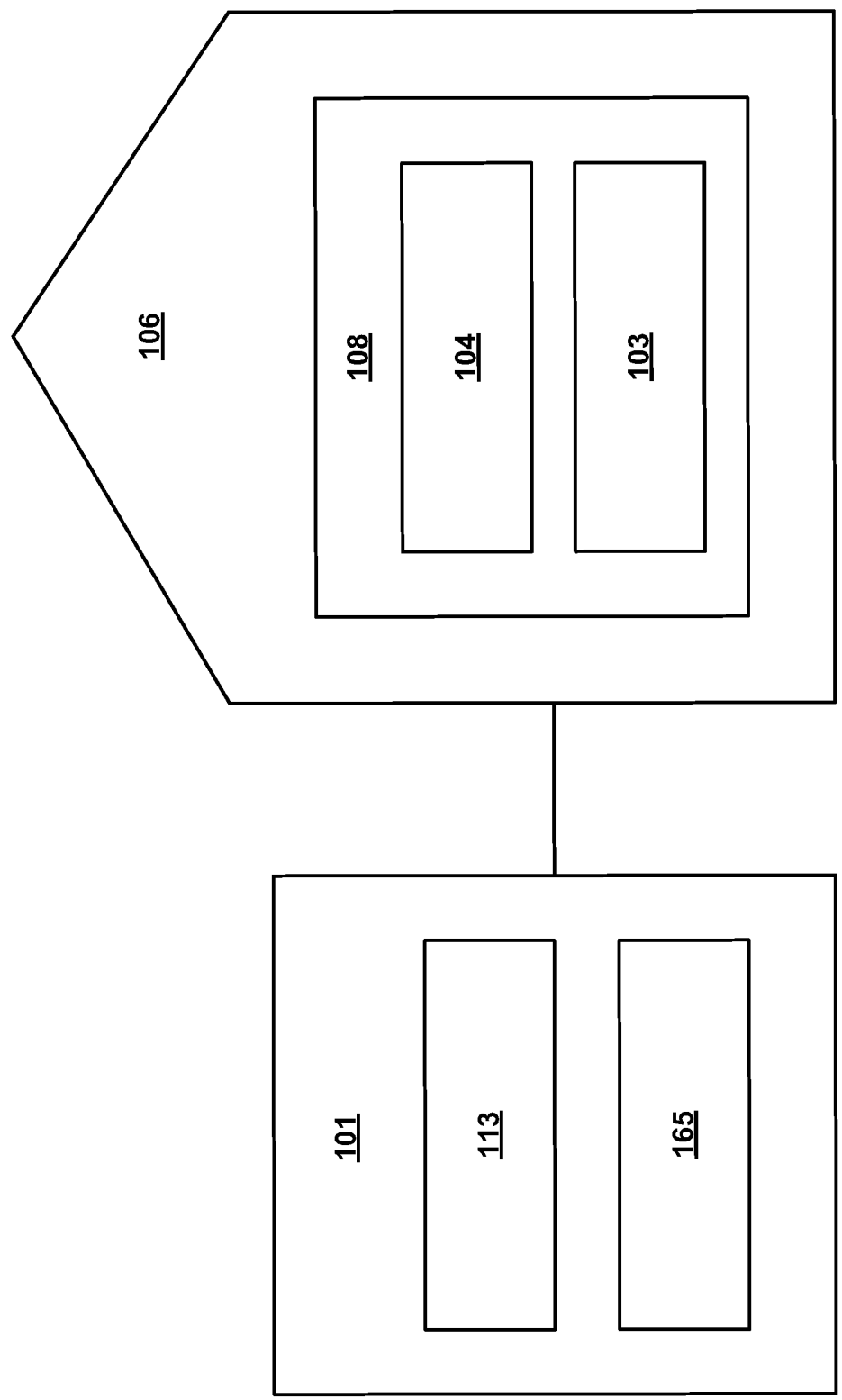
FIG. 1E is a block diagram showing a server 108 on a premises 106 couple with a server 113 at a Network Operations Control 101, in accordance with an embodiment.

FIG. 1E shows the server 108 on the premises 106 coupled with the server 113 at the NOC 101, according to an embodiment. With reference now to FIGS. 1A-1E, the server 108 holds system 111 related data and application data. In one embodiment, the system 111 data and the application data are controlled by the same server, which could be server 108 or a server on server 108. However, in another embodiment, the system 111 data is controlled by the server 104 and the application data is controlled by application server 103.

The system 111 data is data having at least any of the following characteristics: that data which is needed for the system 111 to work; queryable by applications for the current web environment 122; web service queryable data (e.g. device ID, name, type of device, brand, model, available actions); and system 111 used data (e.g. control scripts, protocol driver information, user login information).

The application data is that data having at least any of the following characteristics: application data that is served up by the server 108; type of computer hosting the application; application usage information such as web analytics; user screen layouts and page configurations; and user information.

The one or more databases 165 coupled with the server 113 may be at least any of the following: a database holding application information; a database holding current domain configurations; and a data base holding device information. Of note, all information may be held by one database at the server 113, or by more than one database 165 at the server 113.

The database holding application information holds information such as, but not limited to, user screen layouts and information about how the application is intended to work. The database holding current domain configurations holds information such as, but not limited to, the current configuration for every premises 106, devices, macros, users, and a copy of the data associated with the system 111. The database holding device information holds information such as, but not limited to, all the devices that are supportable in the system 111, and models and scripts.

Figure 1F:
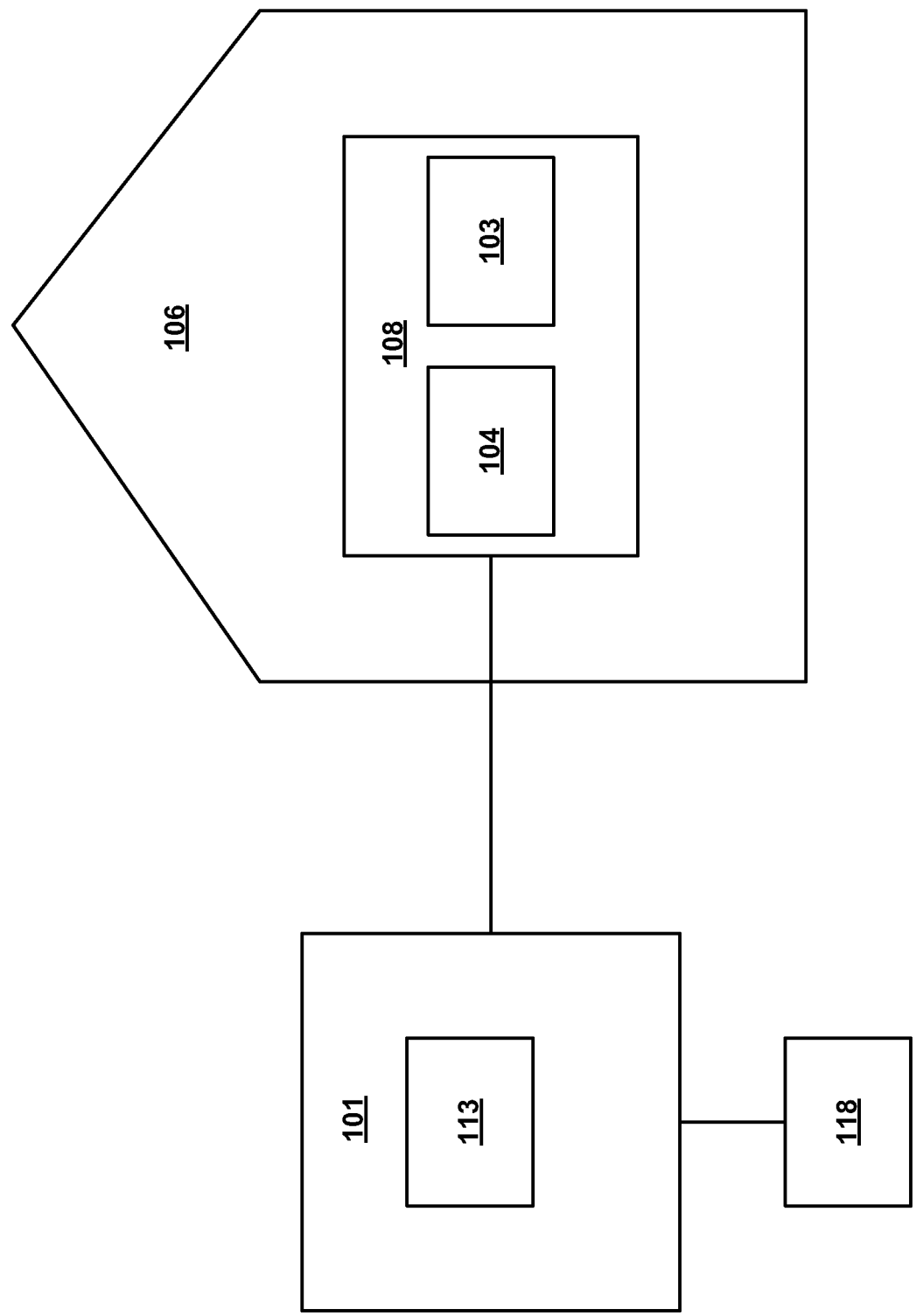
FIG. 1F is a block diagram of a server 108 on a premises 106 coupled with a server 113 at the Network Operations Control 101, in accordance with an embodiment.

FIG. 1F shows the server 108 (having a server 104 and an application server 103) on the premises 106, wherein the server 108 is coupled with the server 113 (residing on the NOC 101), according to an embodiment. With reference now to FIGS. 1A-1F, in one embodiment, the user logs into the server 113 at the NOC 101 from their personal computer or mobile phone 112, and requests that a configuration application be run, such that the user is allowed to configure the premises 106 with the right equipment, etc., already installed in their home. The user also chooses all applications that they are interested in using in their home. Then, once the configuration is finished, the user sets the system 111 to a status of "Config Complete". This status setting triggers the NOC 101 to synchronize the server 108 with the executed configuration. By synchronizing, for example, the device configurations, application data/images, macros, and schedules are configured to operate properly with the applications 120 to be installed and thereby to control and monitor the devices 110 in the domain. As partially described herein, the server 131 includes information such as the user's information, devices, device information, products, product information, and other relevant database tables.

Figure 1G:
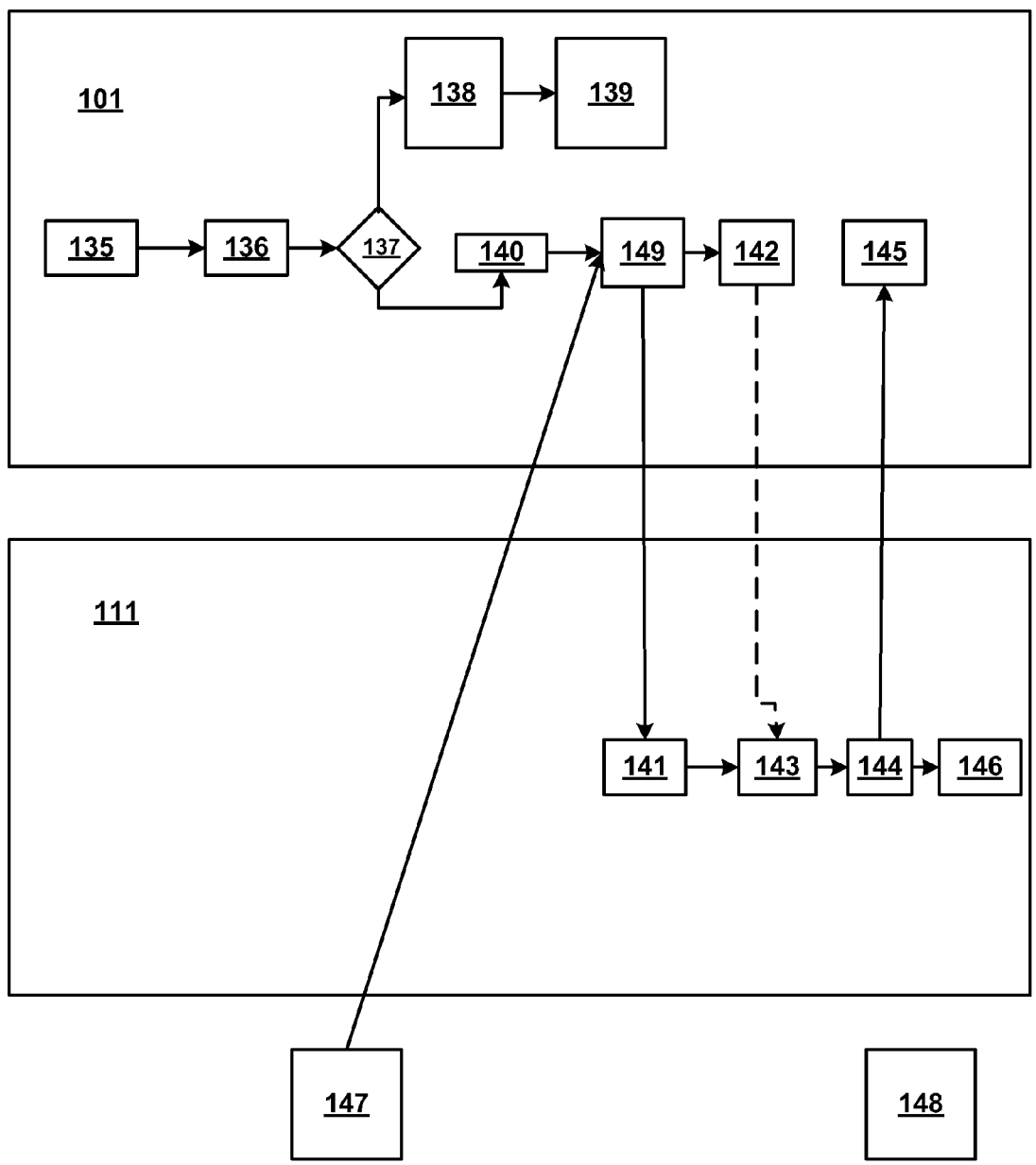
FIG. 1G is a flow diagram of the relationship between the NOC 101 and the system 111 during a device configuration process, according to an embodiment.
Figure 1H:
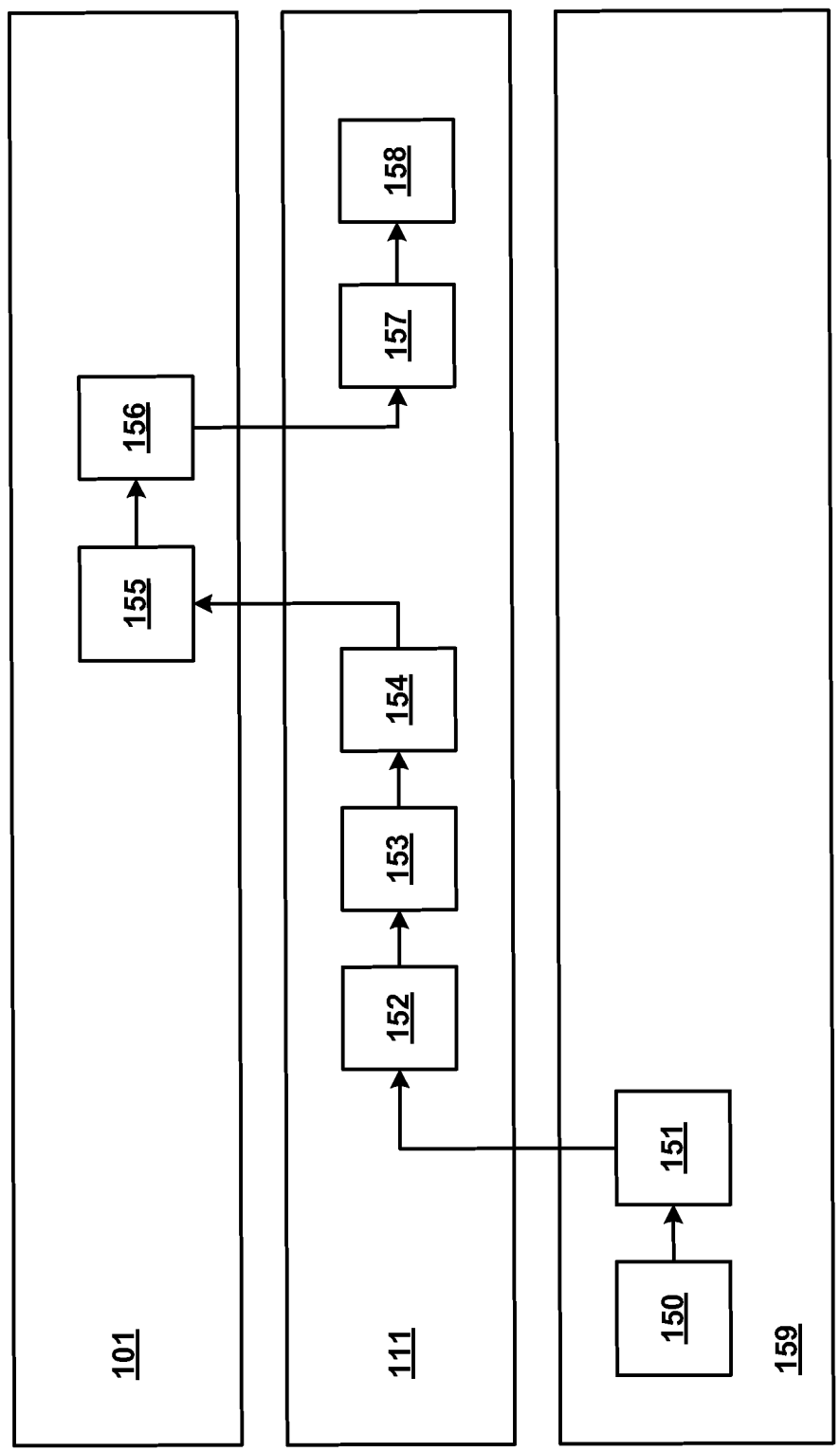
FIG. 1H is a flow diagram of the relationship between the NOC 101, the system 111, and the factory that manufactures the server 108, according to one embodiment.

FIG. 1G shows a flow diagram of the relationship between the NOC 101 and the system 111 during a device configuration process, according to an embodiment. With reference now to FIGS. 1A-1G, within the NOC 101, at 135, the user addresses the issue of configuration for devices on the premises 106. At 136, the user chooses a device 110 (e.g. off-the-shelf product) to put into the premises 106. At 137, it is decided if there is a server 108 ready at the premises 106 to address the configuration request. If there is not a server 108 already installed, then at 138, the user is only able to change the label of the device 110. At 139, the device 110 stays in the preinstall state until the server 108 (and other necessary components, or even the device itself) arrives at the premises 106.

If the server 108 already exists in the premises 106, then, at 140, the user selects the server 108. Once the server 108 is selected, then at 149, a "JOIN" command is sent from the NOC 101 to the server 108. At 141, the server 108 receives the JOIN request and goes into the JOIN mode. Further, the server 108 returns a confirmation of the JOIN mode. At 143, the server 108 accepts the new device JOIN. At 144, the server 108 uploads the new device information to the NOC 101. At 145, the NOC 101 receives and saves the uploaded new device information. The server, at 146, updates the one or more databases 102. As an alternative, after the sending of the JOIN command is ordered at 140, at 142, the user is told to press a button on the device 110 to join. If the user wishes to remove a device from the domain, then instead of the JOIN command being sent at 140, a REMOVE command is sent at 147. At 148, pre-install devices are flagged.

Figure 1I:
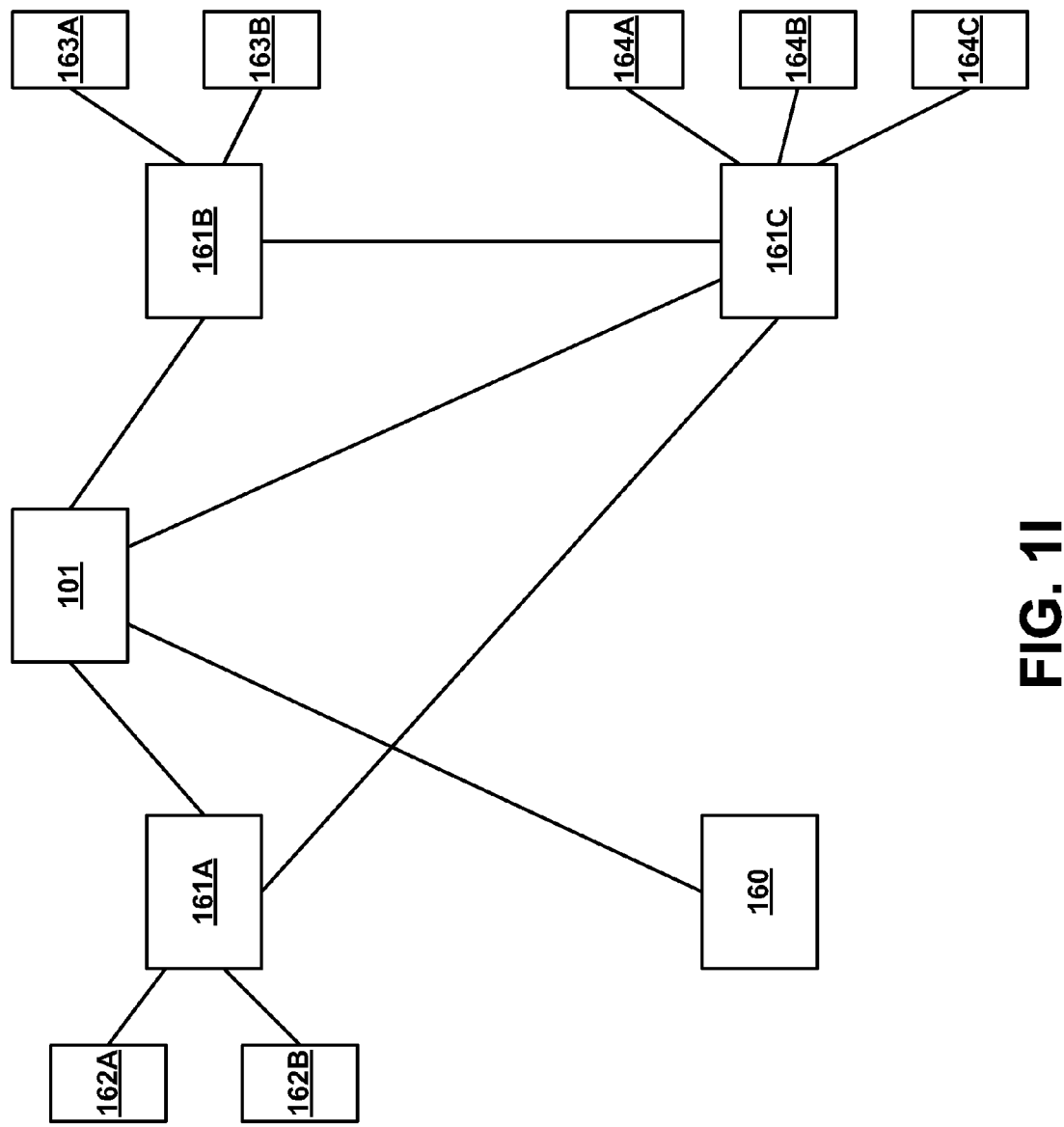
FIG. 1I is a block diagram of more than one server coupled with the NOC 101 over a LAN and responding to an application running a macro, in accordance with an embodiment.

FIG. 1I shows a flow diagram of the relationship between the NOC 101, the system 111, and the factory that manufactures the server 108, according to an embodiment. With reference now to FIGS. 1A-1I, at 150, during the manufacturing (staging 159) of the server 108, a configuration file is created. Of note, the following are some characteristics of the configuration file: the type, make and model of the server's host hardware; the MAC ID of the server's host hardware; and the NOC IP address to which the server synchronizes. At 151, the server 108 is shipped to the customer. At 152, the server 108 arrives at the premises 106. At 153, on powerup, the server 108 starts synchronizing automatically with the NOC 101.

At 154, the server's 108 configuration information is sent to the NOC 101. Of note, the following additional characteristics of the server's configuration are known at this step: server's unique identifier within the NOC; the server's local and remote IP address. Also, at 155, it is possible that the server 108 is auto-selected for the user since the server 108 is known.

At 155, the user selects the device that he/she wishes to add to the domain. At 156, a new server configuration file is downloaded. At 157, the server 108 receives the server configuration file. At 158, the server 108 is ready to integrate the new devices. Of note, the following additional characteristics of the configuration are known at this step: the type, make and model (and associated required device drivers and required hardware, if any) of the new device(s).

FIG. 1I shows a block diagram of more than one server (shown here as servers 161A, 161B and 161C) coupled with the NOC 101 over a LAN and responding to an application running a macro, according to an embodiment. With reference now to FIGS. 1A-1I, the diagram shows an application 160 communicating with the NOC 101 and the servers 161A, 161B and 161C, wherein the server 161C is the "Prime" server. Server 161A is coupled with device 162A (light) and 162B (meter). Server 161B is coupled with devices 163A and 163B (lights). Server 161C is coupled with devices 164A and 164B (lights), and device 164C (thermostat). Each server, 161A, 161B and 161C stays in sync with the NOC 101.

When a triggered event occurs for a device (whether polled or real), the event triggers a macro. The macro is run at the Prime server (server 161C). The application 160 finds the server 161C on the LAN in the following manner: the browser points to {userDefinedUniqueName}.candicontrols.com/{appName}; and the DNS managed by the NOC 101 returns the IP address for the device 161C (the Prime device), and the application starts running.

In the example given in FIG. 1I, the application 160 runs the macro that turns off all lights. In regards to the macro: the macro is set up in the NOC 101; the macro is ready to run on the device 161C (prime device ["zPrime"]); the application 160 sends RUN_MACRO to zPrime; the zPrime executes the macro; and the zPrime for the macro sends the command for each action to each responsible server. Thus, when the application 160 requests that light B be turned off, the zPrime sends the request to the server 161B to turn off the device 163A. With respect to the zPrime server: the scheduler 130 runs at this server only; macros are supported here only; applications are supported here only; and action requests (application, macro) to run actions on other server managed devices are sent to that server.

The above discussion, with reference to FIGS. 1A-1I, provides a framework for understanding for the following description of embodiments.

Figure 2A:
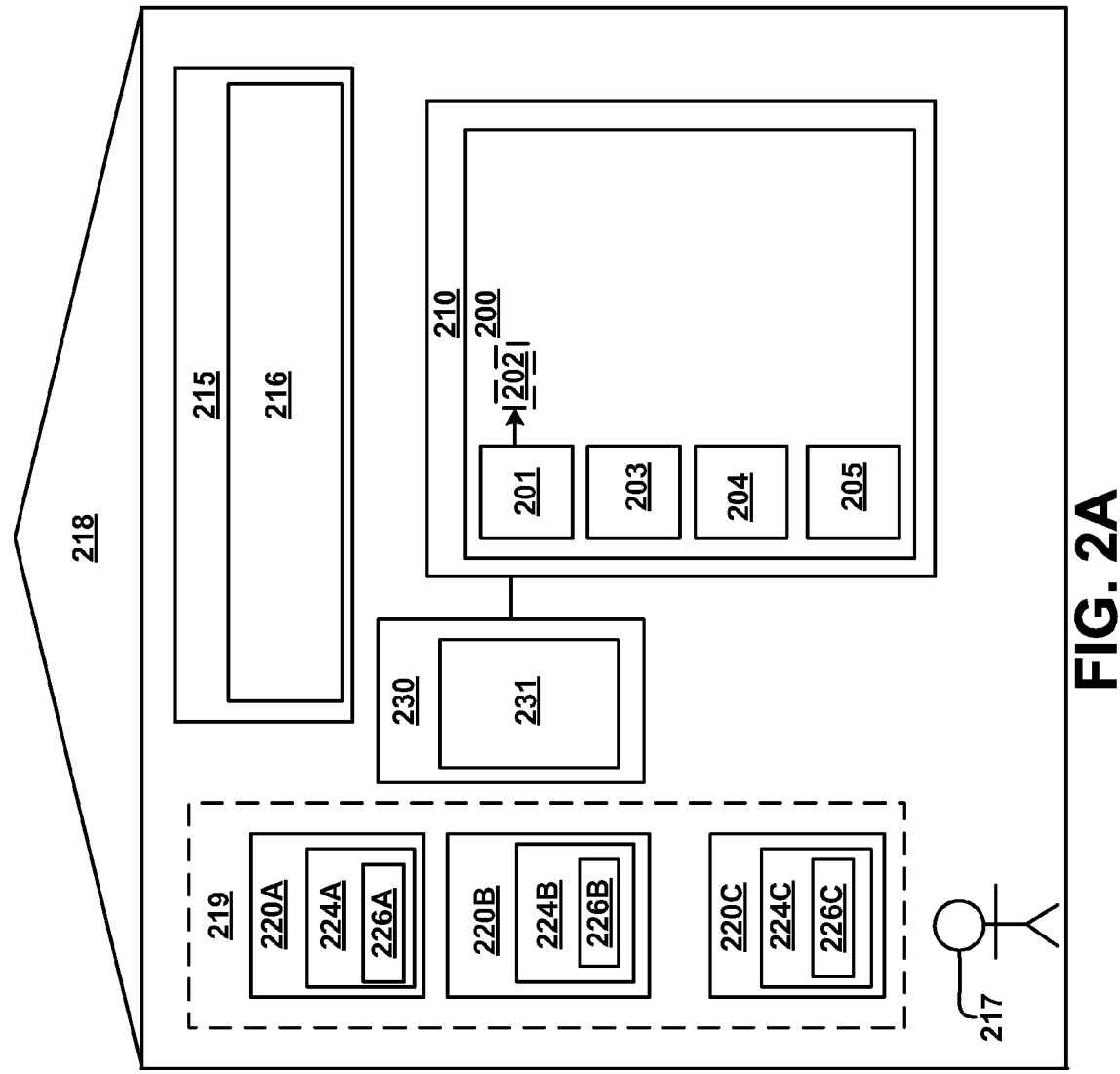
FIG. 2A is a block diagram of a system 200 for managing a domain in a premises, in accordance with an embodiment.
Figure 2B:
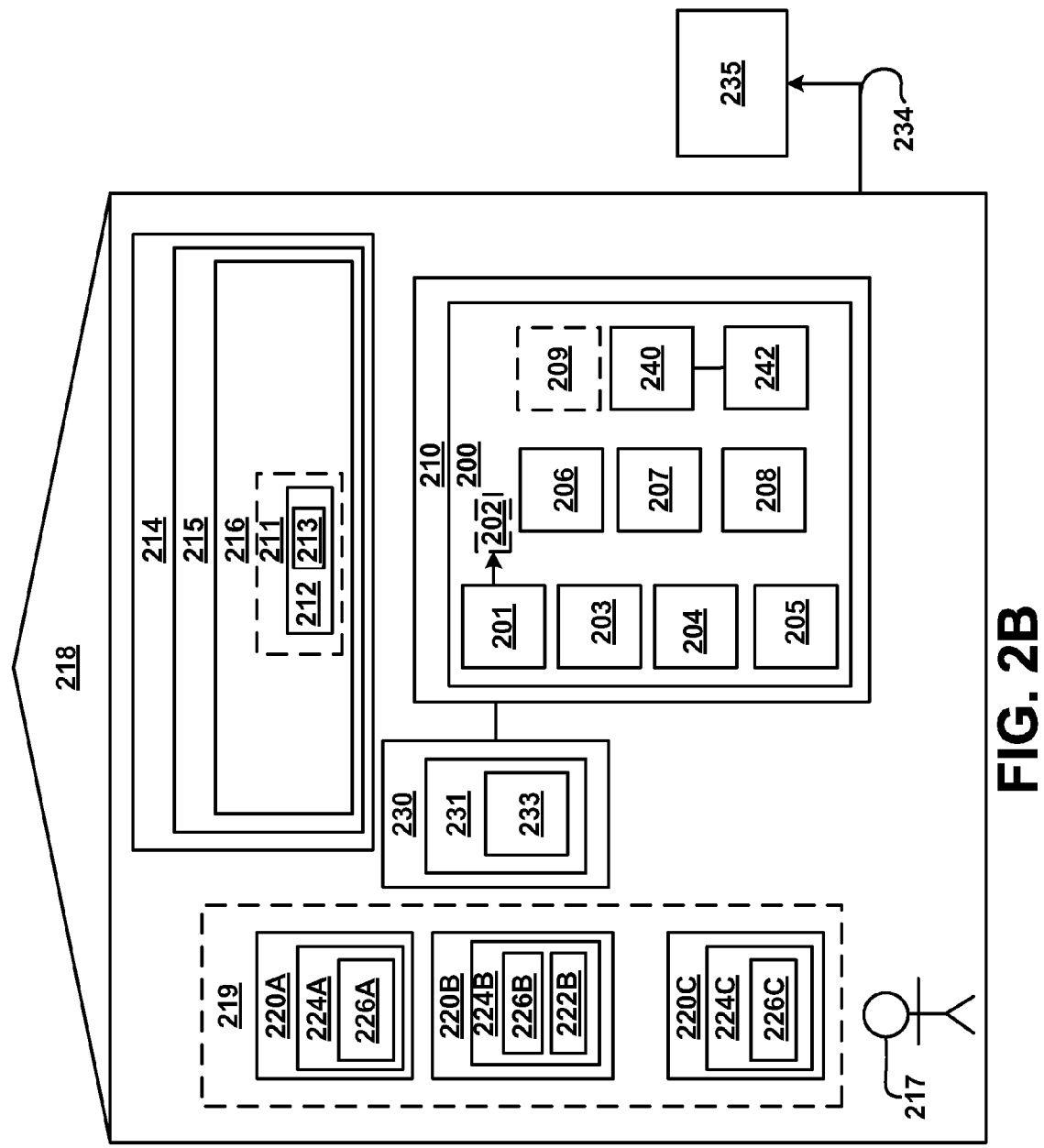
FIG. 2B is a block diagram of a system 200 for managing a domain in a premises, in accordance with an embodiment.

The system 111 of FIG. 1A includes a system 200 (see FIGS. 2A and 2B) for managing a domain 107, as will be described with reference to FIGS. 1A-2B below. FIGS. 2A and 2B show block diagrams of a system 200 for managing a domain 219 in a premises 218, wherein the domain 219 includes at least one device 220A, 220B, and 220C (hereinafter referred to as "device 220" unless specifically noted otherwise) configured for providing an action 202, according to embodiments. The system (and components thereof) 200 is coupled with a server 210 (e.g. analogous to the server 108 of FIGS. 1A-1J) and is configured to perform the function of the system 200 on a small-footprint computing device (e.g. router, cable TV box, at least one device 220 in the domain 219).

The system 200 is bought at a store, along with a device 220 and a piece of hardware. The buyer retrieves, on-line, downloaded information about the device 220. The system 200 informs the buyer of the location within the system 111 at which the device 220 is accessible. The software that is seen on the computer associated with the device 220 may be "branded" by the provider of the device 220 hardware.

The system 200 includes: an action identifier 201; a device driver determiner 203; a comparer 204; and a device driver implementer 205. In further embodiments, the system optionally includes: a gateway module 206; a data tracker 207; a data sender 208; a device searching module 240; and a device notifier 242.

The action identifier 201 identifies an action 202 to be mapped to a device (such as device 220B) of the at least one device 220, wherein the device 220 includes a communication port 224 that supports a first protocol 226. Of note, according to embodiments, "actions" are supported by device drivers that are specific to the system 200. However, device drivers may be designed to support more actions than the current version of the system 200 is able to implement. For example, a newer version of the system 200 installed on the server 210 may support the actions that are already supported by installed device drivers. Further, in embodiments, actions are standardized so that expected results can be achieved from a particular action, regardless of the vendor or protocol.

As shown in FIG. 2A, devices 220A and 220C includes communication ports 224A and 224C, respectively. Communication ports 224A, 224B and 224C will hereinafter be referred to as "communication port 224", unless specifically noted otherwise. Also, communication ports 224A, 224B and 224C include first protocols 226A, 226B and 226C (hereinafter referred to as "first protocol 226" unless specifically noted otherwise). As will be explained in further detail below, the communication port 224 supports the first protocol 226 of the device 220.

In embodiments, the communication ports 224A, 224B and 224C include physical communication methods 222A, 222B and 222C, respectively (hereinafter referred to as "communication method 222" unless noted otherwise, only communication method 222B is shown in FIGS. 2A and 2B). This communication method 222 may be any of, but not limited to, the following: infrared; z-wave; Zigbee; serial; IP; X-10 RF; Ethernet; and USB.

In one embodiment, the physical communication method 222 is coupled with a legacy device 220C, in this instance, such that the legacy device 220C is compatible with a functioning of the system 200.

For example, but not limited to such example, a third party may connect via the network 105 to the server 210. The third party requests that its developed third party application be run on device 220B within the domain 219. Once receiving this request, the action identifier 201 of the system 200 identifies the action(s) 202 associated with the third party application that is requested to be run on the device 220B.

Next, the device driver determiner 203 determines a device driver 230, for example, that supports a second protocol 231, wherein the second protocol 231 supports the action 202 that was identified. For example, the device driver determiner 203 determines what device driver (located at the premises 218), if any, that includes the protocol which will support the functioning of the action 202 associated with running the third party application on the device 220B. Device drivers are coupled with devices, such as device 220, and are built specifically for a supporting a protocol an n number of actions, such as action 202.

The comparer 204 compares the second protocol 231 with a domain configuration store 215. The domain configuration store 215 includes device configuration information 216 for the at least one device 220, and more specifically, for device 220B. The device configuration information 216 includes information regarding the devices 220, such as what protocols are supported by the communication ports 224 disposed thereon. In the example given regarding the third party application being requested to be run on the device 220B, the comparer 204 determines if the first protocol 226B corresponds to the second protocol 231 supported by the device driver 230. The term, "corresponds" refers to a matching, or a substantially matching circumstance in which the first protocol 226B is the same or substantially the same as the second protocol 231, such that the action 202 may be performed since the device 220B is supported by an appropriate device driver 230. Thus, without a device driver 231 that is able to support the requested actions 202 to be run on the device 220B, it would not be possible for the third party application to be run on the device 220B.

The device driver implementer 205 implements the device driver 230 when the first protocol 226 corresponds to the second protocol 231 such that the action 202 is enabled for performance. In other words, if it is found that the first protocol 226 and the second protocol 231 of the device driver 230 at least substantially match in terms of performing the action 202 that was identified, then the device driver 230 is implemented. The term, "implemented", refers to the designation that an action 202 is directed to be performed using the device driver 230. Thus, once it is determined that the first protocol 226B of the device 220B corresponds to the second protocol 231 of the device driver 230, then the device driver 230 is implemented, such that the action(s) 202 relating to running the third party application may be performed.

Thus, embodiments automatically map the actions requested to be performed to a device that is capable of supporting the actions, by discovering device drivers that also support a protocol supported on a communication port of that device.

Domains 219 are identified by a unique combination of subscriber name and domain address. Devices 220 within the domain 219 can be populated and edited on the site in real time. Domain configurations are saved to the domain configuration store 215 as device configuration information 216. Devices 220 are validated and auto-mapped within the domain 219. The local application is recompiled and synchronized to the domain's universal bridge.

In the system 111, a manufacturer's product (which is desired to become a device 220 located at the premises 218) is characterized and implemented to become a device 220. Examples are end-point control products (e.g. "light dimmer", "DLNA TV") and protocol bridges (e.g. "Global Cache IP-to-Infrared Bridge" or the server 210). The manufacturer's product is further uniquely characterized by their particular manufacturer ("Make") and "Model" number.

Every CANDI system 100-addressable product is further characterized with one or more communication ports 224, which are defined by their physical communication method (e.g. infrared, z-wave, Zigbee, serial, IP, X-10, RF, etc.), and by a protocol running over that communication port 224. Once a communication port 224 and protocol have been defined for a device 220, the system 200 or third-party device driver developers determine whether that communication port 224 requires field-determined information concerning its configuration. For example, if a device 220 has a communication port 224 with a z-wave physical communication method 222, then the device driver 230 must include a data field for the individual z-wave node address on that communication port 224. A single communication port 224 may require more than one port data filed, such as both address and login information.

Based on the protocol 226 that is supported on the communication port 224, the system 200 maps the action(s) 202 supportable by the device 220 by discovering device drivers, such as device driver 230, that also support that protocol 226 (presuming a device driver implementer 205 is coupled with the server 210).

In one embodiment, the gateway module 206, coupled with the server 210, manages an application 209. Of note, while the application 209 is shown to be residing and native to the server 210, it should be appreciated that the application may be downloaded and be running on devices such as phones, computers, etc. that may be located on the premises 218 or be remote from the premises and are able to communicate with the server 210. Thus, the application 209 need not be served from the server 210, but from a device remote from the server 210. The downloaded application 209 controls the at least one device 220. The downloaded application 209 has access to the system 200 in order to control the devices 220, by, via the gateway module 206, calling (handling) macros, polling for device status, accessing historic data, etc.

In one embodiment, the data tracker 207, coupled with the server 210, tracks data 234 associated with the at least one device 220. For example, in one embodiment, the data tracker 207 tracks diagnostic information for every device, such as, but not limited to: communications routing; the hops between the server 210 and the device 220; the radio strength; and communication attempts and failures. This diagnostic information is uploaded and stored in the database of NOC 101 for aggregation and presentation of metrics through the NOC 101 software. In another embodiment, the data tracker 207 performs any of the following: tracks every request made; which user made a request; and when the request occurred. Essentially, the data tracker 207 tracks and reports different kinds of data for different devices and needs.

In one example, for energy management, logs are kept on the system 200 for between 15 minute and up to 2 months. Data beyond that is archived at the NOC 101. The storage location is transparent to the system 200 (although the retrieval time will be a little longer for data retrieved from the NOC 101).

In one embodiment, the data sender 208, coupled with the data tracker 207, sends tracked data to a remote location 235. This remote location may be the NOC 101 or a component coupled with the NOC 101, such as the remote server. Hereafter, the remote server is denoted to be "server 235" residing on the NOC 101. This tracked data is stored at the NOC 101 in a database or a component coupled with the NOC 101 for aggregation and presentation of metrics via the NOC 101 software.

In one embodiment, the device searching module 240, coupled with the server 210, discovers a device, such as device 220B, of the at least one device 220 on the premises 218. For example, when a new device is added to the premises 218, then the device searching module 240 "discovers" that this new device exists. In one embodiment, the device notifier 242, coupled with the device searching module 240, notifies a subscriber 217 of the discovered device 220B.

In one embodiment, the system 200 automates the control of different devices 220 with different protocols 226. The "automating" of the control of the different devices is different from "talking" to different devices. For example, the energy consumption levels for a premises 218 may be adjusted by applying internal and external envelope characteristics to heating, cooling and lighting systems within the premises 218. This process may be termed to be "environmentally-driven hysteresis". Thus, the system 200 tailors an environment to a person. For example, when it is very cold outside and one walks into a house (premises 218), the house feels warmer than it really is. The system 200 provides for an action 202 in anticipation of this feeling, and turns the heat down in the house. This functioning provides significant energy savings.

Furthermore, device drivers, such as device driver 230, may be populated and edited via a proprietary web sit in real time.

In one embodiment, the system 200 pre-categorizes content across all available sources. The order of the pre-categorized content is by hierarchy instead of location. In contrast, the current method by which DLNA compatible devices reveal media content is by location. Libraries of content within a network are organized by device (location) and not by the content (e.g. music) itself.

Figure 2C:
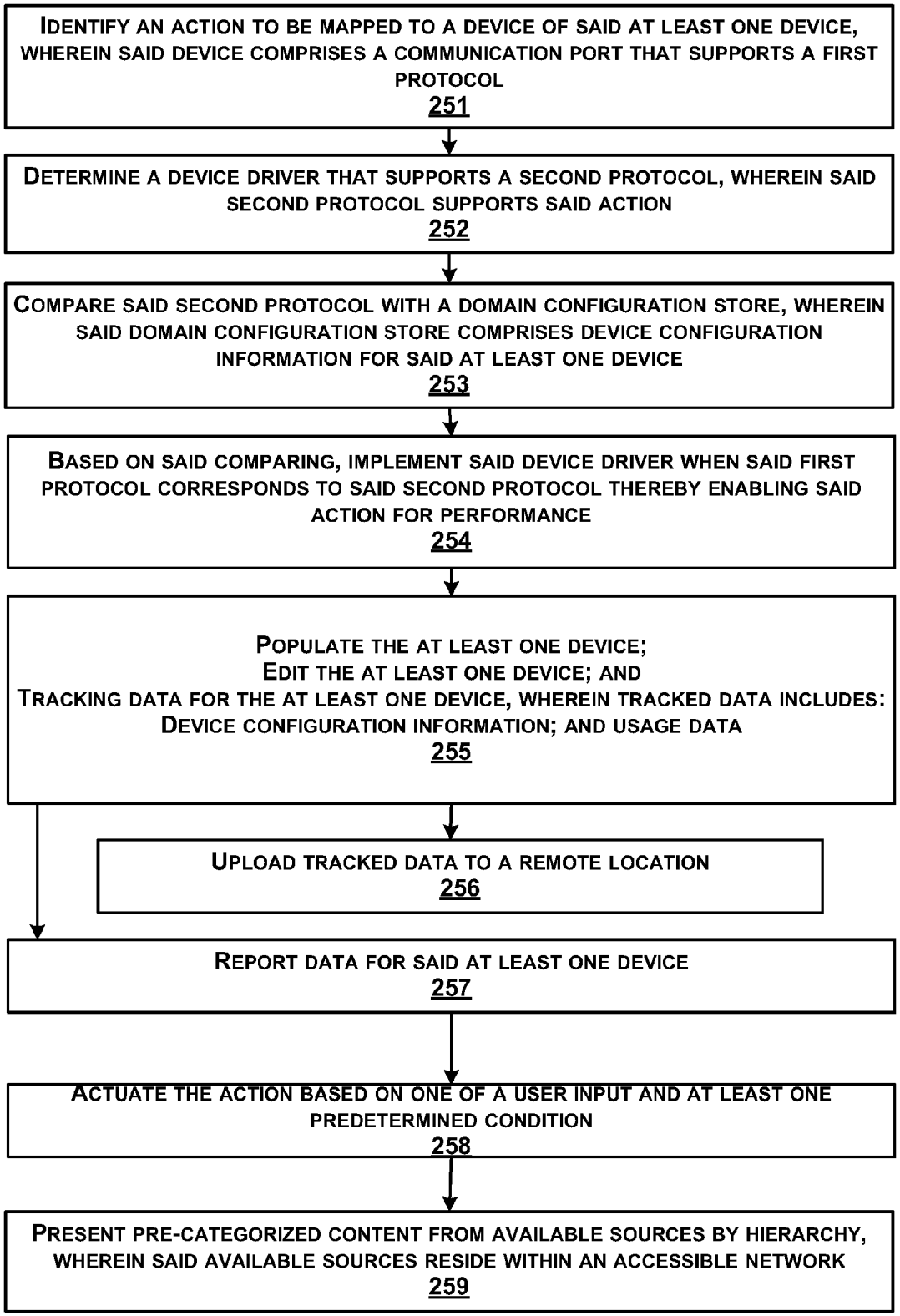
FIG. 2C is a flow diagram of a method 250 for managing a domain, in accordance with an embodiment.

FIG. 2C is a flow diagram of a method 250 for managing a domain 219, in accordance with embodiments. In one embodiment, method 250 is embodied in instructions, stored on a non-transitory computer-readable storage medium, which when executed by a computer system (see 700 of FIG. 7), cause the computer system to perform the method 250 for managing a domain 219. The method 250 is described below with reference to FIGS. 1A-2C and 7.

At 251, in one embodiment and as described herein, the method 250 includes identifying an action 202 to be mapped to a device, such as device 220B of the at least one device 220, wherein the device 220B includes a communication port 224B that supports a first protocol 226.

At 252, in one embodiment and as described herein, the method 250 includes determining a device driver, such as device driver 230, which supports a second protocol 231, wherein the second protocol 231 supports the action 202.

At 253, in one embodiment and as described herein, the method 250 includes comparing the second protocol 231 with a domain configuration store 215, wherein the domain configuration store 215 includes device configuration information 216 for the at least one device 220.

At 254, in one embodiment and as described herein, the method 250 includes, based on the comparing at 253, implementing the device driver 230 when the first protocol 226B corresponds to the second protocol 231, thereby enabling the action 202 for performance.

At 255, in one embodiment, the method 250 includes; populating the at least one device 220; editing the at least one device 220; and tracking data for the at least one device, wherein the tracked data includes: device configuration information 216; and usage data. It should be appreciated that the populating, editing and tracking denoted at 255 may be performed separately in one embodiment, and in various combinations in other embodiments.

By populating, it is meant that the system 200 updates and/or edits the application associated with the at least one device 220. In another embodiment, the at least one device 220 is enabled to be populated manually by a user. In one embodiment, the at least one device 220 is enabled to be edited manually by a user. Additionally, the following data may be tracked: diagnostic information; a request made by the user; which user made the request; and when the request occurred. The tracking of diagnostic information for the at least one device 220 includes: communications routing; hops between the server and the device; radio strength; and communication attempts and failures.

At 256, in one embodiment and as described herein, the step 255 further includes uploading the tracked data to a remote location 235. It is discussed herein that the remote location 235 is the server 235 of at least FIGS. 3A-4C.

At 257, in one embodiment and as described herein, the method 250 further includes reporting data for the at least one device 220. The reporting may be provided locally, at the premises 218, or to a remote location (e.g. NOC 101).

At 258, in one embodiment and as described herein, the method 250 further includes actuating the action 202 based on one of a user input and at least one predetermined condition. For example, the device 220B may be adjusted by the system 200 to be a predetermined condition (e.g. energy saving instructions given to a thermostat, such that the thermostat lowers itself). The user input is an input given to the system 200, directly or indirectly, by a user.

At 259, in one embodiment and as described herein, the method 250 further includes presenting pre-categorized content from available source by hierarchy, wherein the available sources reside within an accessible network.

Section Two: Achieving a Uniform Device Abstraction Layer

As discussed above, the CANDI system 100 includes a system 111 for managing devices within the domain 107 and the NOC 101. The NOC 101 interacts with the system 200 of the system 111, to achieve a uniform device abstraction layer. The uniform device abstraction layer, in one example, enables a third party developer to develop applications to be run on at least one device in the domain, without needing to know anything about the device or the protocol on the device driver associated with the device.

Figure 4A:
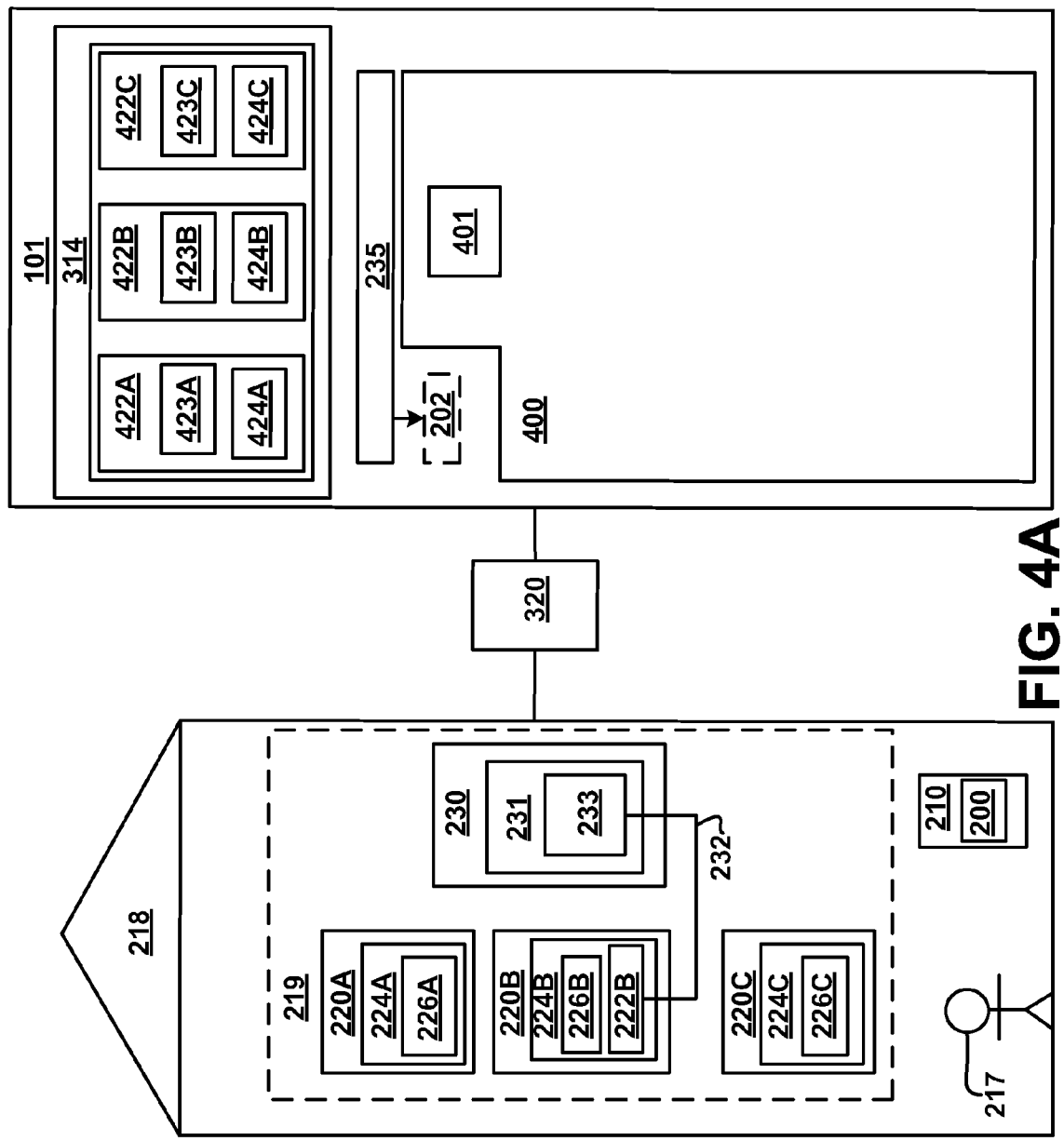
FIG. 4A is a block diagram of a system 400 for achieving a uniform device abstraction layer, in accordance with an embodiment.
Figure 4B:
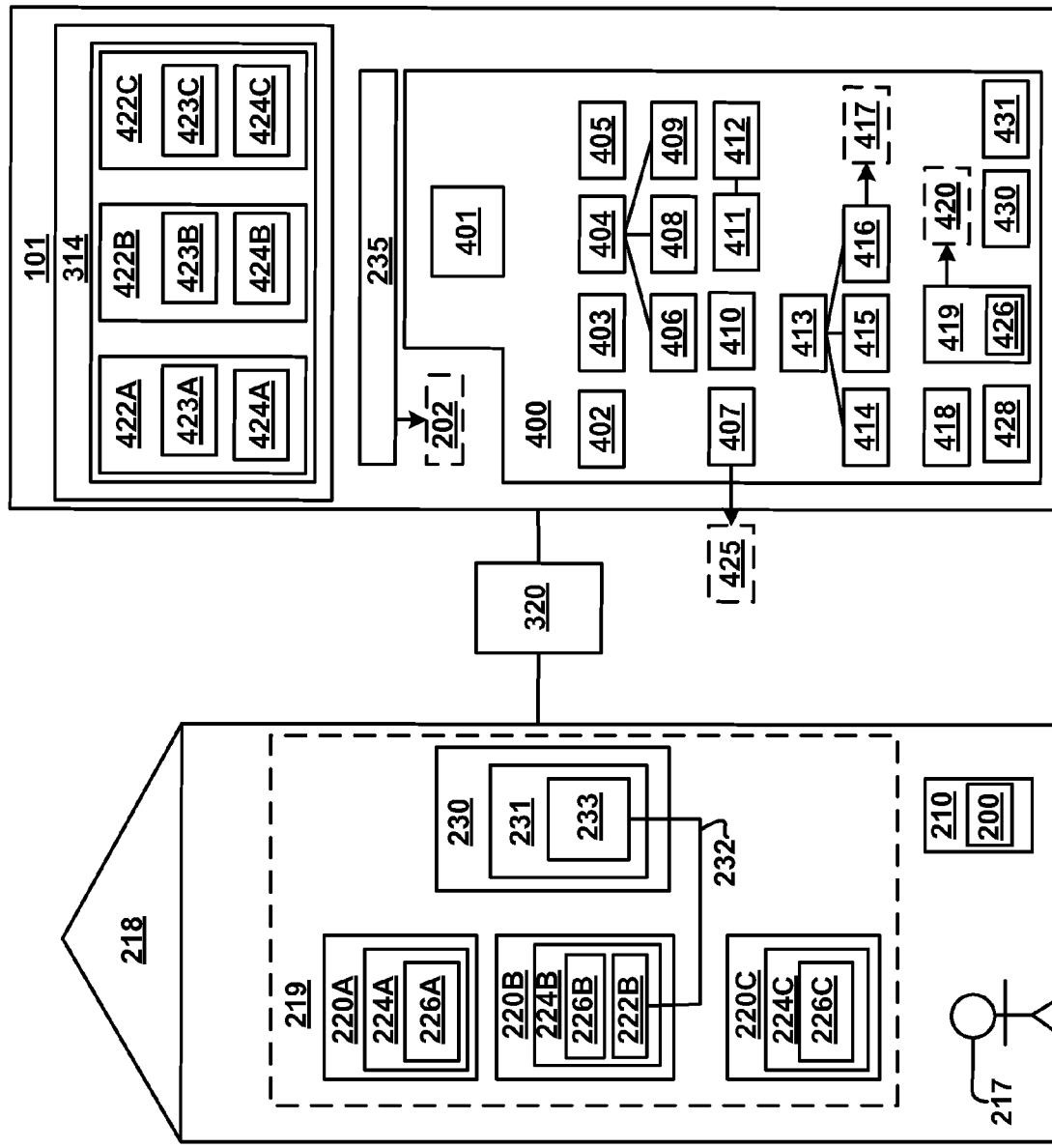
FIG. 4B is a block diagram of a system 400 for achieving a uniform device abstraction layer, in accordance with an embodiment.

FIGS. 4A and 4B show a block diagram of the system 400 for achieving a uniform device abstraction layer, in accordance with an embodiment. With reference now to FIGS. 1, 2A-2C, and 4A and 4B, in one embodiment, and as will be described below, the system 400 includes a device class determiner 401 that is coupled with the (local) server 235. The system 400, in various embodiments, optionally includes any of the following: a threshold notifier 402; an updated information requester 403; a data receiver 404; a data comparer 406 coupled with a data set determiner 407; a history reporter 408; a trend projector 409; a recommendation generator 419 having optionally a data analyzer 426; an action initiator 418; an action comparor 415; a subscriber data receiver 413 coupled with a subscriber grouper 416; a subscriber data receiver 413 coupled with a subscriber manager 414; a web service accessor 411 coupled with a subscriber information comparor 412; a registration processor 410; a subscriber tunnel initiator 431; a third party tunnel initiator 428; and a device discovery module 430.

The device class determiner 401 establishes a device class 422 (See device classes 422A, 422B and 422C located at the database 314 [hereinafter, "device class 422" unless noted otherwise].) for at least one device 220 residing in a domain 219 of the premises 218. The device class 422 refers to a device 220 that would fit within a type of devices, such as a "light dimmer" in a device class, "lights", incorporating all light related products from various companies, or a thermostat from Company A in a thermostat class, "thermostats", incorporating all thermostat products from various companies. For example, when the system 400 adds a new "Light Dimmer" product to its (local) database 314, it is added with planning and precision so that it is uniformly treated the same as existing products in the database 314.

Other possible device classes may be, but are not limited to, the following list: energy monitors; light dimmers and switches; plug-in modules; electrical infrastructure; solar systems; smart grid; security systems; cameras; health products; control systems; door locks; window coverings; audio/video components; appliances; network and bridges; and communications and services.

Based on the establishing of a device class 422, an action 202 is enabled to be mapped to the device, such as device 220B, thereby enabling an application to be built and run on the device 220B, wherein the application utilizes a capability of the device 220B.

As explained herein, the at least one device 220 resides in a domain 219 of a premises 218. The domain 219 is coupled with the (remote) server 210. A device, such as device 220B of the at least one device 220 includes the communication port 224B that supports a first protocol 226B that corresponds to the second protocol 231. The second protocol 231 is supported by a device driver, such as device driver 230, which is also coupled with the domain 219.

The CANDI system 100, including the system 400, achieves the uniform device abstraction in the following four dissimilar cases: (1) similar devices in a domain 219 may operate with different protocol versions and therefore different actions. For example, a General Electric z-wave light that is 2 years old supports a z-wave version 1.0 while a newer General Electric z-wave light in the same domain 219 supports a z-wave version 2.0; (2) different devices may implement different actions over the same protocol. For example, a General Electric z-wave light dimmer supports data subscriptions, but Lutron's z-wave light dimmer does not support subscriptions; (3) across all CANDI system 100 domains, there exist different versions of device drivers supported for the same products. For example, the Tivo Device Driver at Bob's house is a CANDI system 100 version 1.0, but at Steve's house, it has been updated to version 2.0. Both versions are running on the same bridge hardware; and (4) enables uniformity in the case of a new product being available and the CANDI system 100 has the device driver 230, but the subscriber may have an older version of the server 210 that does not support the newest device driver. The database 314 would not allow the newest product to be added to that subscriber's domain 219 until the subscriber upgrades his/her firmware or bridge. For example, Silver Spring's electric meter requires a USB key to access its data log, but the subscriber's bridge does not have a USB port.

Further, embodiments provide for uniform remote provisioning of web-based services generically across the CANDI system 100 so that schedules, scenes/macros, backups, online configuration, etc., are all available easily to the developer regardless of their device, protocol, control platform or application choices. The CANDI system 100 is agnostic about integrating web services.

The threshold notifier 402 is coupled with the server 235 and notifies an entity when a threshold is achieved. An entity may be the subscriber 217 or a third party connected to the system 400. Thus, based on internally and/or externally performed data analysis, a notification is provided by the threshold notifier 402 to an appropriate entity when a threshold is met and/or exceeded.

The updated information requester is coupled with the server 235 and requests updated information from the (remote) server 324. This updated information may include, but is not limited to: new devices available at the premises 218; and ongoing information gathered from monitoring the domain 219.

The data receiver 404 is coupled with the server 235 and receives data from an external source. The external source is from an entity external to the system 400. The data storer 405 is coupled with the data receiver 404 and stores the data in the database 314 that is coupled with the server 235.

The data comparer 406 is coupled with the server 235 and compares received data with the database 314. The data set determiner 407 is coupled with the data comparer 406 and determines a set of data 425 that meets a predetermined condition based on the comparing of the data comparer 406. For example, after receiving information of a particular device and a competing device, a determination and comparison is made as to the energy efficiency of each device compared to each other. In another example, the system 400 compares the total or partial energy usage of neighbors of a subscriber 217 with the subscriber 217 (assuming the neighbors are also subscribers to the CANDI system 100).

The history reporter 408 is coupled with the server 235 and reports a history of received data. For example, the history reporter 408 provides a history of a particular event(s) occurring at one or more servers, applications, etc.

The trend projector 409 is coupled with the server 235 and projects a future trend on received data. For instance, in regard to time use rates, the trend projector 409 calculates and displays a customer's current rate and projects for the future, based on the customer's historical usage at the moment, when that customer will reach the next tier (given a tiered system of energy use corresponding to a dollar amount). In another example, in regard to predictive rate reduction, the trend projector 409 projects a rate to occur at the end of a billing cycle. In some situations, the season and rate program for that particular customer must be accessed. Additionally, input from the utility side is also needed.

The recommendation generator 419 is coupled with the device class determiner 401 and generates a recommendation 420 for a subscriber 217 based on data stored in the database 314, wherein the database 314 is coupled with the server 235. In one embodiment, the recommendation generator 419 includes the data analyzer 426 that analyzes the data stored in the database 314. For example, after receiving data, including device information, energy usage, usage of appliances, house temperature, seasonal temperature, the age of a refrigerator, etc., the system 400 sends a recommendation to the subscriber 217 to, "Turn down the temperature on your refrigerator". The data stored in the database 314, in one instance, is that received data gathered from devices monitored and the customer's use of the device's monitored. In another example, the recommendation generator 419, recommends alternating the use of two or more devices, in certain situations, in order to extend the life of at least one of the devices.

The action initiator 418 is coupled with the server 235 and initiates an action to achieve a predetermined criteria. The action initiator 418 may take a predetermined action based on an occurrence associated with a monitored device and/or the customer's use of that device. For example, the action initiator 418 initiates an action having the intent of meeting a predetermined budget, such as directing a thermostat to be lowered to reach the dollar amount allotted for heat for that particular billing cycle.

The subscriber data receiver 413 is coupled with the server 235 and receives data associated with different subscribers' actions. The action comparor 415 is coupled with the subscriber data receiver 413 and compares the different subscribers' actions with each other based on the received data. The received data is placed in the database 314, thereby expanding the amount of information within the database 314.

In another embodiment, a subscriber grouper 416 is coupled with the subscriber data receiver 413 and groups subscribers based on the received data. In this manner, the system 400 is able to analyze data and send massages regarding a certain bit of data. Having large numbers of subscribers enables the collection of large amounts of data. Being able to group similar data and send messages associated with the data enables greater advertising and revenue making possibilities.

In yet another embodiment, the subscriber manager 414 is coupled with the subscriber data receiver 413 and utilizes received data for managing at least one subscriber.

The web service accessor 411 is coupled with the server 235 and accesses a web service that requires a permission for such access. The subscriber information comparor 412 is coupled with the web service accessor 411 and compares the subscriber's information with information associated with at least one third party. For example, the web service accessor 411 uses the local and regional information from a web service (which requires the permission of system 400 to view) to make comparisons between a subscriber's energy usage and another's energy usage in various areas of the state.

The registration processor 410 is coupled with the server 235 and processes registration of the at least one subscriber. Registration of a subscriber may occur at a URL directed to the CANDI system 100 or portions thereof, such as, but not limited to, system 400.

A subscriber's account is handled through a secure database, with username/password login, and administrative oversight of permissions and other factors. Subscribers are tracked by unique IDs which reference their personal contact and other information. An administrative level user logs into the CANDI system 100 or a portion thereof, and verifies, creates or deletes a subscriber and the domains (e.g. homes, buildings) associated with the subscriber. The database 314 is then updated with the edited subscriptions.

The secure subscriber tunnel initiator 431 is coupled with the server 235 and, in response to a request from a subscriber to the server 235 to remotely access the premises 218, negotiates between the server 235 and the server 210 a subscriber communication tunnel such that the subscriber can securely, remotely and directly connect to the server 210 and have access to the premises 218. In one embodiment, the communication tunnel is secure. In another embodiment, the communication tunnel requires registration with the system 400.

The third party tunnel initiator 428 is coupled with the server 235 and sends data to the application 209 from a third party. In one embodiment, the data sent to the application 209 includes messages, such as those described herein.

The device discovery module 430 is coupled with the server 235 and automatically discovers a device of the at least one device 220 at the premises 218.

As previously discussed, the system 400 functions, in part, to manage products, devices, domains, and subscribers. The system 400 manages these components of the CANDI system 100 through, in part, product, device, domain and subscriber database administration tables. Below is an illustration of tables and relationships thereof used to manage the components.

Examples of table naming conventions are the following: (1) {original tbl name}_INFO; and (2) TBLMAP_{table1}_2_{table 2}.

With regard to {original tbl name}_INFO: Many tables have an associated table in the format of {original tbl name}_info. These are extended information tables for the main table. For example: The TBLDEVICE table has a TBLDEVICE_INFO table. In the TBLDEVICE_INFO table we can track things that are specific to this particular device (like for the CWD application we track the location of lights on the floor plan in this table).

The INFO tables have three main parts, an INFO_TYPE_LCD, a TEXT column and a VALUE column. These fields can be used for anything the application desires. The INFO_TUPE_LCD is a mnemonic that identifies which kind of data is stored in this_INFO record. Light layout for CWD2 Example: (i) INFO_TYPE_LCD+IT APPLICATION; (ii) TEXT=CANDI_IPHONE_APP|Floor Plan Position; and (iii) VALUE=X,Y.

Tables that have INFO associated tables include: TBLPRODUCT, TBLDEVICE, TBLPROTOCOL, TBLMAPPEDPRODUCT_PORT, TBLPRODUCT_DRIVER, TBLHOME, TBLUSER, etc.

With regard to TBLMAP_{table1}_2_{table 2}: To support many-to-many relationships between tables, system 400 contains a mapping table. It has keys into both main tables (1 and 2). For example, TBLMAPPRODUCT_2_PROTOCOL maps the TB_PRODUCT table to the TBL_PROTOCOL table. It has its own unique key, and the PRODUCT_CD and a PROTOCOL_CD as $2^{nd}$ keys.

Some database naming conventions and definitions include: (i) Product (TBLPRODUCT)—"an artifact that has been created by someone or some process"; (ii) Product Port (TBLPRODUCT_PORT)—A port on a product; (iii) Protocol (TBLPROTOCOL)—"rules determining the format and transmission of data"; (iv) Product Driver (TBLPRODUCT_DRIVER)—Actions implementable on the product; and (v) Product type (TBLPRODUCT_TYPE)—Categories of products (lights, cameras, bridges etc.).

The system 400 is coupled with the database 314, which also includes libraries available to end users and third party developers, such as, but not limited to: web applications; native applications; third-party control applications; and device drivers. The third-party control applications include multiple levels of tools for third parties, such as corporate customers and their partners as well as the general public, to create both web apps and native apps. The device drivers, as already explained herein, are characterized to be a device 220 within the domain 219.

The system 400 also, in one embodiment, functions to manage services, including, but not limited to: real-time database (populating the database 314 in real time); monitoring, dashboard, alerts and reports; a help deck and ticketing; a diagnostics database (customizing reporting and displaying of product performance metrics in order to provide ratings and feedback to customers and subscribers; and hosted servers at a colocation provider on the internet backbone (the co-location at which the domain 219 and mail servers are hosted).

Additionally, regarding the URL specifically directed to web site for the CANDI system 100 and portions thereof, such as system 400, the web site has at least four core components: (1) subscriber and domain interfaces; (2) marketing (brand and messaging pages); (3) E-commerce (subscribers can buy hardware and software products to populate their domains; and (4) customer support, such as user and developer forums, FAQs, and a problem resolution logic tree.

FIG. 4C is a flow diagram of a method 450 for achieving a uniform device abstraction layer, in accordance with embodiments. In one embodiment, method 450 is embodied in instructions, stored on a non-transitory computer-readable storage medium, which when executed by a computer system (see 700 of FIG. 7), cause the computer system to perform the method 450 for achieving a device abstraction layer. The method 450 is described below with reference to FIGS. 1-2C, 4A-4C and 7.

At 451, in one embodiment and as described herein, the method 450 includes automatically establishing a device class 422 for the at least one device 220 residing in the domain 219 of the premises 218, wherein the domain 219 is coupled with the server 210 and a device, such as the device 220B of the at least one device 220 includes a communication port 224B that supports a first protocol 226B corresponding to the second protocol 231. The second protocol 231 is supported by the device driver 230 coupled with the domain 219. In various embodiments, the establishing of the device class 422 at 451 includes any of the following: automatically establishing the device class 422; manually establishing the device class 422; establishing a device class 422 for similar devices in the domain 219 that operates with different protocol versions and different actions; establishing a device class 422 for different devices implementing different actions over a same protocol;

establishing a device class across all domains for different versions of device drivers supported for the same products; establishing a device class 422 for an available new product when a subscriber 217 has an older version of the server 210 that is coupled with the domain 219, wherein the older version of the server 210 does not support an updated device driver.

At 452, in one embodiment and as described herein, the method 450 includes, based on the establishing of the device class 422 at 451, enabling a mapping of at least one action 202 to the device 220B, thereby enabling an application, such as application 209, to run on and utilize a capability of the device 220B. In one embodiment, the enabling of 452 of a mapping of an action 202 to a device 220B includes enabling integrating of web-based services within the application 209.

At 453, in one embodiment and as described herein, the method 450 further includes, based on the establishing of the device class 422 at 452, enabling multiple applications to be built uniformly, using the mapping of the at least one action 202.

At 454, in one embodiment and as described herein, the method 450 further includes, based on performed data analysis, notifying an entity when a threshold is achieved.

In one embodiment and as described herein, the method 450 further includes requesting updated information from the server 210.

At 455, in one embodiment and as described herein, the method 450 further includes receiving data from an external source. At 456, in one embodiment and as described herein, the method at 455 further includes storing the data in the database 314 that is coupled with the server 235. At 457, in one embodiment and as described herein, the method at 455 further includes comparing received data with the database 314 and based on the comparing, determining a set of data 425 that meets a predetermined criteria. At 458, in one embodiment and as described herein, the method at 455 further includes reporting a history of received data. At 459, in one embodiment and as described herein, the method at 455 further includes, based on the received data, projecting a future trend.

At 460, in one embodiment and as described herein, the method 450 further includes, based on data stored in the database 314 coupled with the server 235, generating a recommendation 420 for a subscriber 217. At 461, in one embodiment and as described herein, the generating at 460 of the recommendation 420 includes analyzing the data stored in the database 314.

At 462, in one embodiment and as described herein, the method 450 further includes initiating an action 202 to achieve a predetermined condition.

At 463, in one embodiment and as described herein, the method 450 further includes receiving data associated with different subscribers' actions and based on received data, comparing the different subscribers' actions with each other. At 464, in one embodiment and as described herein, the method 450 further includes receiving data associated with different subscribers' actions and based on the received data, grouping subscribers.

At 465, in one embodiment and as described herein, the method 450 further includes accessing a web service requiring a permission and comparing the subscribers' information with information associated with at least one third party.

In one embodiment and as described herein, the method 450 further includes processing registration of at least one subscriber 217. At 466, in one embodiment and as described herein, the method 450 further includes receiving data associated with at least one subscriber 217 and managing the at least one subscriber 217.

Section Three: Maintaining a Domain

As discussed above, the NOC 101 interacts with the system 200 of the system 111, to achieve a uniform device abstraction layer. This interaction is accomplished through a communication method and system having specific functionalities. For example, the communication method and system functions to maintain and update a domain through such operations as, but not limited to, the following (as will be described below): sync management; a cloud mirror; security management; transport links; remote editing, compiling and uploading control system application software; and reporting by the system 200 to the NOC 101.

Figure 3A:
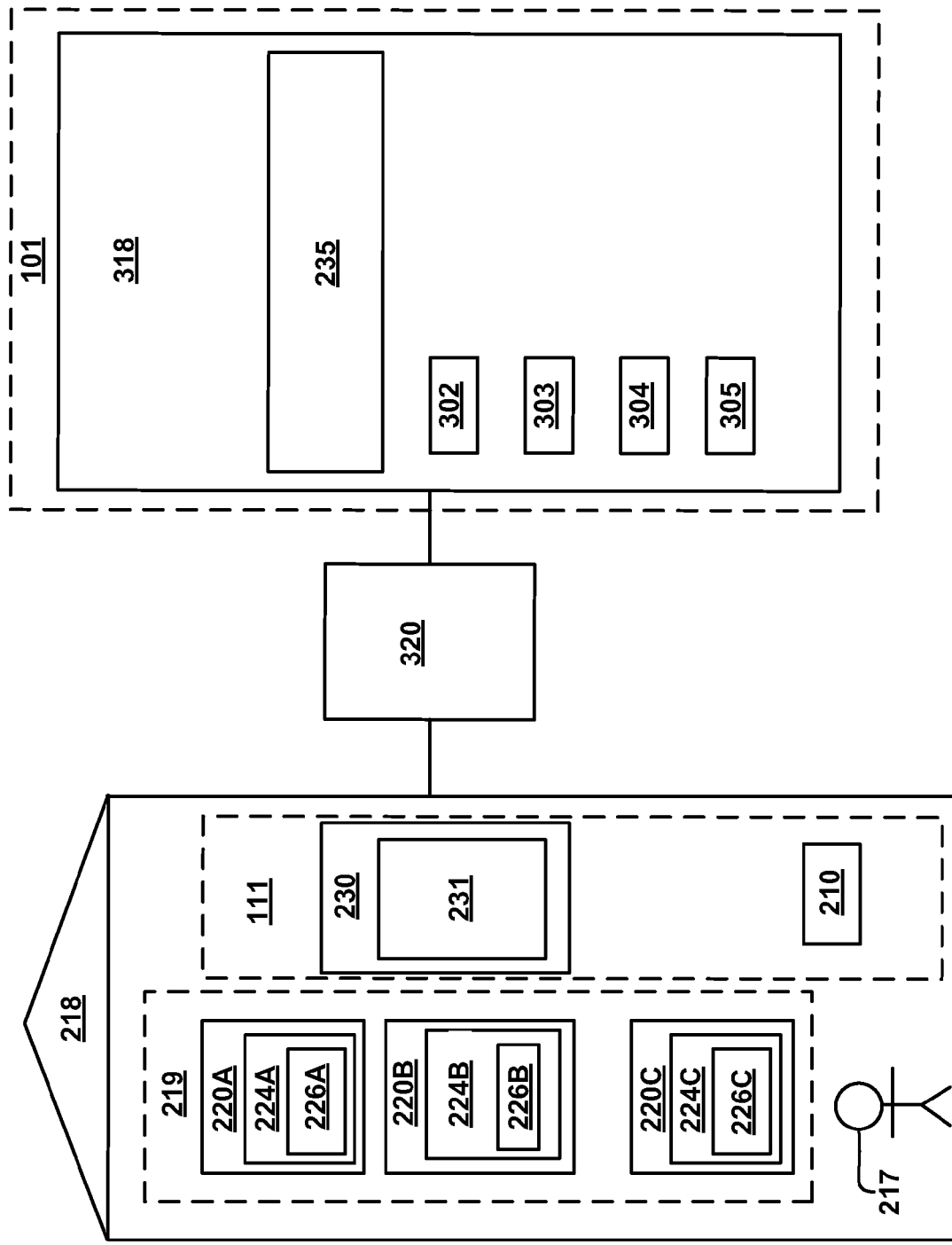
FIG. 3A is a block diagram of a system for maintaining a domain in a premises, in accordance with an embodiment.
Figure 3B:
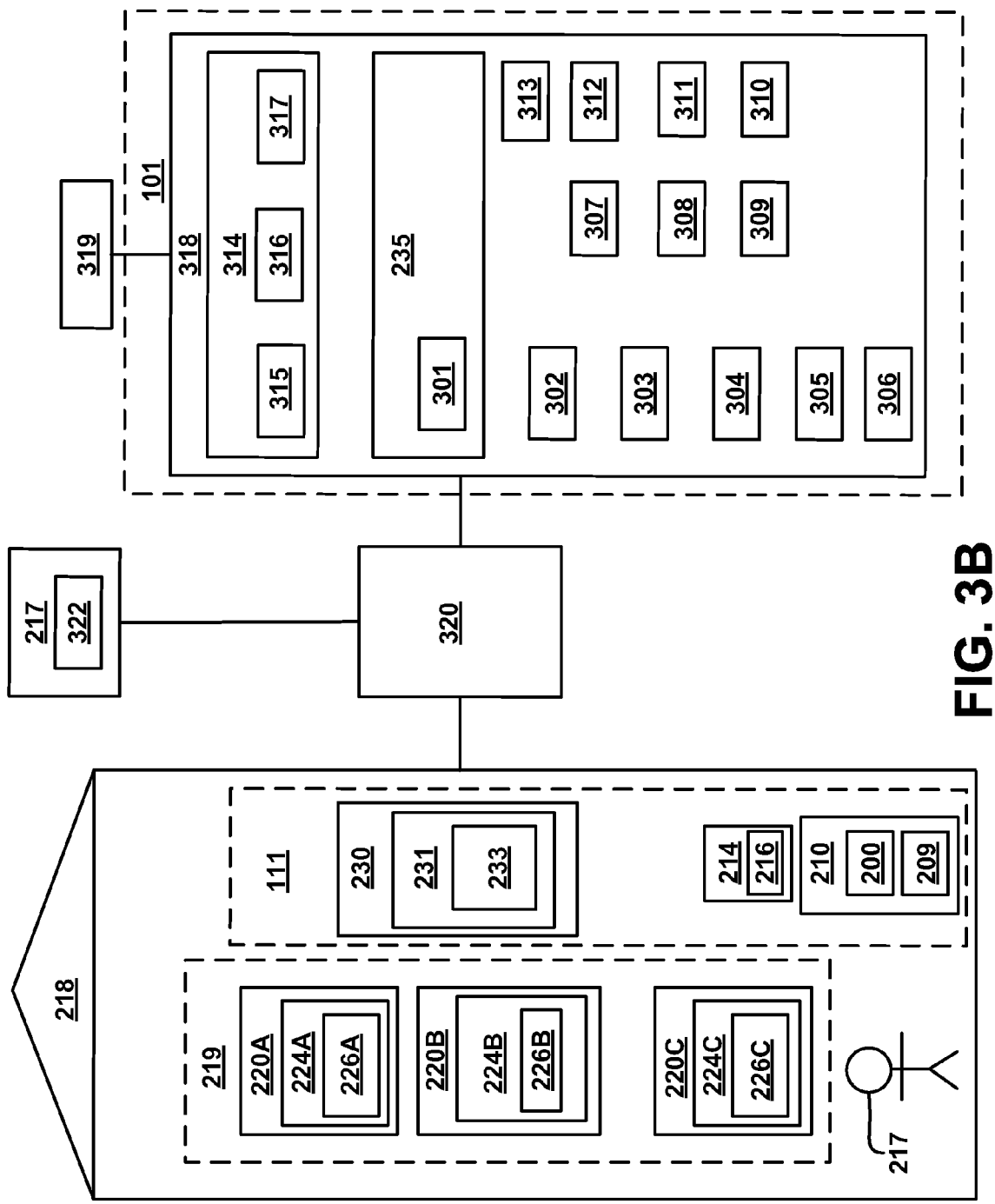
FIG. 3B is a block diagram of a system for maintaining a domain in a premises, in accordance with an embodiment.

FIGS. 3A and 3B show block diagrams of the system 318 for maintaining a domain 219 in a premises 218, wherein the domain 219 is coupled with the server 210, in accordance with embodiments. Of note, the system 318 is coupled with the NOC 101.

With reference now to FIGS. 1-4C, in one embodiment, and as will be described herein, the system 318 includes the following: an instruction receiver 302; a secure connection establisher 303; a data exchange module 304; and an updating module 305. The system 318, in various embodiments, optionally includes any of the following: a preload file creator 306; a device driver manager 325 which optionally includes a device driver adder 307 and a device driver remover 308; a code downloader 309; an update indicator 310; a task instructor 311; a mirror image provider 313; and a device modifier 312.

The instruction receiver 302 is coupled with the server 210. The instruction receiver 302 receives a set of instructions relating to managing the domain 219. The set of instructions includes a complete set of instructions associated with the managing of a configuration of the domain 219 such that the domain 219 functions according to the complete set of instructions without any further communication necessary between the server 210 with the server 235 until a change in the domain 219 occurs. The set of instructions may be, but is not limited to being: application updates; third party instructions regarding a device; and device configuration information.

The change that occurs in the domain 219 will require an update to the server 210 and components coupled therewith. For example, a change may occur if a subscriber 217 adds a new CANDI enabled device onto the premises 218. The system 200 will recognize the presence of a new device. The system 200 will communicate with the NOC 101 (including system 318) to provide information to the cloud about the new device.

In one embodiment, in response to being provided this information, the system 318 may send device configuration information to the system 200 for the newly added device. Device configuration information is information that the NOC 101, including system 318, has access to with regard to a particular device's individualized operational needs, capabilities, as well as predetermined operating instructions (instructions directing the particular device to use its capabilities in a predetermined manner).

However, in another embodiment, and as will be described in more detail below in Section IV, a third party developer may contact the CANDI system 100 (including the system 200) to transfer to the system 318 an update, for example, to an application 209 that resides on the system 111. The system 318 will address the third party developer's request that an application controlling the at least one device 220 be updated by pushing the updates to the system 200 of the system 111 for the update to be performed.

As described herein, the domain 219 includes at least one device 220, wherein a device 220B of the at least one device 220 includes the communication port 224B that supports the first protocol 226B corresponding to the second protocol 231, wherein the second protocol 231 is supported by the device driver 230 that is coupled with the domain 219.

The secure connection establisher 303 is coupled with the instruction receiver 302 and establishes a secure connection between the server 235 and the server 210.

The data exchange module 304 is coupled with the secure connection establisher 303. The data exchange module 304 exchanges device configuration information between the server 235 and the server 210.

The updating module 305 is coupled with the data exchange module 304. The updating module 305 updates an application 209 residing on at least one of the server 210 and a computing device (e.g. mobile phone, personal computer, etc.) that is separate (not residing on the server 210) from the server 210 and updating device configuration information 216 stored on a (first) database 214 (hereinafter, "database 214") coupled with the server 210. In one embodiment, the updating module 305 updates a second database 314 (hereinafter, "database 314") that is coupled with the server 235.

In one embodiment, the system 318 performs sync management to maintain an updated domain in the premises 218. For example, usage data is pushed from the server 210 of the system 111 to the server 235 of the system 318. When a user, such as a subscriber 217 makes changes to the domain 219, or more broadly to the premises 218, a "sync" is performed to push the changes into the premises 218, as it applies to the at least one device 220 of the domain 219.

To perform the sync, and as described above, the secure connection establisher 303 creates a secure connection between the server 235 and the server 210. The data exchange module 304, in one embodiment, uploads device configuration information, such as, but not limited to, all device log data, diagnostics and activity logs, from the server 210 coupled with the system 111 to the server 235 for archiving. Based on this uploaded device configuration information, the updating module 305 updates applications coupled with the system 111 as needed. This updating includes, but is not limited to, the following, as described below: adding or removing specific device drivers due to changes in devices; updating the database 214 coupled with the system 111; downloading to the system 111 via the server 210, the latest device configuration information; creating local application preload files; and updating system 111—served client applications, such as application 209.

In one embodiment, diagnostic information and request information tracked by the system 200 is uploaded during the sync process and is stored in the database 314 (coupled with the system 318), such that metrics may be aggregated and presented through various components coupled with the NOC 101.

Another description of the process of syncing is as follows. After a user, such as subscriber 217, makes changes to the at least one device 220 in the domain 219 as well as scenes on the website associated with the CANDI system 100, the system 318 syncs the new data occurring in the NOC 101 with the system 200 coupled with server 210 associated with the domain 219. The instruction receiver 302 receives a set of instructions relating to managing the domain 219. This set of instructions includes a predetermined instruction based on a recognized pattern. For example, when the user makes changes at the website associated with the CANDI system 100, the instruction receiver 302 of the system 318 detects and understands these changes to be a "set of instructions", following which a secure connection establisher 303, a data exchange module 304 and an updating module 305 operates as described above.

For example, a domain sync transaction is initiated by a wizard or by prompts from the web site to the user, through the secure connection establisher 303. During the domain sync transaction, the current domain configuration is checked for completeness via the data exchange module 304. If the domain configuration is found to be complete after exchanging information between the server 235 and the server 210, then the current domain configuration of the domain 219 is archived (stored) to the database 314. In one embodiment, device data is updated in the database 314. Current diagnostics from the domain 219 and the system 200 are uploaded to the system 318. The system 318, in one embodiment, compiles the necessary drivers (in progress) and applications for downloading to the system 111 at the server 210.

In yet one more embodiment, new code is downloaded to the system 200. The user, in one instance, in then informed of a successful update to the user's domain 219.

In yet another embodiment the system 318 is polled by the system 200 through the server 210, periodically (e.g. every five seconds), to ask if there is any work to be performed. "Work" can be anything from a sync request due to changes by the user to a device action request. Types of work which the system 318 may request of the system 200 to perform include, but are not limited to, the following: sync the database 214 or applications coupled with the system 111 with the system 318 of the NOC 101; execute a device action; upload diagnostic data to the system 318; download notification to the system 200 (e.g. utility demand response notification); upload stored data for archiving to the system 318 (e.g. power meter hourly metered data, or video cache from local cameras); indicating alarms to push to the system 318; requesting archived or partner services data from the system 318 for use in applications associated with the domain 219; and updating firmware of the system 111.

The task instructor 311 is coupled with the server 235 and instructs, by the server 235, the server 210 to have a task (e.g. "work") performed. Once the task instruction is sent to the system 200 and performed, the polling resumes. Of note, in communications between the server 210 and the server 235, to overcome any challenges with port-forwarding through firewalls and routers on the premises, the server 210 runs an algorithm that instigates a poll of the server 235 using SSL over port 80. This obviates the need to change firewall settings on the premises 218. For example, on a periodic configured bases (e.g. defaulting to every 5 seconds), the system 318 receives an HTTPS request from the system 200 via the servers 210 and 235. The system 318 authenticates the specific server 210, and checks its database 314 for any work to be performed. If the system 318 has work for the system 200, then the system 318 returns an appropriate command back to the system 200. If there is not work to do, as may be the case, then the system 318 does not respond to the polling of the system 200.

The preload file creator 306 is coupled with the server 235 and creates preload files for the application 209. The device driver manager 325 is coupled with the server 235 and adds and/or removes a device driver 230 to accommodate a change made to the domain 219. In one embodiment, the device driver manager 325 includes any of the following: a device driver adder 307; and a device driver remover 308. The device driver adder 307 is coupled with the server 235 and adds a device driver, such as device driver 230 to accommodate a change made to the domain 219. The device driver remover 308 is coupled with the server 235 and removes a device driver, such as device driver 230 to accommodate a change made to the domain 219. The code downloader 309 is coupled with the server 235 and downloads code 301 to the server 210. In one embodiment, the application 209 for a device, such as device 220 is determined and compiled in the system 318. The compressed footprint of the application 209 is downloaded to the system 111. All of the compression is done at the system 318. In one instance, the application 209 is downloaded from the system 318 into the server 210 and the application is served from the server 210. Significantly, the server 210 enables immediate accessibility because the server 210 works even when the server 235 at the system 318 does not. In this instance, the subscriber 217 accesses a local area network (LAN) mirror on the premises 218 and coupled with the server 210.

The update indicator 310 is coupled with the server 235 and indicates a successful update to the domain 219. This indication may be a visual (e.g. blinking icon) or auditory indication.

The mirror image provider 313 is coupled with the server 235 and provides a mirror image 319 of an application managed at the server 210, wherein the mirror image is accessible to a subscriber 217 over a wide area network via the mirror image 319. The mirror image 319 may be accessed during remote operation by a user of at least one device 220. CANDI enabled applications, such as application 209, have the ability to be served by either the system 200 in the premises 218 or by the system 318. Significantly, this capability minimizes latency and maximizes user experience with the application, depending on the location from which the user is accessing their domain 219.

Users on the premises 218 are connected to the system 200 served by the system 111. Remote users out on the WAN are connected to the mirror image 319 of their application 209 served by the system 318. When a CANDI domain is set up in a factory, the factory compiles the application with product drivers that are necessary and pushes the product drivers down to the sync operation to the server 210 on the domain 219. The application 209 is held in the domain 219. However, the system 318 also keeps a mirror copy of that application 209 to be accessed during remote operation, so that the remote operator does not have to access the server 210. Whatever is done to the application 209 is also done to the mirror image 319, including updates. This is a user experience optimization feature. The NOC 101 must be accessed to access the mirror image 319 of the application 209.

In one embodiment, a "cloud-to-premises tunneling" occurs. For example, the subscriber 217 is connected to the mirror image 319 of the application 209, and the system 318 provides a unique tunneling capability down to the domain 219 for low-overhead communications with the system 200. During the sync process described above, the system 200 in the domain 219 tells the system 318 what the local IP address is in the domain 219. The IP address never has to be typed in by the subscriber 217.

The device modifier 312 is coupled with the server 235 and facilitates a change in the domain 219 by changing a status of the at least one device 220.

FIG. 3C is a flow diagram of a method 350 for maintaining the domain 219 in the premises 218, in accordance with embodiments. In one embodiment, the method 350 is embodied in instructions, stored on a non-transitory computer-readable storage medium, which when executed by a computer system (see 700 of FIG. 7), cause the computer system to perform the method 350 for maintaining the domain 219 in the premises 218. The method 350 is described below with reference to FIGS. 1-4C and 7.

At 351, in one embodiment and as described herein, the method 350 includes receiving a set of instructions at the server 235, wherein the set of instructions requests that a change occur in the domain 219. The domain 219, includes at least one device 220. The at least one device 220 includes a communication port 224B that supports a first protocol 226B corresponding to a second protocol 231, wherein the second protocol 231 is supported by a device driver 230 that is coupled with the domain 219. In one embodiment, the set of instructions includes a complete set of instructions associated with the managing of the configuration of the domain 219 such that the domain 219 functions according to the complete set of instructions without any further communication necessary between the server 210 and the server 235 until a change in the domain 219 occurs. The change requires an update to the server 210 and components coupled therewith.

At 352, in one embodiment and as described herein, the method 350 includes establishing a secure connection between the server 235 and the server 210.

At 353, in one embodiment and as described herein, the method 350 includes communicating the request for the change between the server 235 and the server 210.

At 354, in one embodiment and as described herein, the method 350 includes exchanging configuration information between the server 235 and the server 210. In various embodiments and as described herein, the exchanging of configuration information between the server 235 and the server 210 includes any of the following: uploading, from the server 210, device log data; uploading, from the server 210, diagnostics; and uploading, from the server 210, device activity information.

At 355, in one embodiment and as described herein, the method 350 includes, based on the request and the exchanging at 354, updating an application 209 on at least one of the server 210 and a computing device that is separate from the server 210, and updating device configuration information 216 stored on a database 214 coupled with the server 210. In various embodiments and as described herein, the updating at 355 includes any of the following: downloading code to the server 210; and instructing, by the server 235, the server 210 to perform a task.

At 356, in one embodiment and as described herein, the method 350 further includes, based on the exchanging at 354, updating the database 314 coupled with the server 235. In one embodiment, the updating at 356 includes archiving, at the server 235, the device configuration information.

At 357, in one embodiment and as described herein, the method 350 further includes creating preload files for the application 209.

At 358, in one embodiment and as described herein, the method 350 further includes managing a device driver 230 on the premises 218 to accommodate a change made to the domain 219. In one embodiment and as described herein, the managing a device driver 230 at 358 includes adding a device driver, such as device driver 230, to the premises 218 to accommodate a change made to the domain 219. Further, in another embodiment and as described herein, the managing a device driver 230 at 358 includes removing a device driver, such as device driver 230, from the premises 218 to accommodate a change made to the domain 219. At 359, in one embodiment and as described herein, the method 350 further includes indicating a successful update to the at least one device 220.

At 360, in one embodiment and as described herein, the method 350 further includes providing a mirror image 319 of an application managed at the server 210, wherein the application is accessible to a subscriber over a wide area network via the mirror image 319.

At 361, in one embodiment and as described herein, the method 350 further includes receiving by the server 235 from the server 210 a local IP address of the domain 219.

At 362, in one embodiment and as described herein, the method 350 further includes facilitating the change in the domain 219 by changing a status of the at least one device 220. The changing a status may be at least any of the following: editing a device; adding a device; and deleting a device.

Section Four: Targeting Delivery Data

As discussed above, the NOC 101 interacts with the system 200 of the system 111, to achieve a uniform device abstraction layer. The creation of the uniform device abstraction layer enables third parties, such as providers and/or manufacturers, to tailor messages ("delivery data") to the subscriber 217. These messages may be in the form of coupons, energy saving advice, alerts as to application updates, etc. Thus, while the NOC 101 receives and collects data provided by the system 200 within the system 111, this collected data is pushed back to the system 200 as business intelligence, such that, based on the knowledge that is happening around the premises 218 and stored at the database 314, the message is tailored for the subscriber 217. For example, it may be sensed that a dish washer is almost in need of repair. Therefore, a coupon for that dish washer is sent to the subscriber 217 in anticipation of the dish washer breaking down. Below is a description of a system 600 for targeting delivery data.

Figure 6B:
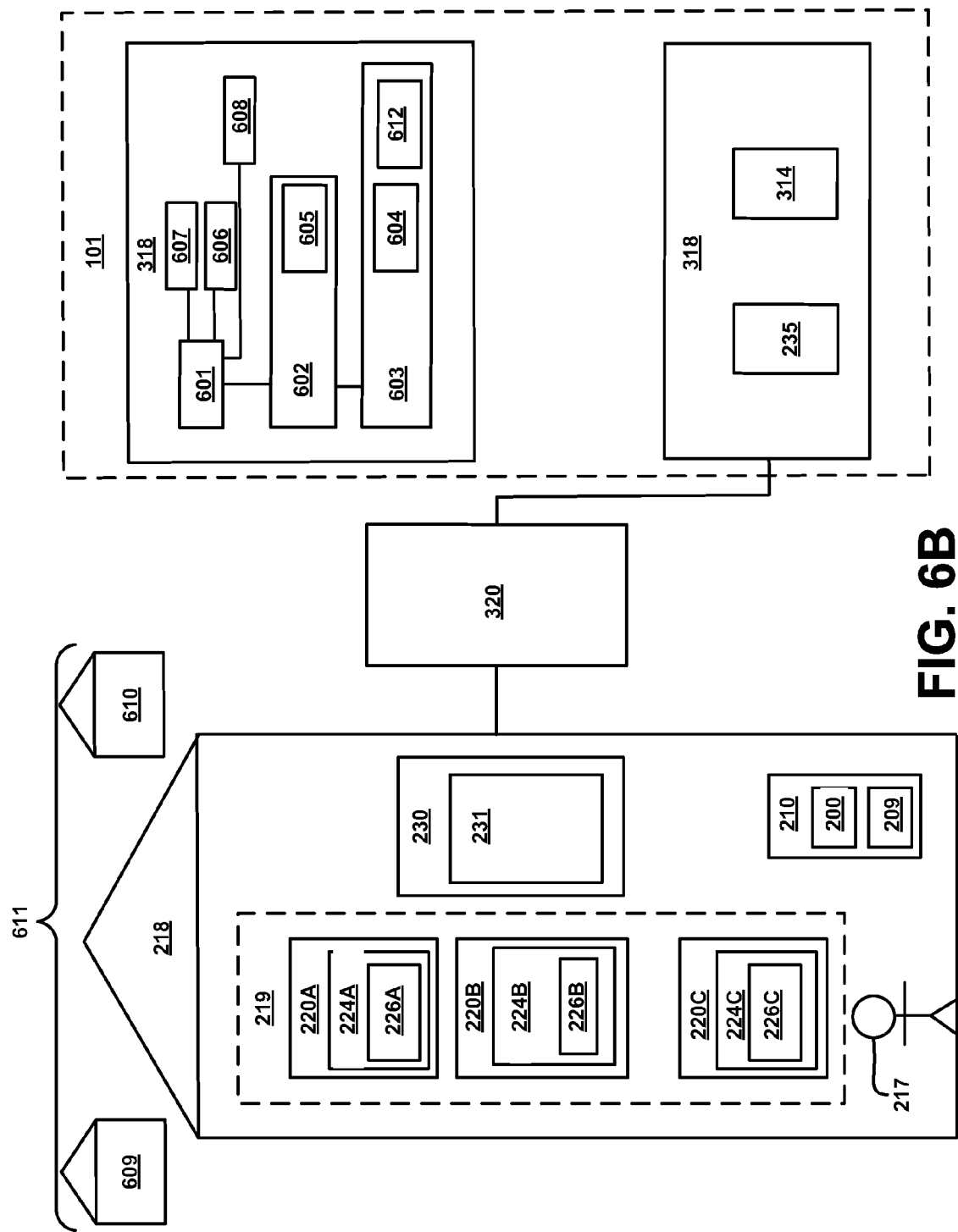
FIG. 6B is a block diagram of a system 600 for targeting delivery data, in accordance with an embodiment.

FIGS. 6A and 6B show block diagrams of the system 600 for targeting delivery data, in accordance with embodiments. With reference now to FIGS. 1-4C, 6A and 6B, in one embodiment, and as will be described below, the system 600 includes a database accessor 601; an information analyzer 602; and a customized message sender 603. It should be noted that the system 600 is coupled with the system 318 discussed above, via wire and/or wirelessly. Thus, the system 600 may reside on the system 318 or may be separate from the system 318 but coupled therewith. In various embodiments, the information analyzer 602 optionally includes any of the following: a usage sender 604; and a group discount sender 612. In various embodiments, the information analyzer 602 optionally includes a threshold value determiner 605 and then optionally further includes any of the following: an application repairer 607; an application updater 606; and a product advertiser 608.

In one embodiment, the database accessor 601 is coupled with a local server 235 and accesses a database 314 also coupled with the local server 235, wherein the database 314 includes information associated with a set of premises 611. It should be appreciated that a set of premises 611 can be just one premises or a plurality of premises. Each premises of the set of premises 611 includes the domain 219 coupled with the server 210 and includes at least one device 220. The at least one device 220 includes a communication port 224 that supports a first protocol 226 corresponding to the second protocol 231, wherein the second protocol 231 is supported by the device driver 230 coupled with the domain 219.

The information analyzer 602 is coupled with the database accessor 601 and analyzes the information associated with the set of premises 611. In one embodiment, the information analyzer 602 includes the threshold value determiner 605. The threshold value determiner 605 determines if a threshold value is achieved. The threshold value is a predetermined value that once met or exceeded, is considered to be achieved. For example, a threshold value is the threshold temperature of 68 degrees Fahrenheit. In one embodiment, it is predetermined that the temperature should remain below 68 degrees Fahrenheit in the living room of the premises 218. Thus, if the temperature is registered to be 69 degrees Fahrenheit, then it is determined that threshold temperature for the living room is achieved.

The functioning of the threshold value determiner 605 enables an event to be created. For example, and as indicated above, based upon a threshold value being met or exceeded as determined by the threshold value determiner 605, the provider and/or manufacturer performs an action directed towards the subscriber 217. This action, as will be explained below, may be any of, but not limited to, the following: customized messaging; repairing applications; updating applications, creation of a new product; and offering a new product to a subscriber. Notifications, through the customized messaging, may be sent to the subscriber by the provider and/or manufacturer when a certain event occurs that meets or exceeds a threshold. Thus, the provider and/or manufacturer are enabled to have more positive feedback regarding predetermined thresholds being met or exceeded. Additionally, manufacturers and providers are enabled to send relevant and revenue generating customized messages to subscribers, thereby potentially increasing a revenue base. Moreover, these actions directed towards subscribers help to build a customer/provider relationship.

The customized message sender 603 is coupled with the information analyzer 602 and sends a customized message to the set of premises 611. The customized message is a message tailored to the particular subscriber 217. For example, the database 314 includes information regarding a dishwasher, its make, model and warranty information. The manufacturer of the dishwasher has a new dishwasher model that saves energy while also cleaning dishes better than the subscriber's dishwasher. The manufacturer, through system 600, is able to send a customized message to the subscriber 217, offering a cost reduction (coupon) for the new dishwasher model, while also illustrating to the subscriber 217 possible energy savings should the new dishwasher model be used. (See below for product advertiser 608.) The customized message sender optionally includes any of the following: a usage sender 604 and a group discount sender 612.

The usage sender sends a customized message to the set of premises 611 based on a frequency of usage of a product by the set of premises 611. For example, if is it determined that a subscriber 217 uses a washing machine every day, then the customized message sent from the usage sender might include advice for running the washing machine at times of the day at which the cost of energy to the consumer is lower. In another example, one customized message may be sent to high usage users, while another customized message may be sent to users of a different frequency. Thus, customized messages vary depending on a subscriber's frequency of use The group discount sender 612 sends a group discount to the set of premises 611. For example, a coupon offering a discount for a new refrigerator may be sent to a group of selected subscribers within the set of premises 611, wherein the coupon offers a discount if a predetermined number of subscribers within the group of selected subscribers choose to buy the refrigerator using the coupon. This feature of the system 600 enables a provider and/or a manufacturer to track and sort data based on what subscribers like (e.g. high usage-group discount), using at least the data stored at the database 314 of the system 318. This takes away from the uncertainty of who is going to buy a product that is manufactured. It also creates more confidence in manufacturing the product. The group discount sender 612, thus, is able to send customized messages targeting specific groups of subscribers.

As described above, the system 600 further optionally includes any of the following coupled with the threshold value determiner 605: an application repairer 607; an application updater 606; and a product advertiser 608. The application repairer 607 repairs an application 209 at the set of premises 611 if the threshold value is achieved. The application updater 606 updates an application 209 at the set of premises 611 if the threshold value is achieved. The product advertiser 608 offers a new product to the set of premises 611 if the threshold value is achieved.

The product advertiser 608 is coupled with the database accessor 601 and offers a new product to the set of premises 611 if the threshold value is achieved.

Figure 6C:
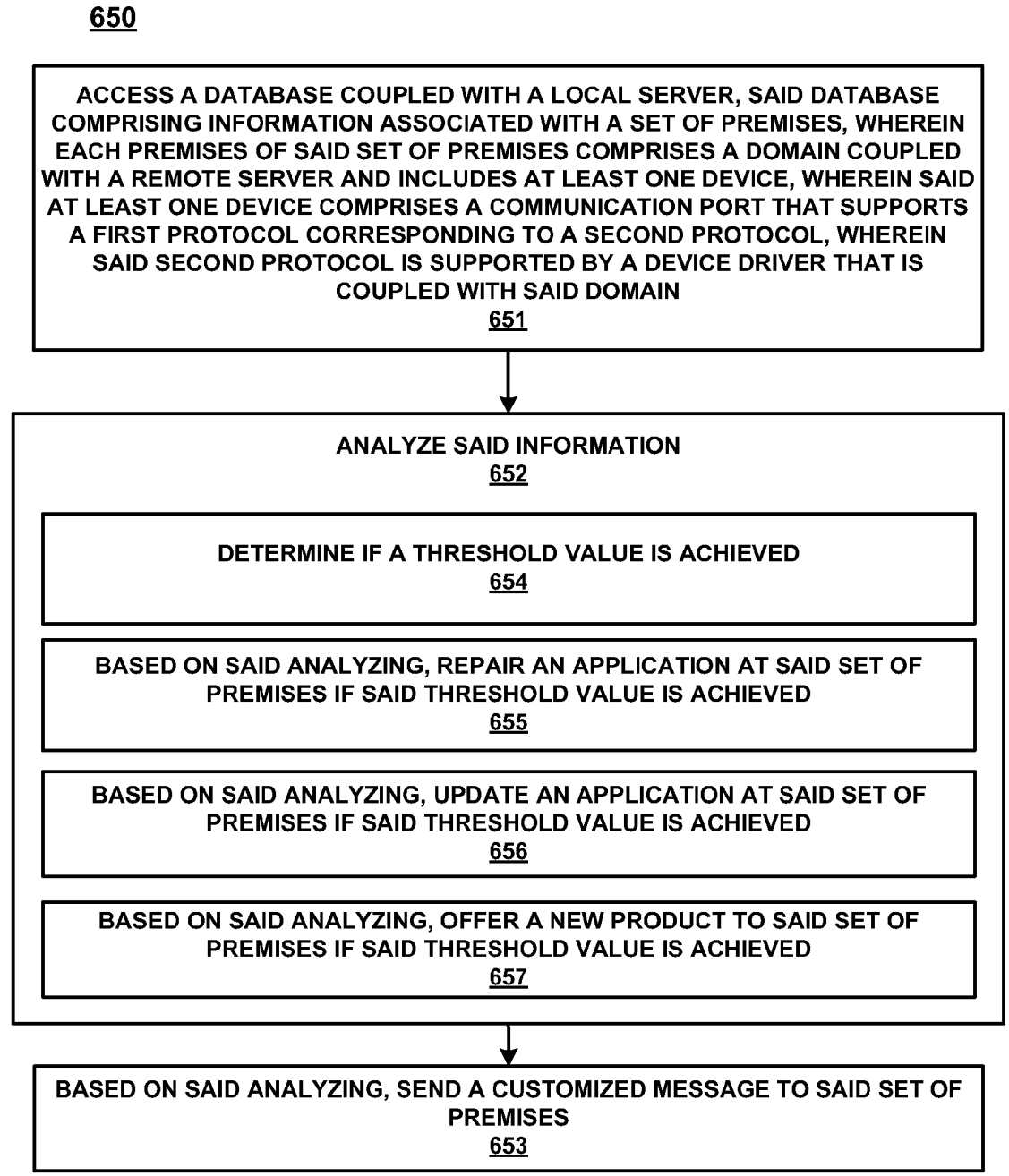
FIG. 6C is a flow diagram of a method 650 for targeting delivery data, in accordance with an embodiment.

FIG. 6C is a flow diagram of a method 650 for targeting delivery data, in accordance with embodiments. In one embodiment, the method 650 is embodied in instructions, stored on a non-transitory computer-readable storage medium, which when executed by a computer system (see 700 of FIG. 7), cause the computer system to perform the method 650 for targeting delivery data. The method 650 is described below with reference to FIGS. 1-4C, 6A-6C and 7.

At 651, in one embodiment and as described herein, the method 650 includes accessing the database 314 coupled with the server 235, wherein the database 314 includes information associated with the set of premises 611, wherein each premises of the set of premises 611 includes a domain 219 that is coupled with the server 210 and includes at least one device 220. The at least one device 220 includes a communication port 224 that supports a first protocol 226 corresponding to the second protocol 231. The second protocol 231 is supported by the device driver 230 that is coupled with the domain 219.

At 652, in one embodiment and as described herein, the method 650 includes analyzing the information. At 654, in one embodiment and as described herein, the analyzing 652 the information includes determining if a threshold value is achieved. At 655, in one embodiment and as described herein, the method 650 further includes, based on the analyzing at 652, repairing an application 209 at the set of premises 611 if the threshold value is achieved. At 656, in one embodiment and as described herein, the method 650 further includes, based on the analyzing at 653, updating an application 209 at the set of premises 611 if the threshold value is achieved. At 657, in one embodiment and as described herein, the method 650 further includes, based on the analyzing at 653, offering a new product to the set of premises 611 if the threshold value is achieved.

At 653, in one embodiment and as described herein, the method 650 includes, based on the analyzing at 652, sending a customized message to the set of premises 611. In one embodiment and as described herein, the sending at 653 of the customized message is based on a frequency of usage of a product by the set of premises 611. In another embodiment and as described herein, the sending at 653 of the customized message includes sending a group discount to the set of premises 611.

Section Five: Enabling Customized Functions to be Implemented at a Domain

As discussed above, the NOC 101 interacts with the system 200 of the system 111, to achieve a uniform device abstraction layer. The creation of the uniform device abstraction layer enables third parties to build customized functions for implementation at the domain 219. More particularly, a third party developer may develop an application to be run on at least one device 220 within the domain 219, without knowing anything about the protocols associated with that device. For example, using well known established application development platforms, a utility company may write a mobile phone software application, including a set of instructions, to be implemented on a mobile phone. Additionally, the developer of the mobile phone software application may communicate with an API coupled with the system 200, and select a widget, of a set of selectable widgets, that the developer wishes to appear in its third party application. The widget is a predesigned user interface element that is enabled to be integrated within a third party application to provide user information and enable user interaction through the third party application via communication with the device driver.

This mobile phone software application is an example of a third party application, described below. The mobile phone software application communicates with the system 500 coupled with the system 200, and using an API 502 of the set of APIs 501 of the system 500 (described below), the system 500 converts the set of instructions within the mobile phone software application to an action 202 and a protocol which the at least one device 220 understands and can implement.

At the subscriber's 217 end, the subscriber 217 downloads the mobile phone software application to his/her mobile phone, and then is able to click on an icon, such as, "my energy savings". Once the "my energy savings" option is selected, the mobile phone software application sends a command to the system 200 that instructs the application to perform actions that conserve energy on the devices present at the domain 219. For example, the system 200 knows how to translate this action request to each of the at least one device 220, such as instructing the lights to dim, the thermostat to set back a couple of degrees, etc. The developer of the mobile phone software application does not need to know who makes the thermostat and what the thermostat is in order for the thermostat to respond to the mobile phone software application's action request. The system 500, as will be described below, converts aspects of the developed third party application into actions and protocols that the at least one device 220 understands. In this manner, a third party may develop an application for a group of devices residing in the domain, without having to create specific programs to match the protocol requirements of different devices within the domain 219.

Below is a description of a system 500 for enabling a customized function for the at least one device 220 to be implemented within the domain 219.

Figure 5A:
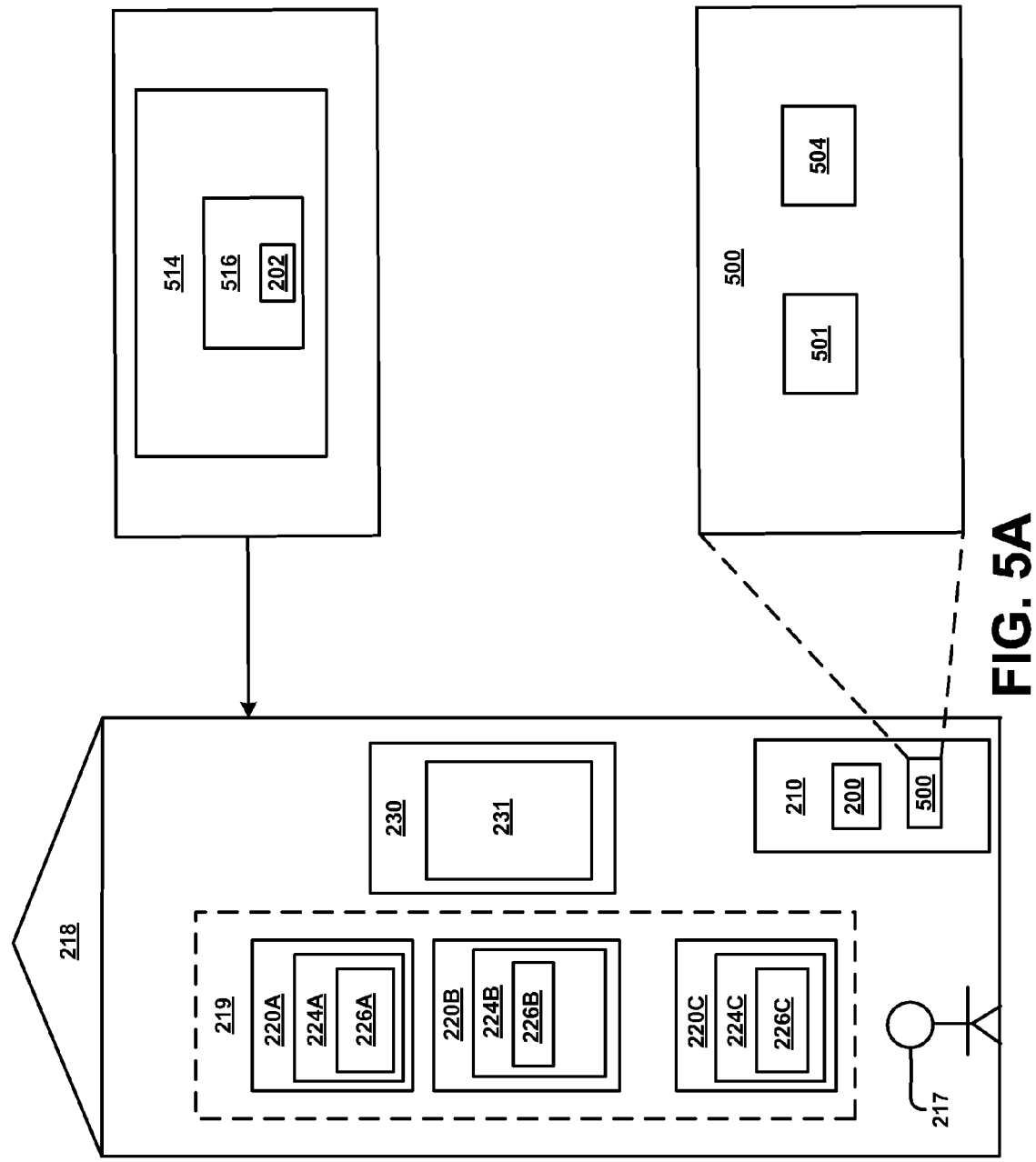
FIG. 5A is a block diagram of the system 500 for enabling a customized function for the at least one device 220 to be built and implemented within the domain 219, in accordance with an embodiment.
Figure 5B:
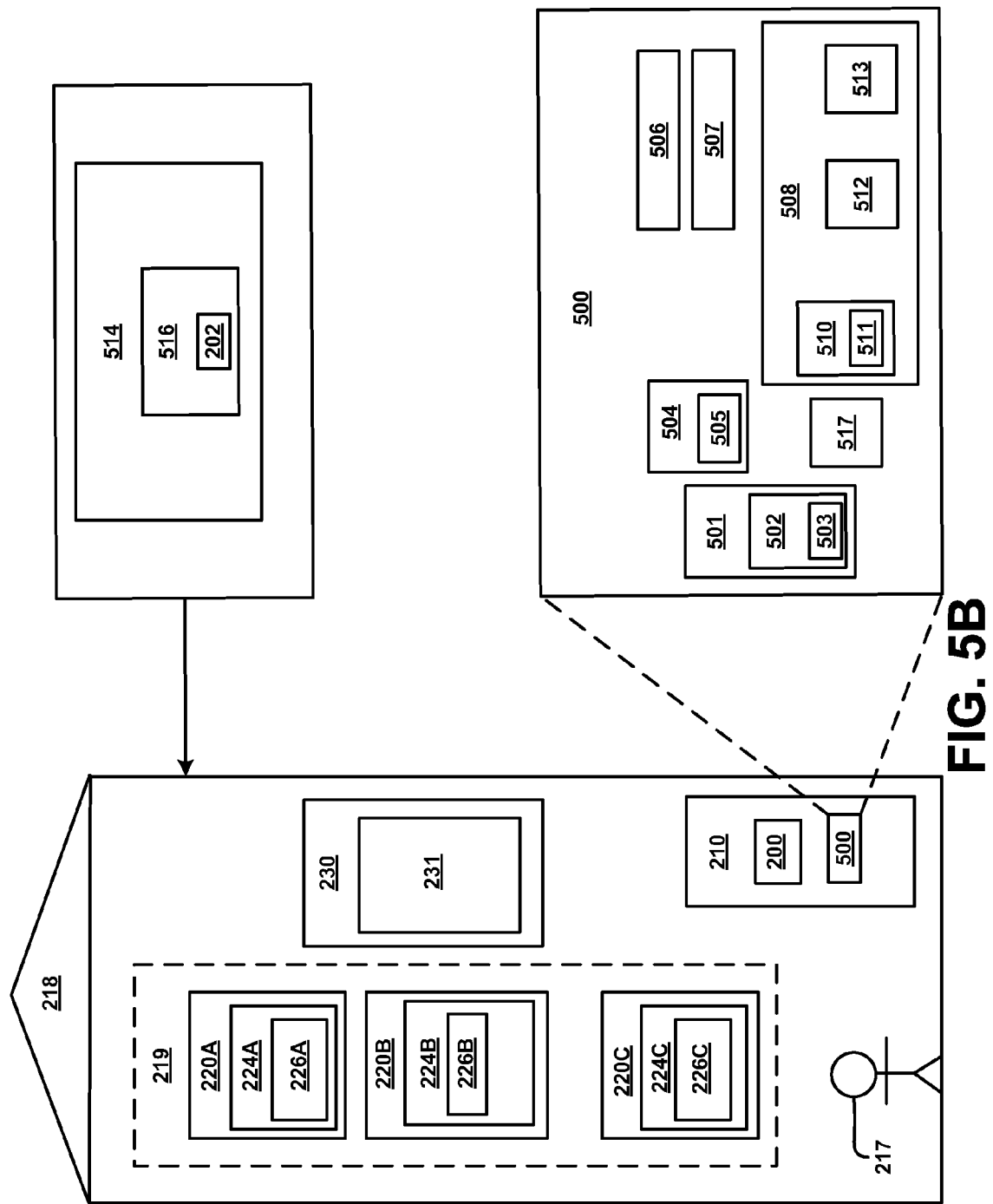
FIG. 5B is a block diagram of the system 500 for enabling a customized function for the at least one device 220 to be built and implemented within the domain 219, in accordance with an embodiment.

FIGS. 5A and 5B show block diagrams of the system 500 for enabling a customized function for the at least one device 220 to be implemented within the domain 219, in accordance with embodiments. With reference now to FIGS. 1A-7, in one embodiment and as will be described below, the system 600 includes: a set of application programming interfaces (APIs) 501; and an instruction translator 504 coupled with the set of APIs 501 and an instruction sender 517 coupled with the instruction translator 504. In various embodiments and coupled with the system 200 described herein, the system 500 includes any of the following: an instruction manager 506; a performance indicator 507; and a library 508.

The set of APIs 501 are coupled with the system 200. The system 200 is coupled with the server 210 managing the premises 218. The system 200 interacts with at least one third party application 514 via the set of APIs 501 (wherein the at least one third party application 514 has a set of instructions 516 thereon), such that the at least one third party application 514 can communicate with the device driver 230 at the premises 218 without having knowledge of the protocol 231 thereon and without having knowledge of the at least one device 220. The premises 218, as described herein, includes the at least one device 220, wherein a device of the at least one device 220, is coupled with the server 210 and includes a communication port 224 that supports a first protocol 226 corresponding to a second protocol 231, wherein the second protocol 231 is supported by a device driver 230 that is coupled with the domain 219.

Various functions of the set of APIs 501 include, but are not limited to, the following: creating and checking state subscriptions; setting and getting action states; getting device information and properties lists; querying and running macros; handling logins; and preloading data to a web page.

In one embodiment, at least one API, such as API 502, of the set of APIs 501, includes a set of selectable widgets 503. Upon the selection of a selectable widget of the set of selectable widgets 503 by a third party provides to the third party a predesigned user interface element that is enabled to be integrated within the at least one third party application 514. In various embodiments, the set of selectable widgets 503 are any of, but not limited to being, the following: a picture; an interactive graphic; and an interactive object. Thus, the system 500 provides a method by which a third party developer may develop a customized application for the subscriber 217 and/or the domain 219.

The instruction translator 504 is coupled with the server 210 and translates the set of instructions 516 received from the at least one third party application 514 to be an action 202 and protocol that the at least one device 220 understands. Once the at least one device 220 understands the action 202 and protocol, then the action 202 (the object of an action request by the at least one third party application 514) may be executed by the at least one device 220 and the application associated therewith. In one embodiment, the instruction translator 504 includes the instruction analyzer 505. The instruction analyzer 505 analyzes the set of instructions 516 and compares and determines a match for information within the set of instructions 516 with a portion of the domain 219. The term, "compares" refers to the instruction analyzer 505 looking at the set of instructions 516 to be applied to a particular device and the at least one device 220 within the domain, and determining similarities and differences between the set of instructions 516 and which devices are within the domain 219. The term, "determines a match for information within the set of instructions 516" refers to the determination of which device, if any, of the at least one device 220 is able to perform an action or plurality of actions requested within the set of instructions 516. If it is determined that a device of the at least one device 220 is able to perform the action 202, then a match is determined to have been found.

The instruction sender 517 is coupled with the instruction translator 504 and sends the translated instructions to the at least one device 220 for implantation by said at least one device 220.

The instruction manager 506 is coupled with the instruction translator 504 and manages a performance of an object of the set of instructions 516. The object of the set of instructions 516 includes an action 202, as described herein.

The performance indicator 507 is coupled with the instruction translator 504 and provides an indication of when the action 202 has been performed.

The library 508 is coupled with the instruction translator 504 and manages the sending and receiving of the action request. As described herein, in various embodiments, the library includes any of the following: a subscription manager 510 which may include a remote server polster 511; an object administrator 512; and a user access manager 513.

The subscription manager 510 manages a subscription to the execution and result of the action 202. The subscription to the action, in one example, is a result of the action request.

Once an action 202 has been requested to be performed (the action request), it becomes a "subscription" to the action 202, and the process begins to determine if and with which device the action 202 may be performed. In another instance, the system 500 polls the system 200 whenever a subscribed action like a thermostat's temperature changes. The object administrator 512 administers a list of objects comprising the set of selectable widgets 503.

The user access manager 513 manages user access to the set of selectable widgets 503. For example, the user access manager 513 handles the secure user login and authentication before opening the developer's application.

Additionally, the system 500 provides a controlled list of objects that may include more than the set of selectable widgets 503, and a method for controlling and polling devices as well as customizing simpler applications and user interfaces. For example, the objects may also be associated with different product types. The system 500 includes methods specific to each different product type that handles the intricacies of the actions and provides call back functions for when the command is complete (such as notifications that an action has been performed).

Capabilities which the system 500 and/or the system 500 combined with the system 200, provide to developers include, but are not limited to: specific device control for lights, thermostats, cameras, etc. is provided; simple device image toggle controls such as 1) choice of images to represent a device's state (on, off, unknown images) and placing it anywhere on the page; and 2) when an image is clicked, the device's command is sent to the system 200, and the image is updated appropriately (i.e. on or off image); slider controls, such as to control light levels, volume level and shade height. This allows developers to specify where the GUI will display a slider for setting a device's power/dim level as a percentage. The developer can choose the location, colors, image on the slider, direction (horizontal/vertical), increment (0 to 100 percent), steps (0, 33, 66, 99 percent), etc. Once the slider has been moved, the physical light is sent the appropriate command; dynamic device lists are easily handled, which enable the easy display of any information about the device, including filtering by the specific device types (e.g. lights only), device name, location type, protocol information, etc.; dynamic lists of macros are easily handled and automatically displayed in the application, such as application 209; scenes (aka macros) are presented easily for developers to assign individual buttons to call the scene. An image can be automatically displayed to indicate that the scene is running; inclusion of best-of-breed mobile development environment tools and libraries; inclusion of CANDI pre-load scripts which have all the devices in the environment ready for use in a web based environment; multiple web application pages can be built by the developer and managed as separate files. However, at runtime, all application pages are combined into a seamless single page to optimize speed and presentation to the end-user; apple-style page "tweens" are available, managed by a simple on-click control element which allows page paints to slide from any direction (top->bottom, left-> right, . . . ) or back after closing the page, by remembering the last slide direction and creating the opposite effect on return to the prior page; sounds can be triggered for page changes and other events when desired; developers can specify global variables to be used in and across multiple pages in their application. Examples are objects such as directory locations, named sound files, default image files for devices, etc.; HTML and Java Script may be added to CANDI applications as desired. Developers have full access to the CANDI pre-load scripts and capabilities. Any standard HTML or JavaScript function can be added to customize the application or enhance the user experience; and the use of CANDI libraries built on the background processing power of Ajax to communicate with the server 210. On an IP network, this allows the user experience to be quick and seamless.

Further features provided by the system 500 or the combination of system 500 and 200 include, but are not limited to, the following: unsolicited event notification to devices (e.g. a user turns on a light in the house and the application then changes to indicate the light as ON); ability to automatically select applications based on the platform or browser loaded (e.g. loading pages specific to company A's product on the company A's product, loading pages specific to company B's product on the company B's product, and loading pages specific to company C's product on the company C's product); DLNA-compliant entertainment browsing, playback and control.

Additionally, the system 500 or the combination of the system 500 and 200 enable a method and system for pre-delivery network creation. For example, a non-skilled person in a factory is able to configure a device, such as a light switch, via a computer, after looking at NOC 101 for the requirements of the device.

In another embodiment, the system 200 enables the designing of a brand for a product device using available widgets. This may happen at the factory, linked with NOC 101, or at a location remote from the factory (e.g. the premises 219 coupled with system 200).

Overall, the tools available to developers via systems 500 and 200 provide open APIs to allow easy application and driver development by customers, end-users and anyone else. In one embodiment, the system 500 includes HTTP API. In-house and third-party developers can create sophisticated software applications that interface fully with the CANDI system 100 and server 210. The API describes syntax for software-driven inputs and outputs handled by device classes. The HTTP GET method is used.

At a high level, the HTTP GET request and response include, but are not limited to: asynchronous requests; and HTTP GET responses. In regard to asynchronous requests, many commands have an option to send them in asynchronously and get the finished command response at a later time. This type of command request requires the addition of a CREATE_REQUEST parameter and a REQUEST_ID parameter when querying the result. The syntax is: &CREATE_REQUEST—and—&REQUST_ID+{REQUEST_ID}. The inbound CREATE_REQUEST returns an alpha/numeric that is unique for this request and is used again on the #Check Request command to retrieve the command response. When the CREATE_REQUEST is sent in, the WAIT_SECONDS parameter is ignored.

In regard to HTTP GET responses, the HTTP Get responses use the bar (|) and tilde (~) delimited strings. Multiple elements in a list are separated by a bar (|). Object attributes are separated by the tilde character (~). GET responses can also encompass action responses.

Additionally, in one embodiment, third party applications will be subject to a stringent automated testing process.

FIG. 5C is a flow diagram of a method 550 for enabling a building of a customized function for at least one device 220 in a domain 219, in accordance with embodiments. In one embodiment, the method 550 is embodied in instructions, stored on a non-transitory computer-readable storage medium, which when executed by a computer system (see 700 of FIG. 7), cause the computer system to perform the method 550 for enabling a building of a customized function for at least one device 220 in the domain 219. The method 550 is described below with reference to FIGS. 1A-7.

At 551, in one embodiment and as described herein, the method 550 includes receiving a set of instructions 515 residing on at least one third party application 514, wherein the set of instructions 515 comprises a request for an action 202 to be performed at the at least one device 220 within the domain 219 coupled with the premises 218.

At 552, in one embodiment and as described herein, the method 550 includes translating the set of instructions 516 and the action 202 into an action request and a protocol that the at least one device 220 understands, such that the at least one third party application 514 can communicate with the device driver 230 at the premises without having knowledge of a protocol thereon and without having knowledge of the at least one device 220, wherein a device of the at least one device is coupled with the server 210 and includes a communication port 224 that supports a first protocol 226 corresponding to the second protocol 231, wherein the second protocol 231 is supported by the device driver 230 that is coupled with the domain 219.

At 553, in one embodiment and as described herein, the method 550 includes operating at the at least one device 220, via the set of APIs 501, the at least one third party application 514, including the action request, having the set of instructions 516 thereon.

At 554, in one embodiment and as described herein, the method 550 includes providing an indication of when the action request has been performed.

At 555, in one embodiment and as described herein, the method 550 includes managing the sending and receiving of the action request via a library 508. In one embodiment and as described herein, the managing the sending and receiving of the action request via the library 508 at 555 optionally includes any of the following: managing a subscription to the execution and result of the action 202, the managing the subscription further optionally including polling the server 210 that is coupled with the device driver 230 when the action 202, that is subject to the subscription, changes; administering a list of objects comprising a set of selectable widgets 503; and managing user access to a list of objects including the set of selectable widgets 503.

Section Six: Cloud-Assisted Network Device Integration

With reference now to FIGS. 1A-8D, the CANDI system 100 will be described. FIG. 8A is a block diagram of the CANDI system 100. Shown in overview is the NOC 101 coupled with the system 111. As described above in detail, the NOC 101 includes, in various embodiments, the system 400 for achieving a uniform device abstraction layer and the system 318 for maintaining a domain. The system 111 includes in various embodiments, the system 200 for managing a domain and the system 500 for enabling a customized function for at least one device to be implemented within the domain 219. Additionally, coupled with both the NOC 101 and the system 111 is the system 600 for targeting delivery data. It should be appreciated that the embodiments associated with the systems 200, 318, 400, 500 and 600 have been described in detail above and the various features therein are incorporated into the embodiment shown in FIG. 8A. In addition, the CANDI system 100 optionally includes a data manager 805 that is coupled with the device driver implementer of the system 200. The data manager 805 sends and receives data associated with the at least one device 220.

In one embodiment, the CANDI system 100 includes the NOC 101 (including the system 400) and the domain manager (including the system 200). The system 400 is coupled with the server 235, while the system 200 is coupled with the server 210.

As described herein, the system 400 includes a device class determiner coupled with the server 235. The device class determiner establishes a device class for the at least one device residing in the domain at the premises. Based on the establishing the device class, an action is enabled to be mapped to the device, thereby enabling an application to run on and utilize a capability of the device.

In one embodiment and as described herein, the CANDI system 100 optionally includes any of the following: an updated information requester; a data receiver; a data storer; and a recommendation generator. The updated information requester is coupled with the device class determiner and is configured for requesting updated information from the remote server. The data receiver is coupled with the device class determiner and receives data from an external source. The data storer is coupled with the data receiver and stores the data in a local database coupled with the local server. The recommendation generator is coupled with the device class determiner and generates a recommendation for a subscriber based on data stored in the local database.

As described herein, the system 200 includes an action identifier coupled with the remote server, the action identifier configured for identifying an action to be mapped to the at least one device; a device driver determiner coupled with the action identifier, the device driver determiner configured for determining a device driver that supports a second protocol, wherein the device driver is coupled with the domain and the second protocol supports the action; a comparer configured for comparing the second protocol with a domain configuration store including device configuration information for the at least one device; and a device driver implementer configured for, based on the comparing, implementing the device driver when the first protocol corresponds to the second protocol such that the action is enabled for performance.

In one embodiment and as described herein, the CANDI system 100 further includes a gateway module coupled with the device driver implementer, the gateway module configured for managing an application, wherein the application controls said at least one device. In yet another embodiment and as described herein, the CANDI system 100 includes a data manager coupled with the device driver implementer, the data manager configured for sending and receiving data associated with the at least one device. In one embodiment and as described herein, the CANDI system 100 further includes a communication manager, wherein the communication manager includes the system 318, which includes an instruction receiver, a secure connection establisher, a data exchange module, and an updating module. The instruction receiver is coupled with the local server. The instruction receiver receives a set of instructions relating to managing the domain, wherein the set of instructions includes a complete set of instructions associated with the managing a configuration of the domain such that the domain functions according to the complete set of instructions without any further communication necessary between the remote server with the local server until a change in the domain occurs, wherein the change requires an update to the remote server and components coupled therewith.

The secure connection establisher is coupled with the instruction receiver and establishes a secure connection between the local server and the remote server.

The data exchange module is coupled with the secure connection establisher and exchanges device configuration information between the local server and the remote server.

The updating module is coupled with the data exchange module and based on the exchanging, updates an application residing on the at least one of the remote server and a computing device that is separate from the remote server and updates device configuration information stored on a first database coupled with the remote server. In one embodiment and as described herein, the updating module is further configured for updating a second database that is coupled with the local server.

In one embodiment and as described herein, the system 600 for targeting delivery data includes a database accessor, an information analyzer, and a customized message sender. The database accessor is coupled with the local server and accesses the second database, wherein the second database includes information associated with a set of premises. The information analyzer is coupled with the database accessor and analyzes the information. The customized message sender is coupled with the information analyzer and sends a customized message to the set of premises.

Figure 8A:
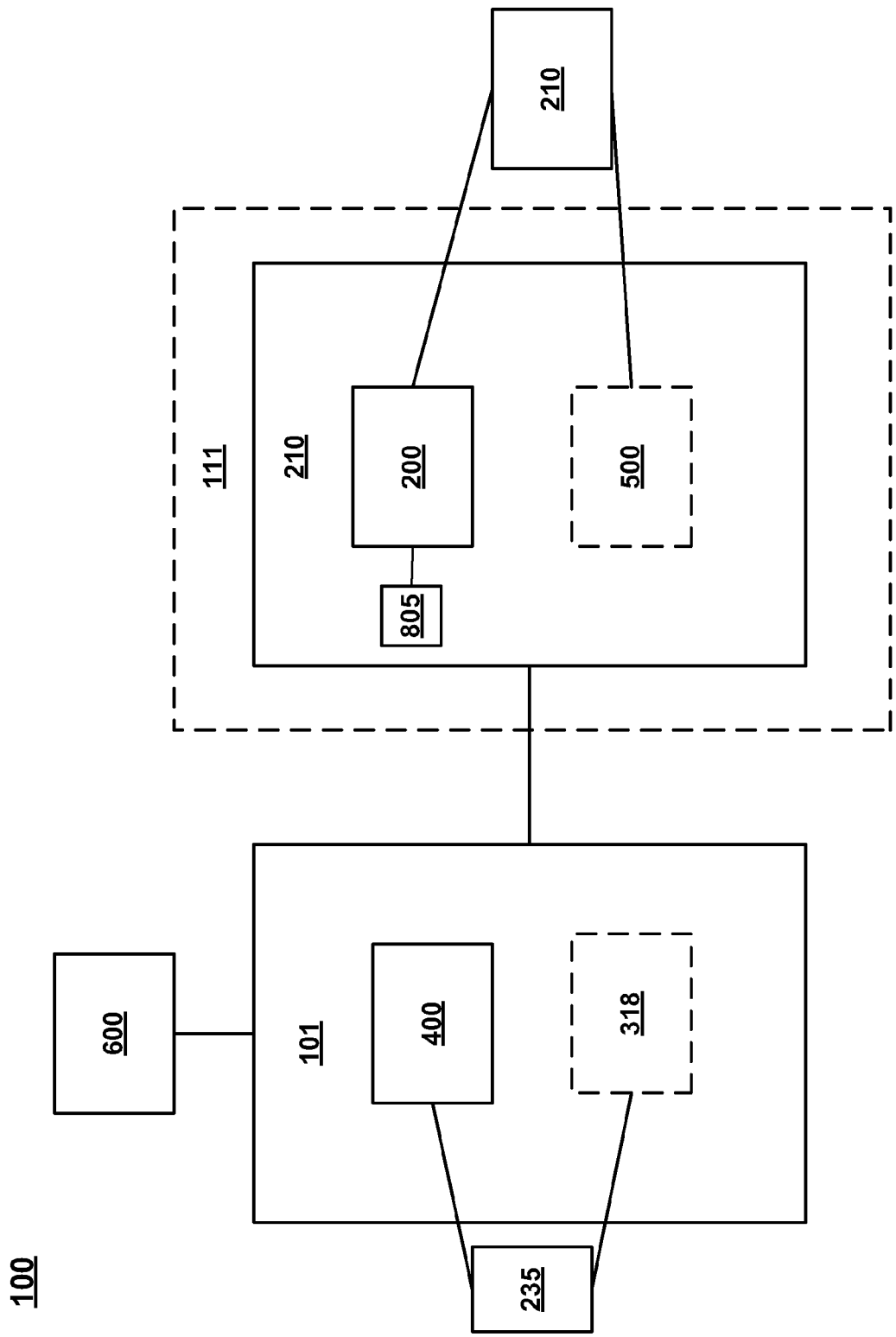
FIG. 8A is a block diagram of the CANDI system 100, in accordance with an embodiment.
Figure 8C:
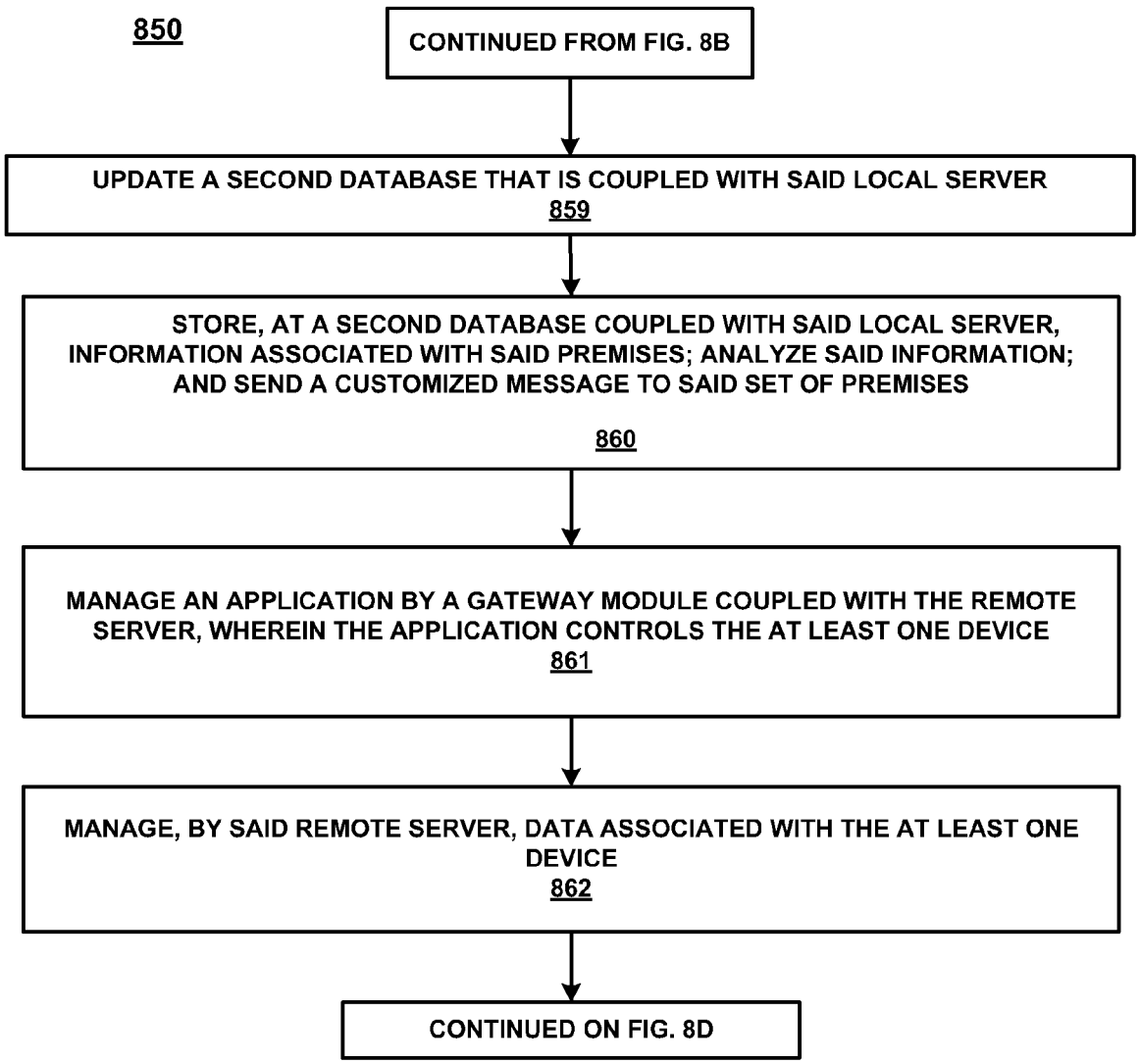
Figure 8D:
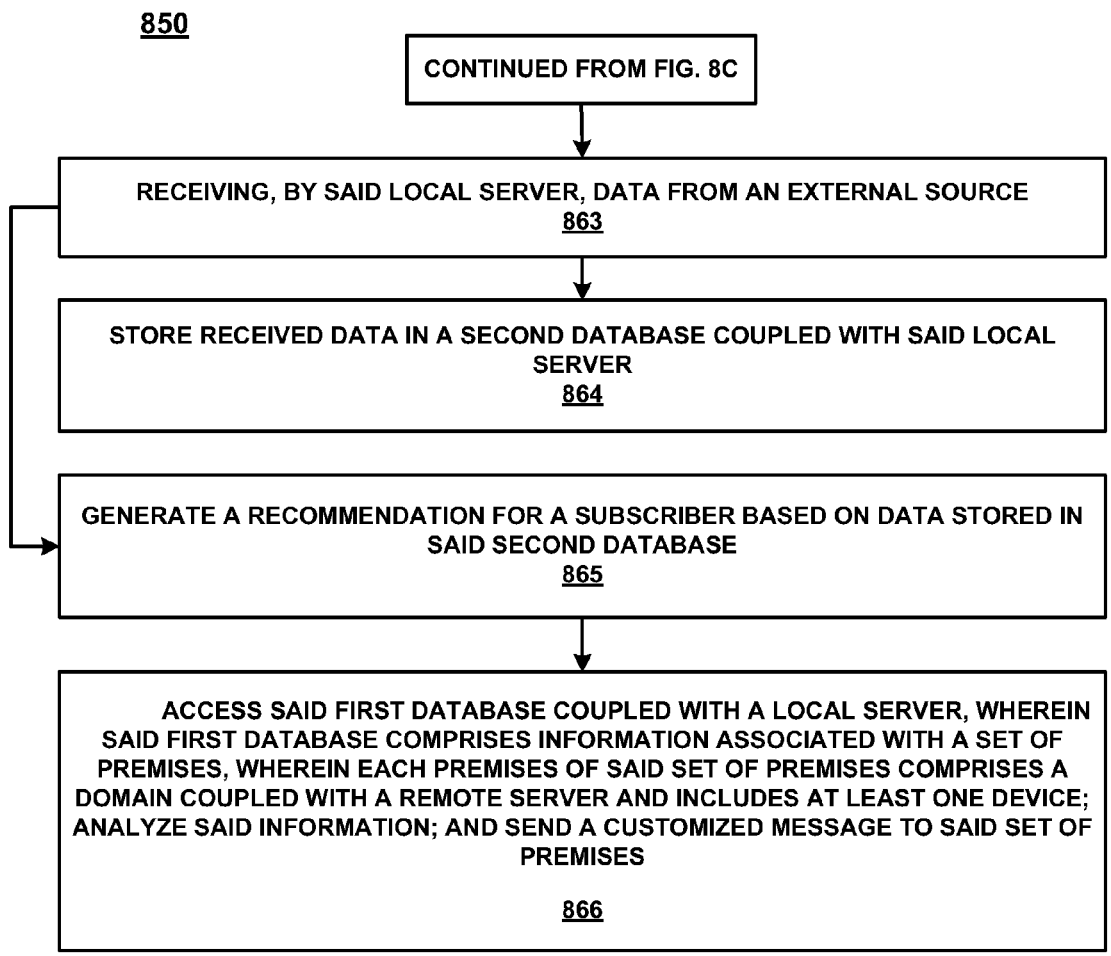

FIGS. 8B-8D are flow diagrams of a method 850 for integrating a networked device within a domain, as described herein, in accordance with an embodiment. At 851, in one embodiment and as described herein, the method 850 includes establishing, at a local server, a device class for at least one device residing in a domain of a premises, wherein said domain is coupled with a remote server and the at least one device comprises a communication port that supports a first protocol. At 852, in one embodiment and as described herein, the method 850 includes identifying an action to be mapped to the device. At 853, in one embodiment and as described herein, the method 850 includes determining a device driver that supports a second protocol, the device driver being coupled with the domain, the second protocol supporting the action. At 854, in one embodiment and as described herein, the method 850 includes comparing the second protocol with a domain configuration store comprising device configuration information for the at least one device, wherein the domain configuration store is coupled with a first database, the first database being coupled with the remote server. At 855, in one embodiment and as described herein, the method 850 includes, based on the comparing, implementing the device driver when the first protocol corresponds to the second protocol such that the action is enabled for performance.

At 856, in one embodiment and as described herein, the method 850 includes automatically establishing a device class for the at least one device. At 857, in one embodiment and as described herein, the method 850 includes, based on the establishing of the device class, enabling a mapping of at least one action to the device, thereby enabling an application to run on and utilize a capability of the device.

At 858, in one embodiment and as described herein, the method 850 includes receiving a set of instructions at the local server, wherein the set of instructions requests that a change occur in the domain; establishing a secure connection between the local server and the remote server; communicating the request for the change between the local server and the remote server; exchanging configuration information between the local server and the remote server; based on the request and the exchanging, updating an application residing on at least one of the remote server and a computing device that is separate from the remote server and updating device configuration information stored on a first database coupled with the remote server. At 859, in one embodiment and as described herein, the method 850 at 858 further includes updating a second database that is coupled with the local server.

At 860, in one embodiment and as described herein, the method 850 includes storing, at a second database coupled with the local server, information associated with the premises, analyzing the information and sending a customized message to said set of premises.

At 861, in one embodiment and as described herein, the method 850 includes manages an application by a gateway module coupled with the remote server, wherein the application controls the at least one device. At 862, in one embodiment and as described herein, the method 850 includes managing, by the remote server, data associated with the at least one device.

At 863, in one embodiment and as described herein, the method 850 includes receiving, by the local server, data from an external source. At 864, in one embodiment and as described herein, the method 850 at 863 further includes storing received data in a second database coupled with the local server.

At 865, in one embodiment and as described herein, the method 850 includes generating a recommendation for a subscriber based on data stored in the second database. At 866, in one embodiment and as described herein, the method 850 includes: accessing the first database coupled with the local server, wherein the first database comprises information associated with a set of premises, wherein each premises of the set of premises comprises a domain coupled with the remote server and includes at least one device; analyzing the information; and sending a customized message to the set of premises.

At 867, in one embodiment and as described herein, the method 850 includes: receiving a set of instructions residing on at least one third party application, wherein the set of instructions comprises a request for an action to be performed at the at least one device within the domain coupled with the premises; and translating the set of instructions into an action request and a protocol that the at least one device understands, such that the at least one third party application can communicate with the device driver at the premises without having knowledge of a protocol thereon and without having knowledge of the at least one device.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Computer System Description

Figure 7:
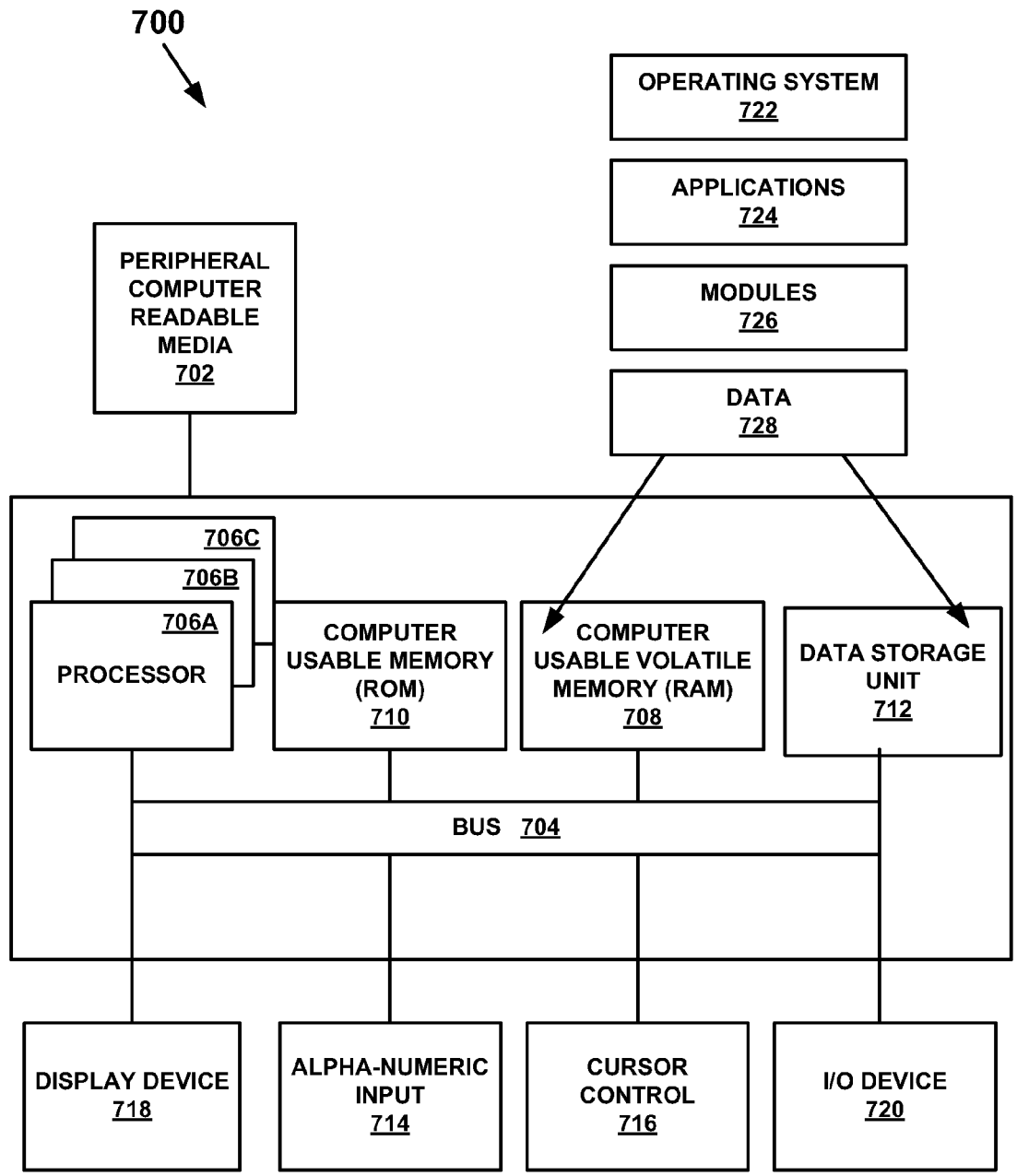
FIG. 7 is a diagram of an example computer system used for performing a method for managing a domain, according to one embodiment.

FIG. 7 is a block diagram of an example of a computer system 700, in accordance with an embodiment. With reference now to FIG. 7, portions of the technology for managing a domain in a premises are composed of computer-readable and computer-executable instructions that reside, for example, in computer-readable storage media of a computer system. That is, FIG. 3 illustrates one example of a type of computer that can be used to implement embodiments, which are discussed below, of the present technology.

It is appreciated that system 700 of FIG. 7 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C.

System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet. A more detailed discussion of the present technology is found below.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described system 700. For example, a method for identifying a device associated with a transfer of content may be applied to operating system 722, applications 724, modules 726, and/or data 728.

The computing system 700 is only one example of a suitable computing environment and is not intended to suggest any limitation as to the scope of use or functionality of the present technology. Neither should the computing environment 700 be interpreted as having any dependency or requirement relating to any one or combination of components illustrated in the example computing system 700.

All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of embodiments, therefore, is not intended to be limited to the embodiments shown and described herein. Rather, the scope and spirit of embodiments are embodied by the appended claims.

What we claim is:

1. A system for achieving a uniform device abstraction layer, said system comprising:
   a device class determiner coupled with a local server, said device class determiner configured for establishing a device class for at least one device residing in a domain at a premises, wherein said domain is coupled with a remote server, and a device of said at least one device comprises a communication port that supports a first protocol corresponding to a second protocol, wherein said second protocol is supported by a device driver coupled with said domain,
   wherein based on said establishing said device class, an action is enabled to be mapped to said device, thereby enabling an application to run on and utilize a capability of said device.

2. The system of claim 1, further comprising:
   a threshold notifier coupled with said device class determiner, said threshold notifier configured for notifying an entity when a threshold is achieved.

3. The system of claim 1, further comprising:
   an updated information requester coupled with said device class determiner, said updated information requester configured for requesting updated information from said remote server.

4. The system of claim 1, further comprising:
   a data receiver coupled with said device class determiner, said data receiver configured for receiving data from an external source.

5. The system of claim 4, further comprising:
   a data storer coupled with said data receiver, said data storer configured for storing said data in a local database coupled with said local server.

6. The system of claim 4, further comprising:
   a data comparer coupled with said data receiver, said data comparer configured for comparing received data with a local database; and
   a data set determiner coupled with said data comparer, said data set determiner configured for determining a set of data that meets a predetermined condition based on said comparing.

7. The system of claim 4, further comprising:
   a history reporter coupled with said data receiver, said history reporter configured for reporting a history of received data.

8. The system of claim 4, further comprising:
   a trend projector coupled with said data receiver, said trend projector configured for projecting a future trend based on received data.

9. The system of claim 1, further comprising:
   a recommendation generator coupled with said device class determiner, said recommendation generator configured for generating a recommendation for a subscriber based on data stored in a local database, wherein said local database is coupled with said local server.

10. The system of claim 9, wherein said recommendation generator comprises:
    a data analyzer configured for analyzing said data stored in said local database.

11. The system of claim 1, further comprising:
    an action initiator coupled with said device class determiner, said action initiator configured for initiating an action to achieve a predetermined criteria.

12. The system of claim 1, further comprising:
    a subscriber data receiver coupled with said device class determiner, said subscriber data receiver configured for receiving data associated with different subscribers' actions; and
    an action comparor coupled with said subscriber data receiver, said action comparor configured for comparing said different subscribers' actions with each other based on received data.

13. The system of claim 1, further comprising:
    a subscriber data receiver coupled with said device class determiner, said subscriber data receiver configured for receiving data associated with different subscribers' actions; and
    a subscriber grouper coupled with said subscriber data receiver, said subscriber grouper configured for grouping subscribers based on received data.

14. The system of claim 1, further comprising:
    a subscriber data receiver coupled with said device class determiner, said subscriber data receiver configured for receiving data associated with different subscribers' actions; and
    a subscriber manager coupled with said subscriber data receiver, said subscriber manager configured for utilizing received data for managing at least one subscriber.

15. The system of claim 1, further comprising:
    a web service accessor coupled with said device class determiner, said web service accessor configured for accessing a web service that requires a permission; and
    a subscriber information comparor coupled with said web service accessor, said subscriber information comparor configured for comparing a subscriber's information with information associated with at least one third party.

16. The system of claim 1, further comprising:
    a registration processor coupled with said device class determiner, said registration processor configured for processing registration of at least one subscriber.

17. The system of claim 1, further comprising:
    a secure subscriber tunnel initiator, coupled with said local server, said tunnel initiator configured for, in response to a request from a subscriber to said local server to remotely access said premises, negotiating between said local server and said remote server a subscriber communication tunnel such that said subscriber can securely, remotely and directly connect to said remote server and run said application.

18. The system of claim 1, further comprising:
a third party tunnel initiator, such that said third party can send data to said application.

19. The system of claim 1, further comprising:
a device discovery module coupled with said local server, said device discovery module configured for automatically discovering a device of said at least one device at said premises.

20. A non-transitory computer readable storage medium having stored thereon, computer-executable instructions that, when executed by a computer, cause said computer to perform a method for achieving a uniform device abstraction layer, said method comprising:
automatically establishing a device class for at least one device residing in a domain of a premises, wherein said domain is coupled with a remote server, and a device of said at least one device comprises a communication port that supports a first protocol corresponding to a second protocol, wherein said second protocol is supported by a device driver coupled with said domain; and
based on said establishing of said device class, enabling a mapping of at least one action to said device, thereby enabling an application to run on and utilize a capability of said device.

21. The non-transitory computer readable storage medium of claim 20, further comprising:
based on said establishing of said device class, enabling multiple applications to be built uniformly, using said mapping of said at least one action.

22. The non-transitory computer readable storage medium of claim 20, wherein said method further comprises:
based on performed data analysis, notifying an entity when a threshold is achieved.

23. The non-transitory computer readable storage medium of claim 20, wherein said method further comprises:
receiving data from an external source.

24. The non-transitory computer readable storage medium of claim 23, wherein said method further comprises:
storing said data in a local database coupled with a local server.

25. The non-transitory computer readable storage medium of claim 23, wherein said method further comprises:
comparing received data with a local database; and
based on said comparing, determining a set of data that meets a predetermined criteria.

26. The non-transitory computer readable storage medium of claim 23, wherein said method further comprises:
reporting a history of received data.

27. The non-transitory computer readable storage medium of claim 23, wherein said method further comprises:
based on received data, projecting a future trend.

28. The non-transitory computer readable storage medium of claim 20, wherein said method further comprises:
based on data stored in a local database coupled with a local server, generating a recommendation for a subscriber.

29. The non-transitory computer readable storage medium of claim 28, wherein said generating a recommendation for a subscriber comprises:
analyzing said data stored in said local database.

30. The non-transitory computer readable storage medium of claim 20, wherein said method further comprises:
initiating an action to achieve a predetermined condition.

31. The non-transitory computer readable storage medium of claim 20, wherein said method further comprises:
receiving data associated with different subscribers' actions; and
based on received data, comparing said different subscribers' actions with each other.

32. The non-transitory computer readable storage medium of claim 20, wherein said method further comprises:
receiving data associated with different subscribers' actions; and
based on received data, grouping subscribers.

33. The non-transitory computer readable storage medium of claim 20, wherein said method further comprises:
accessing a web service requiring a permission; and
comparing a subscriber's information with information associated with at least one third party.

34. The non-transitory computer readable storage medium of claim 20, wherein said method further comprises:
receiving data associated with at least one subscriber; and
managing said at least one subscriber.

35. The non-transitory computer readable storage medium of claim 20, wherein said establishing said device class for said least one device residing in said domain comprises:
establishing a device class for similar devices in said domain that operates with different protocol versions and different actions.

36. The non-transitory computer readable storage medium of claim 20, wherein said establishing said device class for said at least one device residing in said domain comprises:
establishing a device class for different devices implementing different actions over a same protocol.

37. The non-transitory computer readable storage medium of claim 20, wherein said based on said establishing, said enabling a mapping of an action to a device comprises:
enabling integrating of web-based services within said application.

* * * * *

UNITED STATES PATENT AND TRADEMARK OFFICE
CERTIFICATE OF CORRECTION

PATENT NO. : 8,996,749 B2
APPLICATION NO. : 13/481661
DATED : March 31, 2015
INVENTOR(S) : Raschke et al.

It is certified that error appears in the above-identified patent and that said Letters Patent is hereby corrected as shown below:

In the Claims

Column 39, Line 28, Claim 1, cancel the text beginning with "1. A system" to and ending "of said device." in Column 39, Line 42, and insert the following claim:
--1. A system for achieving a uniform device abstraction layer, said system comprising:
a device class determiner coupled with a local server, said device class determiner configured for establishing a device class for at least one device residing in a domain at a premises, wherein said at least one device is preconfigured to include characteristics recognizable for organization into a device class, wherein said device class represents a designation of products having similar functions, said products being grouped together as a type of device,
wherein said domain is coupled with a remote server, and a device of said at least one device comprises a communication port that supports a first protocol corresponding to a second protocol, wherein said second protocol is supported by a device driver coupled with said domain, wherein said device driver is preconfigured to support a set of actions possible to be implemented through said device, using at least said second protocol and an implementer coupled to said device driver to implement said set of actions,
wherein based on said establishing said device class, said set of actions are enabled to be mapped to said device, thereby enabling, in response to a command for a set of actions to be applied to more than one device of different brands within said device class, said set of actions to run on and utilize a capability of said more than one device without having to tailor said command for each device of said more than one device of different brands.--

Column 41, Line 3, Claim 17, Delete: "run said application."
Insert: --run an application, wherein said set of actions comprises said application.--

Signed and Sealed this
Twenty-ninth Day of September, 2015

Michelle K. Lee
*Director of the United States Patent and Trademark Office*

CERTIFICATE OF CORRECTION (continued)
U.S. Pat. No. 8,996,749 B2

Column 41, Line 12, Claim 20, cancel the text beginning with "20. A non-transitory" to and ending "of said device." in Column 41, Line 27, and insert the following claim:

--20. A non-transitory computer readable storage medium having stored thereon, computer-executable instructions that, when executed by a computer, cause said computer to perform a method for achieving a uniform device abstraction layer, said method comprising:

automatically establishing a device class for at least one device residing in a domain of a premises, wherein said at least one device is preconfigured to include characteristics recognizable for organization into a device class, wherein said device class represents a designation of products having similar functions, said products being grouped together as a type of device, wherein said domain is coupled with a remote server, and a device of said at least one device comprises a communication port that supports a first protocol corresponding to a second protocol, wherein said second protocol is supported by a device driver coupled with said domain, wherein said device driver is preconfigured to support a set of actions possible to be implemented through said device, using at least said second protocol and an implementer coupled to said device driver to implement said set of actions; and based on said establishing of said device class, mapping said set of actions to said device, thereby enabling, in response to a command for a set of actions to be applied to more than one device of different brands within said device class, said set of actions to run on and utilize a capability of said more than one device without having to tailor said command differently for each device of said more than one device of different brands.--

Column 41, Line 32, Claim 21, Delete: "mapping of said at least one action."
                    Insert: --mapping of said set of actions.--